(12) United States Patent
Inoue

(10) Patent No.: US 9,935,465 B2
(45) Date of Patent: Apr. 3, 2018

(54) POWER CONVERSION DEVICE

(71) Applicant: Mitsubishi Electric Corporation, Chiyoda-ku (JP)

(72) Inventor: Sadayuki Inoue, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 129 days.

(21) Appl. No.: 15/109,530

(22) PCT Filed: Jun. 26, 2014

(86) PCT No.: PCT/JP2014/067018
§ 371 (c)(1),
(2) Date: Jul. 1, 2016

(87) PCT Pub. No.: WO2015/107706
PCT Pub. Date: Jul. 23, 2015

(65) Prior Publication Data
US 2016/0329716 A1     Nov. 10, 2016

(30) Foreign Application Priority Data

Jan. 20, 2014   (JP) ................................ 2014-007723

(51) Int. Cl.
*H02J 3/38*      (2006.01)
*H02M 3/04*      (2006.01)
(Continued)

(52) U.S. Cl.
CPC .............. *H02J 3/383* (2013.01); *H02M 3/04* (2013.01); *H02M 7/44* (2013.01); *H02M 2001/007* (2013.01); *Y02E 10/563* (2013.01)

(58) Field of Classification Search
CPC ............ H02J 3/383; H02M 3/04; H02M 7/44; H02M 2001/007; Y02E 10/563
See application file for complete search history.

(56) References Cited

U.S. PATENT DOCUMENTS

| 9,787,170 B2 * | 10/2017 | Inoue ........................ G05F 1/67 |
| 2010/0156186 A1 * | 6/2010 | Kim .................... H01M 16/003 |
| | | 307/72 |

(Continued)

FOREIGN PATENT DOCUMENTS

| JP | 11-122820 A | 4/1999 |
| JP | 2000-14162 A | 1/2000 |

(Continued)

OTHER PUBLICATIONS

Office Action dated Feb. 28, 2017 in Japanese Patent Application No. 2015-557695 (with partial unedited computer generated English translation).

(Continued)

*Primary Examiner* — Jared Fureman
*Assistant Examiner* — Michael Warmflash
(74) *Attorney, Agent, or Firm* — Oblon, McClelland, Maier & Neustadt, L.L.P.

(57) ABSTRACT

In the case of performing self-sustained operation, when power conversion devices supply power to loads, all DC/AC conversion circuits of the power conversion devices are operated in a voltage control mode, and effective voltage (amplitude) of reference AC voltage as a control target for AC power outputted from each DC/AC conversion circuit under voltage control is adjusted in accordance with the power generation amount of a solar panel as a DC power supply, and the state of charge of a storage battery, thereby the amount of power supplied to the loads is controlled.

13 Claims, 34 Drawing Sheets

(51) Int. Cl.
*H02M 7/44* (2006.01)
*H02M 1/00* (2006.01)

(56) References Cited

U.S. PATENT DOCUMENTS

| | | | | |
|---|---|---|---|---|
| 2011/0148360 A1* | 6/2011 | Lee | ............................ | H02J 7/35 |
| | | | | 320/134 |
| 2012/0134191 A1* | 5/2012 | Yoneda | .................. | H01M 10/02 |
| | | | | 363/131 |
| 2012/0155126 A1* | 6/2012 | Yoneda | ................... | H02J 3/383 |
| | | | | 363/40 |
| 2015/0001932 A1 | 1/2015 | Inoue et al. | | |

FOREIGN PATENT DOCUMENTS

| | | |
|---|---|---|
| JP | 2003-153444 A | 5/2003 |
| JP | 2008-5638 A | 1/2008 |
| JP | 4101201 B2 | 6/2008 |
| JP | 2011-135763 A | 7/2011 |
| WO | 00/13290 A1 | 3/2000 |
| WO | 2013/121618 A1 | 8/2013 |

OTHER PUBLICATIONS

International Search Report dated Sep. 16, 2014 in PCT/JP14/067018 Filed Jun. 26, 2014.

* cited by examiner (a)

(b)

(c)

(a)

(b)

(a)

(b)

ent invention relates to a power conversion
POWER CONVERSION DEVICE

TECHNICAL FIELD

The present invention relates to a power conversion device having a power generation device using natural energy, or power storage means, and particularly to control technology for causing a plurality of the power conversion devices to perform parallel operations in the case of being released from a power system upon power outage or the like.

BACKGROUND ART

In recent years, in order to reduce environmental load, a power generation system utilizing natural energy such as solar power generation, which does not emit carbon dioxide, is spreading into homes. However, upon power outage, power generation using natural energy represented by solar power generation can only output the maximum power of 1500 W from a self-sustained operation outlet provided in advance in a power conversion device. In addition, in order to cope with power shortage or the like after Great East Japan Earthquake, a system having a storage battery, a system using an electric automobile as a storage battery, a system combining solar power generation and a storage battery, and the like are being developed.

For example, Patent Document 1 indicated below discloses an operation method for distributed power supplies in the case where, upon power outage, a plurality of solar power generators and a plurality of storage batteries are operated in parallel in a coordinated manner to supply power to an electric light line released from a system.

That is, the following method is described. In the case where a plurality of distributed power supplies that are released from a power supply are operated in a self-sustained manner in parallel, one of the distributed power supplies is set as an AC voltage source for self-sustained operation, the other distributed power supplies are set as AC current sources synchronized with the AC voltage source, and thus these distributed power supplies are operated in a coordinated manner. In this case, the distributed power supplies operated as AC current sources are classified into a first distributed power supply having a storage battery and a second distributed power supply using natural energy but not having a storage battery. The second distributed power supply is controlled so as to track the maximum power point, and is configured to be able to supply surplus power to the first distributed power supply, and thus control is performed so as to perform the charging when surplus power is generated.

Patent Document 2 indicated below describes a configuration method for a parallel operation device, in which the AC voltage amplitude of a main power supply is set to be greater than that of a sub power supply, and output of an AC power supply is subjected to wired OR with diodes, using a switch, whereby, if the main power supply has no abnormality, power is supplied from only the main power supply, and if the main power supply has abnormality, the main power supply is automatically switched to the sub power supply.

CITATION LIST

Patent Document

Patent Document 1: Japanese Patent No. 4101201
Patent Document 2: International Publication No. WO00/13290

SUMMARY OF THE INVENTION

Problems to be Solved by the Invention

As described above, in a power feed system described in Patent Document 1, according to the operation method for distributed power supplies, control is performed so that, when a plurality of distributed power supplies are operated in a self-sustained manner, a distributed power supply including a storage battery operates as an AC voltage source, and the other distributed power supplies operate as AC current sources. As for the distributed power supply operating as an AC voltage source, excess or shortage of power supplied to a load can be determined and the charge or discharge power amount can be controlled.

However, as for the distributed power supplies operating as AC current sources, excess or shortage of power supplied to the load cannot be determined. Therefore, there is a problem that, for the distributed power supplies operating as AC current sources, the supply power amount cannot be controlled in accordance with power used by the load. Particularly, in the case where a plurality of distributed power supplies operating as AC current sources include storage batteries, there is a problem that it is impossible to perform a control in which power is preferentially discharged from a specific storage battery. Thus, a problem arises that a discharge amount from a storage battery in which the state of charge is small cannot be restricted, or the like.

In the parallel operation device described in Patent Document 2, the AC voltage amplitude of the main power supply is set to be greater than that of the sub power supply, and output of the AC power supply is subjected to wired OR with diodes, using a switch. In normal operation in which power is supplied from a power system, if power is normally supplied from the main power supply, power feeding from the main power supply is performed, and on the other hand, if the main power supply has failed, the power supply to supply power can be switched from the main power supply to the sub power supply without instantaneous interruption. However, there is a problem that the amount of output power from each power supply cannot be controlled.

The present invention has been made to solve the above problems, and an object of the present invention is to provide a distributed power supply device capable of, in self-sustained operation in which a plurality of power conversion devices supply power to a load in a coordinated manner, controlling the amount of output power from each distributed power supply on the basis of the power generation amount of a solar battery, the state of charge of a storage battery, the amount of supplied power from an inverter, and the like. Specifically, an object of the present invention is to provide a power conversion device capable of, by adjusting the amount of supply power to a load on the basis of the priority in accordance with the power generation amount and the state of charge of energy creating devices such as a solar battery and a storage battery, maximally utilizing generated power of the solar battery or the like, and controlling the discharge power from the storage battery to be minimized.

Means of Solution to the Problems

A power conversion device of the present invention is a power conversion device for converting DC power of a first DC power supply connected outside, to AC power, and supplying the AC power to a load connected to a power system, the power conversion device comprises a first DC/DC conversion unit for converting first DC voltage outputted from the first DC power supply, to second DC voltage; an inverter unit which receives the second DC voltage outputted from the first DC/DC conversion unit and converts the received second DC voltage to AC voltage, or converts AC voltage to the second DC voltage; a first DC/DC conversion control unit for controlling the first DC/DC conversion unit; and an inverter control unit for controlling the inverter unit, the power conversion device includes an AC voltage target value generating unit for generating a target value for AC voltage serving as a reference for performing voltage control for the inverter unit; and a control unit for controlling the inverter unit on the basis of the target value for AC voltage, generated by the AC voltage target value generating unit, the AC voltage target value generating unit determines an AC voltage amplitude as the target value for AC voltage in accordance with a power amount of the first DC power supply when self-sustained operation is performed in the case of being released from the power system, and the control unit performs voltage control for the inverter unit so that AC voltage having the AC voltage amplitude determined by the AC voltage target value generating unit is outputted from the inverter unit.

Effect of the Invention

According to the power conversion device of the present invention, when power is supplied from a plurality of distributed power supplies to a load, generated power from a solar battery or the like which converts natural energy to electric power can be preferentially supplied to the load, without using an interface such as communications. Thus, an effect of preventing unnecessary discharge from a storage battery is provided.

For example, in the case where power to be supplied to the load cannot be supplied by generated power of the solar battery, for example, when an inverter in the power conversion device having a storage battery with little residual power is controlled, the AC voltage amplitude as a target value for AC voltage is reduced, thus a priority order for power to be discharged can be set. Thus, inconvenience in which a storage battery with a small capacity becomes empty first and the power conversion device stops, is prevented. Therefore, even in such a case of supplying great power instantaneously due to sharp load variation, power can be supplied in a distributed manner from a plurality of power conversion devices, thus providing an effect of allowing the operation to be continued without the power conversion device being stopped due to overload.

EMBODIMENTS FOR CARRYING OUT THE INVENTION

Embodiment 1

Figure 1:
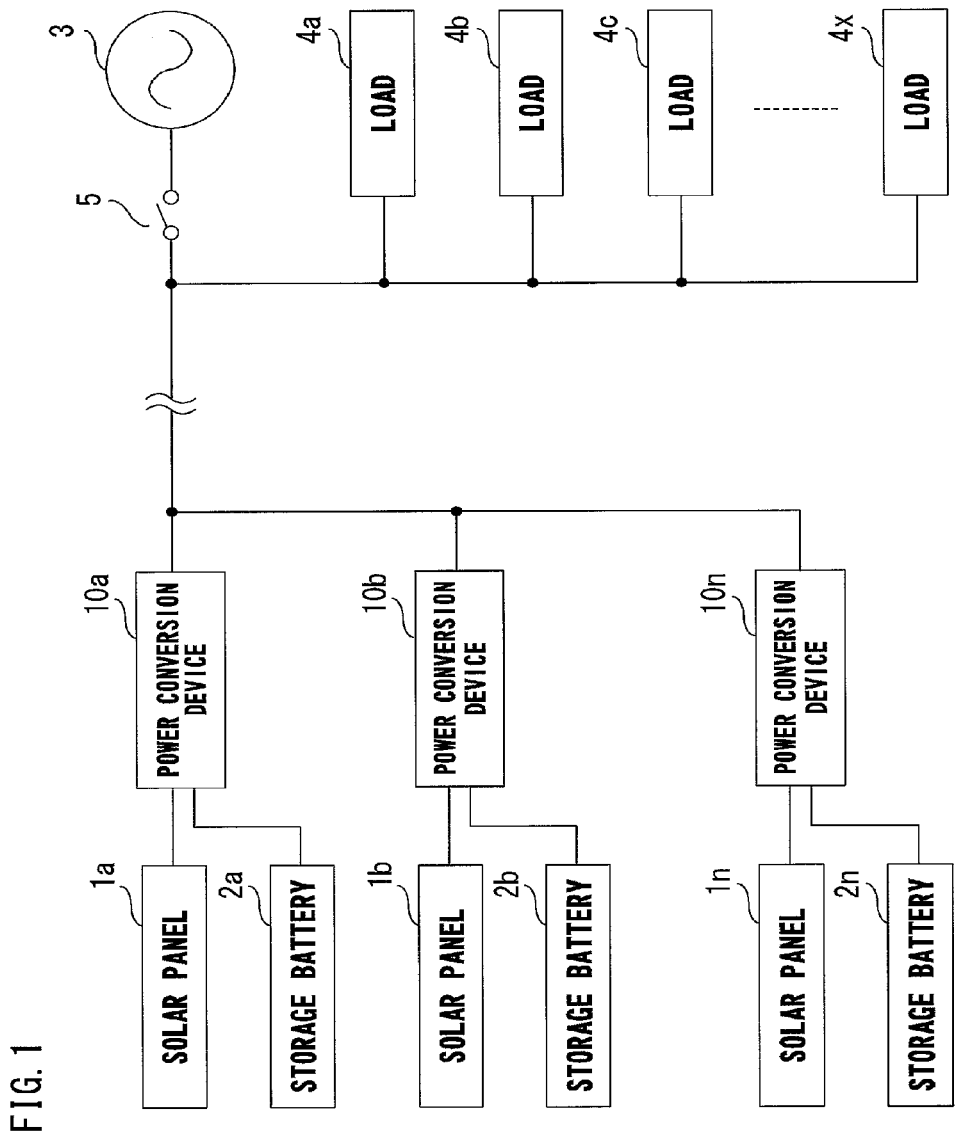
FIG. 1 is a configuration diagram of a distributed power supply system composed of a plurality of power conversion devices and loads in embodiment 1 of the present invention.

FIG. 1 is a configuration diagram of a distributed power supply system composed of a plurality of power conversion devices and loads in embodiment 1 of the present invention.

The distributed power supply system in FIG. 1 includes solar panels 1a to 1n as solar batteries which are DC power supplies, storage batteries 2a to 2n as DC power supplies, an AC power system 3, loads 4a to 4x, and power conversion devices 10a to 10n. The power conversion devices 10a to 10n and the loads 4a to 4x are connected to the power system 3 via a switch 5. As shown in FIG. 1, the plurality of power conversion devices 10a to 10n are connected via AC, and in self-sustained operation performed when the power conversion devices 10a to 10n are released from the power system 3 due to power outage of the power system 3 or the like, the power conversion devices 10a to 10n operate in a coordinated manner. Hereinafter, such a configuration is referred to as an AC coordination system.

In the following description, the power conversion devices 10a to 10n of the present embodiment 1 are each provided with both the solar panel 1 and the storage battery 2 as DC power supplies for supplying DC power. Hereinafter, a numeral 1 is used for collectively referring to the solar panels 1a to 1n without distinction, a numeral 2 is used for collectively referring to the storage batteries 2a to 2n without distinction, a numeral 4 is used for collectively referring to the loads 4a to 4x without distinction, and a numeral 10 is used for collectively referring to the power conversion devices 10a to 10n without distinction.

Figure 2:
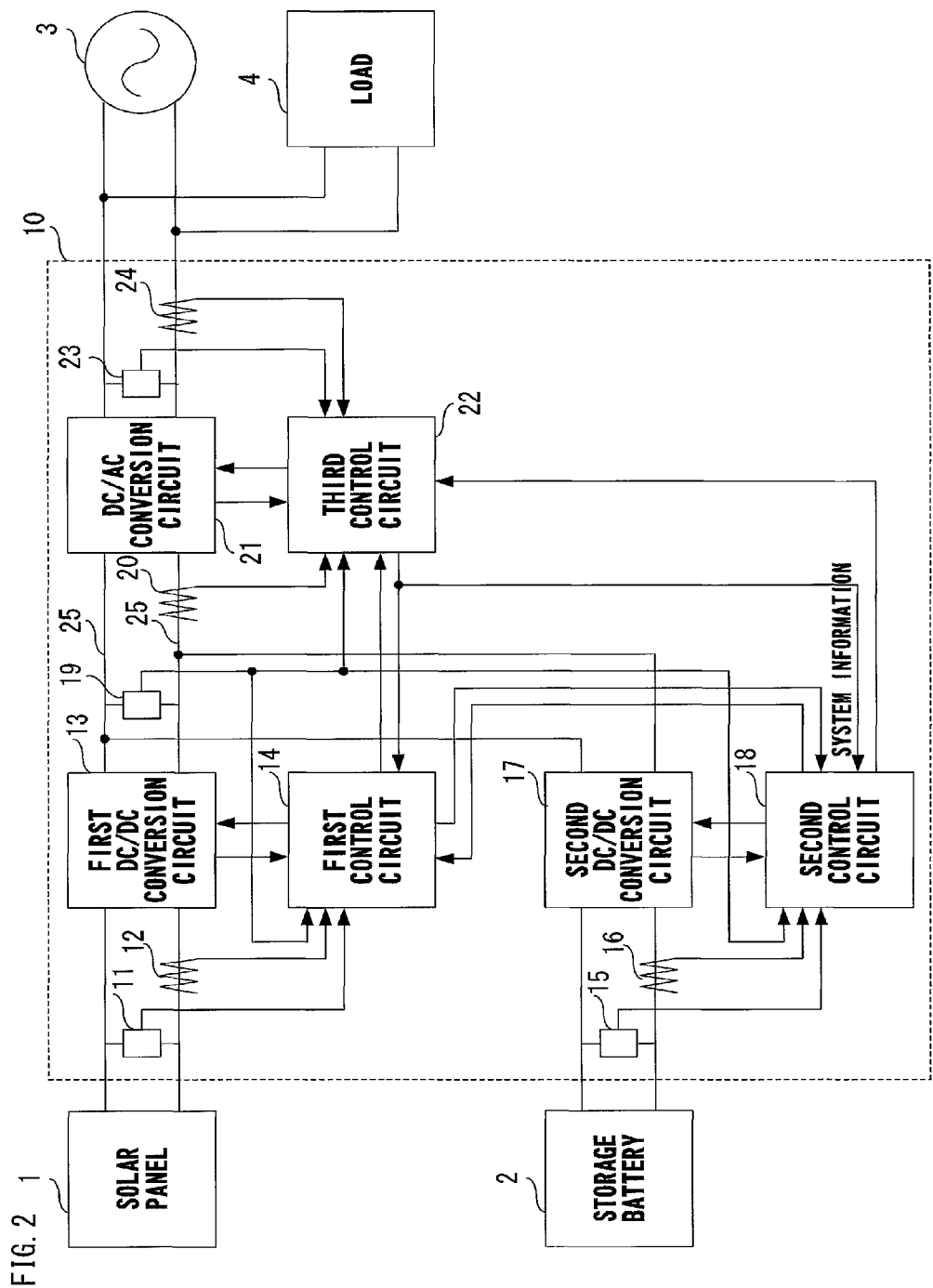
FIG. 2 is a block diagram schematically showing the system configuration of each power conversion device in embodiment 1 of the present invention.

FIG. 2 is a block diagram showing the system configuration of each power conversion device according to embodiment 1 of the present invention.

In FIG. 2, the solar panel 1, the storage battery 2, the power system 3, and the load 4 are connected to the power conversion device 10. A voltmeter 11 measures DC voltage outputted from the solar panel 1. An ammeter 12 measures current outputted from the solar panel 1. A first DC/DC conversion circuit 13 converts DC voltage outputted from the solar panel 1, to DC bus voltage for a DC bus 25. A first control circuit 14 controls the first DC/DC conversion circuit 13.

A voltmeter 15 measures battery voltage of the storage battery 2. An ammeter 16 measures current outputted from the storage battery 2. A second DC/DC conversion circuit 17 converts DC voltage outputted from the storage battery 2, to DC bus voltage for the DC bus 25. A second control circuit 18 controls the second DC/DC conversion circuit 17.

The first DC/DC conversion circuit 13, the second DC/DC conversion circuit 17, and a DC/AC conversion circuit 21 described later are connected to the DC bus 25. The DC/AC conversion circuit 21 converts DC power supplied from the DC bus 25, to AC power, and outputs the AC power to the power system 3. A voltmeter 19 measures DC bus voltage of the DC bus 25. An ammeter 20 measures current flowing through the DC bus 25. A third control circuit 22 controls the DC/AC conversion circuit 21. A voltmeter 23 measures system voltage of the power system 3. An ammeter 24 measures AC current outputted from the DC/AC conversion circuit 21.

As well as converting DC power supplied from the DC bus 25 to AC power and outputting the AC power to the power system 3, the DC/AC conversion circuit 21 can also convert AC power supplied from the power system 3, to DC power to charge the storage battery 2 via the DC bus 25.

Thus, the power conversion device 10 includes the voltmeters 11, 15, 19, and 23, the ammeters 12, 16, 20, and 24, the first DC/DC conversion circuit 13, the first control circuit 14, the second DC/DC conversion circuit 17, the second control circuit 18, the DC/AC conversion circuit 21, the third control circuit 22, and the DC bus 25. The DC/AC conversion circuit 21 corresponds to an inverter unit in claims, and the third control circuit 22 corresponds to an inverter control unit in claims.

Figure 3:
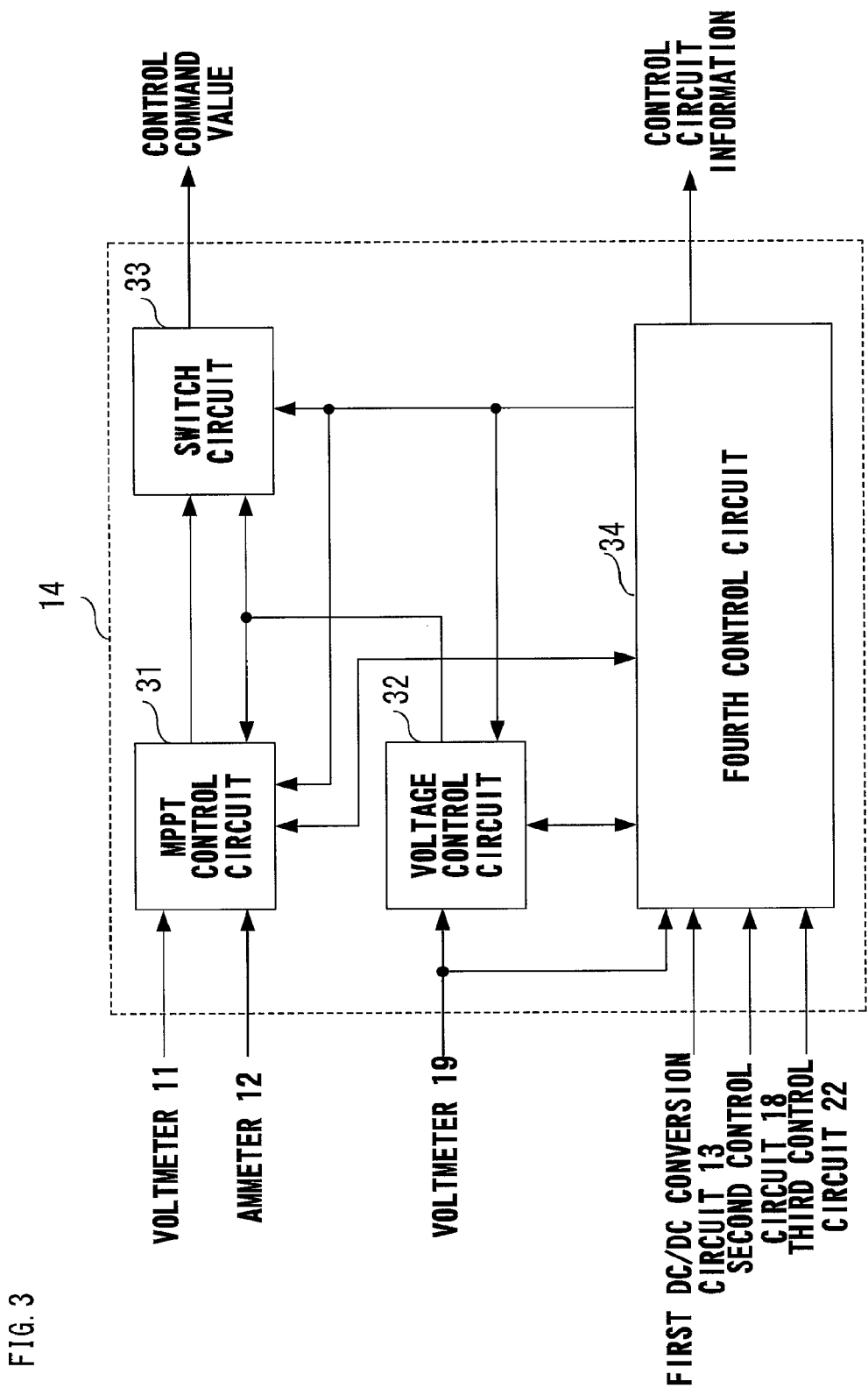
FIG. 3 is a block diagram schematically showing the configuration of a first control circuit shown in FIG. 2.

FIG. 3 is a block diagram showing the detailed configuration of the first control circuit 14 according to embodiment 1 of the present invention.

In FIG. 3, an MPPT (maximum power point tracking) control circuit 31 controls DC voltage of the solar panel 1 so as to maximally extract power generated by the solar panel 1. A voltage control circuit 32 controls voltage of the solar panel 1, thereby controlling power extracted from the solar panel 1. A switch circuit 33 switches between output of the MPPT control circuit 31 and output of the voltage control circuit 32. A fourth control circuit 34 outputs control parameters, control target values, and the like for the MPPT control circuit 31 and the voltage control circuit 32, and manages the power generation condition of the solar panel 1, and the like. The fourth control circuit 34 also outputs a control signal for the switch circuit 33.

The first control circuit 14 is composed of the MPPT control circuit 31, the voltage control circuit 32, the switch circuit 33, and the fourth control circuit 34.

Figure 4:
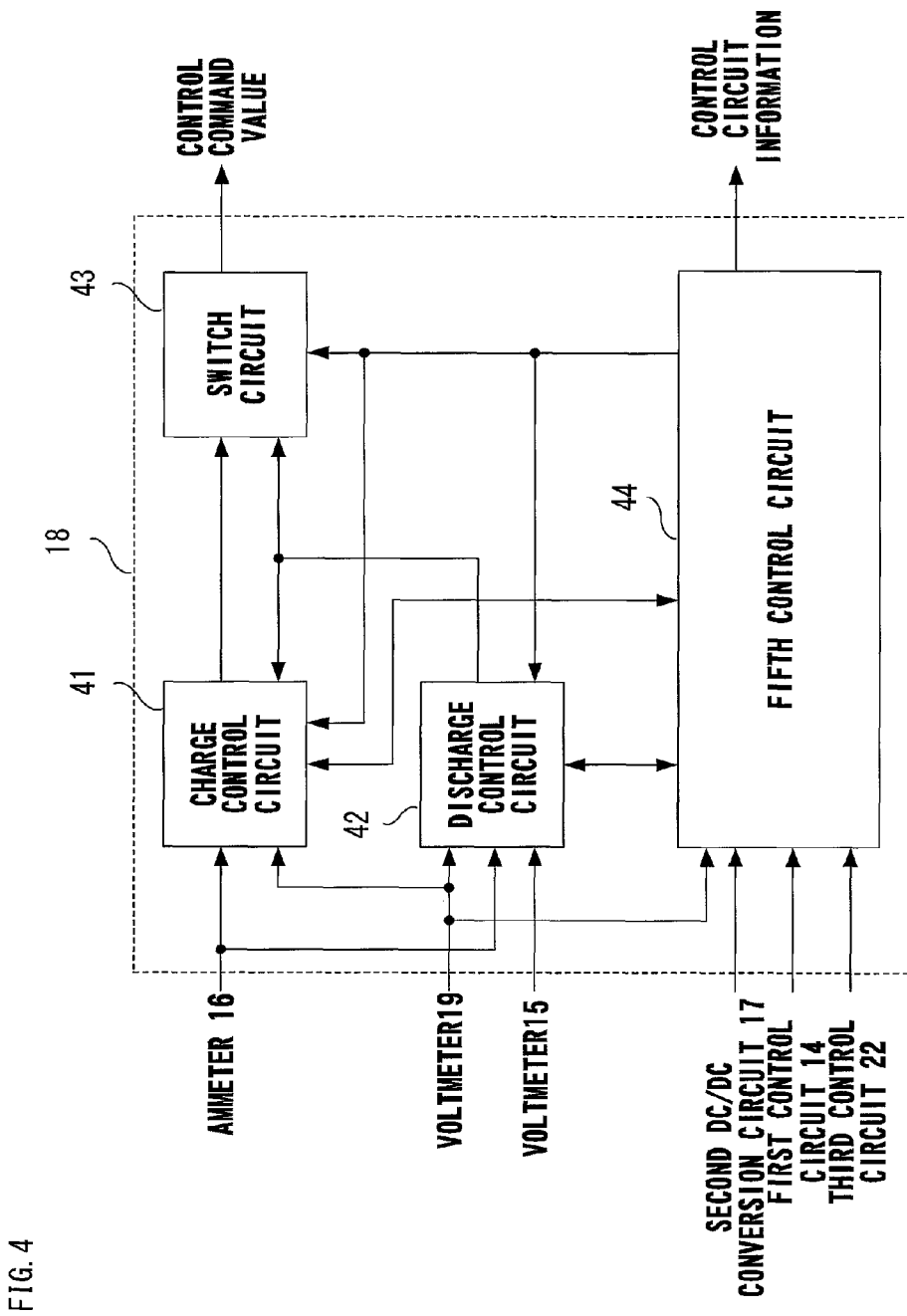
FIG. 4 is a block diagram schematically showing the configuration of a second control circuit shown in FIG. 2.

FIG. 4 is a block diagram showing the detailed configuration of the second control circuit 18 according to embodiment 1 of the present invention.

In FIG. 4, a charge control circuit 41 calculates a command value for performing charge control for the storage battery 2. A discharge control circuit 42 calculates a command value for performing control of discharge from the storage battery 2. A switch circuit 43 switches between output of the charge control circuit 41 and output of the discharge control circuit 42. A fifth control circuit 44 outputs control parameters, control target values, and the like for the charge control circuit 41 and the discharge control circuit 42, and manages the state of charge, charge current, the discharge power amount, and the like of the storage battery 2. The fifth control circuit 44 also outputs a control signal for the switch circuit 43.

The second control circuit 18 is composed of the charge control circuit 41, the discharge control circuit 42, the switch circuit 43, and the fifth control circuit 44.

Figure 5:
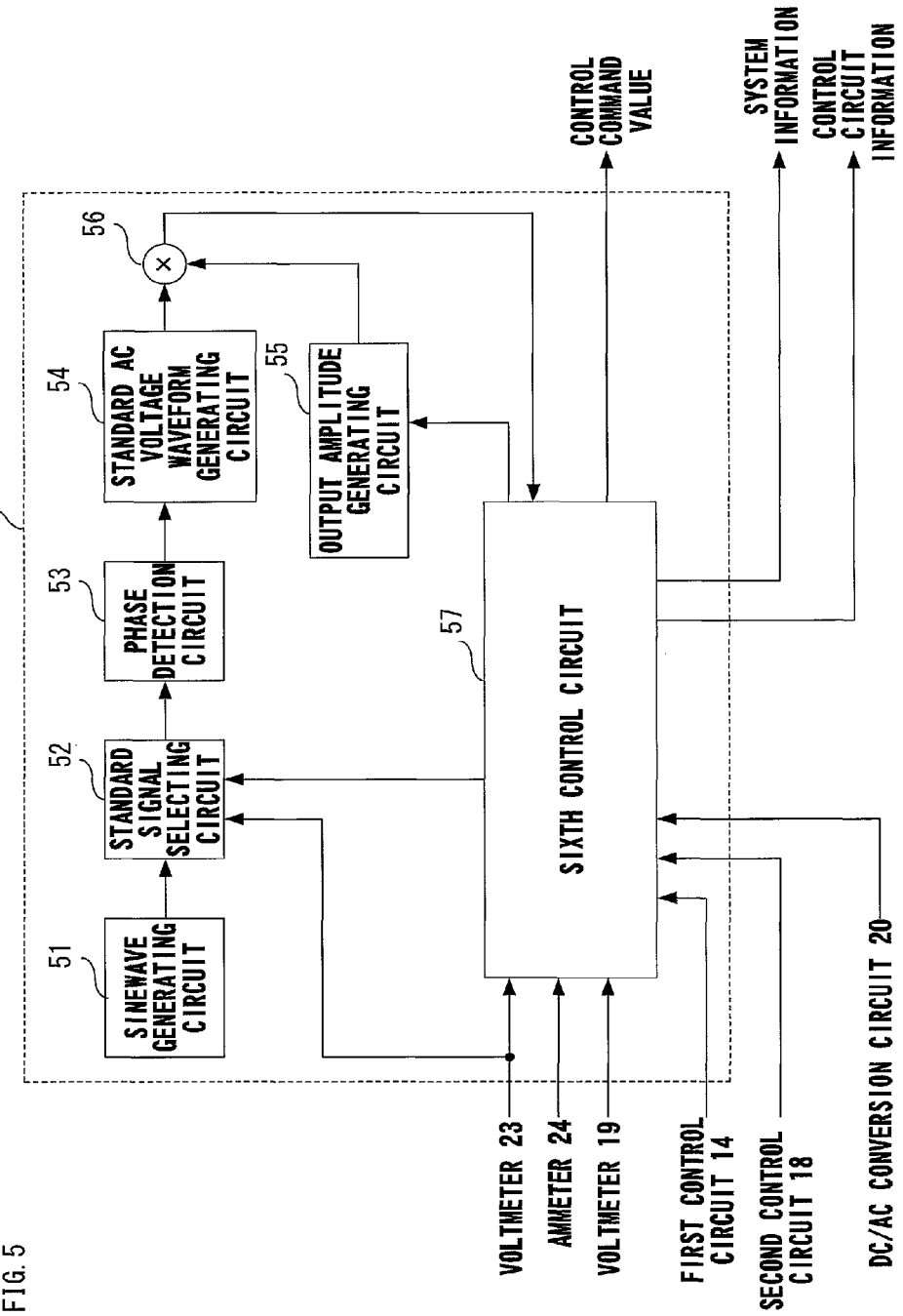
FIG. 5 is a block diagram schematically showing the configuration of a third control circuit shown in FIG. 2.

FIG. 5 is a block diagram showing the detailed configuration of the third control circuit 22.

In FIG. 5, a sinewave generating circuit 51 generates a sinewave. A reference signal selecting circuit 52 selects one of a sinusoidal AC voltage waveform inputted from the power system 3, and the sinewave inputted from the sinewave generating circuit 51. A phase detection circuit 53 detects the phase of the sinewave outputted from the reference signal selecting circuit 52. A reference AC voltage waveform generating circuit 54 generates reference AC voltage serving as a reference for performing voltage control for the DC/AC conversion circuit 21 in self-sustained operation, on the basis of the phase detected by the phase detection circuit 53. An output amplitude generating circuit 55 outputs a priority factor for determining an AC voltage amplitude as a target value for AC voltage serving as a reference for performing voltage control for the DC/AC conversion circuit 21. A multiplication circuit 56 multiplies output of the reference AC voltage waveform generating circuit 54 and output of the output amplitude generating circuit 55. A sixth control circuit 57 controls the DC/AC conversion circuit 21 and controls the output amplitude generating circuit 55. The sixth control circuit 57 also outputs a control signal for the reference signal selecting circuit 52.

The third control circuit 22 is composed of the sinewave generating circuit 51, the reference signal selecting circuit 52, the phase detection circuit 53, the reference AC voltage waveform generating circuit 54, the output amplitude generating circuit 55, the multiplication circuit 56, and the sixth control circuit 57.

Here, the reference signal selecting circuit 52 corresponds to a reference sinewave selecting unit in claims; the phase detection circuit 53 corresponds to a phase detecting unit in claims; the reference AC voltage waveform generating circuit 54, the output amplitude generating circuit 55, and the multiplication circuit 56 correspond to an AC voltage target value generating unit in claims.

In the present embodiment 1, it is assumed that both the solar panel 1 and the storage battery 2 are provided as distributed power supplies using natural energy. It is not necessarily essential to provide both of them, but needless to say, one of them may be provided or another energy creating device (for example, a wind power generator or a fuel battery) may be provided.

In the present embodiment 1, the case of using a stationary battery as the storage battery 2 will be described. However, without limitation thereto, the same effect is provided even in the case of using, for example, a battery of an electric automobile. In the case of using a lithium ion battery, a battery management unit (BMU) provided in the battery manages the state of charge, whether or not charge or discharge can be performed, the maximum charge current in charging, and the like, and sends them to the second control circuit 18. In the present embodiment 1, for simplification of the description, it is assumed that the second control circuit 18 manages the state of charge, whether or not charge or discharge can be performed, the maximum charge current in charging, and the like. Further, in the present embodiment 1, for simplification of the description, it is assumed that controls are implemented by means of hardware. However, without limitation thereto, the same effect is provided even in the case of realizing all or some of the above circuits by means of software. The functions of the above circuits may be divided into software and hardware to realize the same functions.

Next, a specific operation of the power conversion device 10 having the above configuration will be described.

First, operation of the power conversion device 10 in normal operation, i.e., in the case where power is normally supplied from the power system 3 will be described.

When the power conversion device 10 is activated, the first control circuit 14 confirms whether or not power is generated in the solar panel 1. Specifically, the first control circuit 14 confirms whether or not voltage of the solar panel 1 outputted from the voltmeter 11 exceeds a predetermined value. If the voltage exceeds the predetermined value, the first control circuit 14 notifies the third control circuit 22 that power generation by the solar panel 1 can be performed.

When having received the notification, the third control circuit 22 confirms that the power system 3 is not in a power outage state. When it is confirmed that the power system 3 is not in a power outage state, the third control circuit 22 activates the DC/AC conversion circuit 21 and commands the first control circuit 14 to start power generation by the solar panel 1.

In the present embodiment 1, in normal operation, DC bus voltage of the DC bus 25 is managed through the DC/AC conversion circuit 21. As for power regenerated to the power system 3, the DC/AC conversion circuit 21 is managed through current control, whereby the entire system is operated.

When the third control circuit 22 has outputted the command to start power generation by the solar panel 1, the fourth control circuit 34 in the first control circuit 14 commands the MPPT control circuit 31 to start maximum power point tracking control (hereinafter, referred to as MPPT control) for the solar panel 1. Hereinafter, the MPPT control method will be briefly described.

In the MPPT control, a so-called hill climbing method is applied. That is, whether the last command value has been increased or decreased as compared to the command value before the last is managed. Then, generated power of the solar panel 1 measured at this time is compared to generated power of the solar panel 1 measured at the last time, and if the power generation amount has increased, the command value is changed in the same direction as at the last time. Specifically, as a result of the measurement of the power generation amount at this time, in the case where the power generation amount of the solar panel 1 has increased, if the command value at the last time has increased as compared to the command value before the last, the command value at this time is controlled to increase. If the command value at the last time has decreased as compared to the command value before the last, the command value at this time is controlled to decrease.

On the other hand, in the case where the power generation amount has decreased as a result of comparison between generated power of the solar panel 1 measured at this time and generated power of the solar panel 1 measured at the last time, if the command value at the last time has increased as compared to the command value before the last, the command value at this time is controlled to decrease, and if the command value at the last time has decreased as compared to the command value before the last, the command value at this time is controlled to increase. Through such control, the solar panel 1 is controlled to maximize the output power.

In the first DC/DC conversion circuit 13, a step-up circuit provided therein is controlled on the basis of a command value outputted from the first control circuit 14, whereby the first DC/DC conversion circuit 13 converts DC voltage (for example, in the case of generating power at 4 kW, 200V to 230V) outputted from the solar panel 1, to DC bus voltage (for example, 350V) for the DC bus 25, and outputs the DC bus voltage.

When the first DC/DC conversion circuit 13 starts to supply generated power of the solar panel 1, the third control circuit 22 controls the DC/AC conversion circuit 21 to output (regenerate) the power generated by the solar panel 1 to the power system 3. Specifically, while DC bus voltage of the DC bus 25 is monitored, if the DC bus voltage exceeds a control target value, the power is outputted in synchronization with an AC voltage waveform supplied from the power system 3.

The third control circuit 22 also outputs a command for charging and discharging of the storage battery 2. When having received a request for transmitting status information about the storage battery 2 from a power management server (not shown) (hereinafter, referred to as "HEMS" (Home Energy Management System)) in home, the third control circuit 22 acquires status information such as whether or not charge or discharge can be performed, and the state of charge, about the storage battery 2, from the second control circuit 18. In response thereto, the third control circuit 22 reports, to the HEMS (not shown), a result of the determination as to whether or not charge or discharge can be performed, and the maximum discharge power amount or the maximum charge power amount. On the basis of the status information, the HEMS (not shown) that has received the report issues a discharge command (including a discharge power amount command value) or a charge command (including a charge power amount command value) for the storage battery 2, to the third control circuit 22.

When having received the discharge command from the HEMS (not shown), the third control circuit 22 outputs a discharge command and a discharge power amount to the second control circuit 18. When having received the discharge command from the third control circuit 22, the fifth control circuit 44 in the second control circuit 18 outputs a discharge start command and the discharge power amount to the discharge control circuit 42. At this time, the fifth control circuit 44 also outputs a command to the switch circuit 43 so as to select a control command value outputted from the discharge control circuit 42.

When having received the discharge start command outputted from the fifth control circuit 44, the discharge control circuit 42 accordingly calculates discharge power from the storage battery 2 on the basis of voltage information and current information inputted from the voltmeter 15 and the ammeter 16, and performs control so that a result of the calculation becomes the discharge power amount command value. In addition, the discharge control circuit 42 acquires status information about the second DC/DC conversion circuit 17, and sends the acquisition result to the fifth control circuit 44.

The fifth control circuit 44 regularly sends status information about the second DC/DC conversion circuit 17 and status information about the storage battery 2, to the third control circuit 22. When the control command value from the discharge control circuit 42 is inputted to the second DC/DC conversion circuit 17 via the switch circuit 43, the second DC/DC conversion circuit 17 converts DC voltage (for example, in household case, 140V to 210V) outputted from the storage battery 2, to DC bus voltage (for example, 350V) for the DC bus 25, and outputs the DC bus voltage. The output of the storage battery 2 which has been thus converted to DC voltage is supplied to the power system 3 via the DC/AC conversion circuit 21.

On the other hand, when having received the charge command from the HEMS (not shown), the third control circuit 22 outputs a charge command and a charge power amount (charge current) to the second control circuit 18. When having received the charge command from the third control circuit 22, the fifth control circuit 44 in the second control circuit 18 accordingly outputs a charge start command and the charge power amount to the charge control circuit 41.

At this time, the fifth control circuit 44 also outputs a command to the switch circuit 43 so as to select a control command value outputted from the charge control circuit 41. When having received the charge start command from the third control circuit 22, the charge control circuit 41 performs control so that charge current to the storage battery 2 becomes a command value (a value obtained by dividing the charge power amount command value by storage battery voltage information inputted from the voltmeter 15), on the basis of current information inputted from the ammeter 16.

Here, when the storage battery 2 is charged, if the charge power is covered by power generation by the solar panel 1, surplus power in the charging is regenerated to the power system 3. On the other hand, if the charge power cannot be covered because of shortage of generated power of the solar panel 1, the necessary power is supplied from the power system 3. Specifically, if DC bus voltage of the DC bus 25 outputted from the voltmeter 19 is lower than a control target value, the third control circuit 22 takes power (running power) from the power system 3 into the power conversion device 10.

Thus, in normal operation, power-running and regeneration are switched on the basis of DC bus voltage of the DC bus 25 detected by the voltmeter 19. The third control circuit 22 detects whether or not the power system 3 is in a power outage state, on the basis of: measurements results outputted from the voltmeter 23 and the ammeter 24 which measure system voltage and system current of the power system 3; and the output power phase of output power outputted to the power system 3.

When having detected power outage of the power system 3, the third control circuit 22 outputs commands to the first control circuit 14 and the second control circuit 18 to temporarily stop operation of the first DC/DC conversion circuit 13 and operation of the second DC/DC conversion circuit 17. When having received the commands, the first control circuit 14 and the second control circuit 18 stop operation of the first DC/DC conversion circuit 13 and operation of the second DC/DC conversion circuit 17, and output this fact to the third control circuit 22. When having confirmed that operation of the first DC/DC conversion circuit 13 and operation of the second DC/DC conversion circuit 17 are stopped, the third control circuit 22 accordingly temporarily stops operation of the DC/AC conversion circuit 21.

Thus, when power outage of the power system 3 is detected, operations of the first and second DC/DC conversion circuits 13 and 17 and the DC/AC conversion circuit 21 are all temporarily stopped. The reason therefor is, in the present embodiment 1, to ensure that only one power conversion device 10 generates the reference AC voltage during power outage. Therefore, it is necessary to once create a situation in which AC voltage is not supplied at all to the power system 3.

Next, self-sustained operation of the power conversion devices 10 at the time of power outage will be described.

When power outage of the power system 3 is detected, the switch 5 is opened to disconnect the power conversion devices 10a to 10n and the loads 4a to 4x in home from the power system 3. When the disconnection from the power system 3 has been confirmed, the power conversion devices 10a to 10n start self-sustained operation.

In the present embodiment 1, one of the power conversion devices 10a to 10n is selected to be operated as a source for generating the reference AC voltage in self-sustained operation. Hereinafter, the power conversion device 10 operating as a source for generating the reference AC voltage is referred to as a master, and the other power conversion devices 10 operating in synchronization with the phase of the reference AC voltage outputted from the master are referred to as slaves. In the present embodiment 1, it is assumed that a plurality of slaves operate in coordination with one master.

Here, basically, a power conversion device 10 having the storage battery 2 is preferentially selected as a master. The reason is as follows.

The power conversion device 10 as a master needs to operate the DC/AC conversion circuit 21 through voltage control in order to generate the reference AC voltage. Here, in the case where the DC/AC conversion circuit 21 is operated through voltage control in the power conversion device 10 (PV power conditioner) that does not have the storage battery 2 but has only the solar panel 1 as a DC power supply, DC bus voltage of the DC bus 25 is managed by the first DC/DC conversion circuit 13. In this case, in order to control DC bus voltage of the DC bus 25 to be predetermined voltage, the first DC/DC conversion circuit 13 needs to be operated through voltage control in which DC bus voltage of the DC bus 25 is controlled to be constant, not through MPPT control for maximally extracting power generated by the solar panel 1. Thus, in the case where the first DC/DC conversion circuit 13 connected to the solar panel 1 is operated through voltage control, there is a problem that MPPT control for maximally extracting power generated by the solar panel 1 cannot be performed.

Therefore, in the present embodiment 1, master selection at the time of activation is performed so that at least the power conversion device 10 not having the storage battery 2 is prevented from becoming a master as much as possible. Thus, the power conversion device 10 not having the storage battery 2 is less likely to become a master, and an effect of allowing generated power of the solar panel 1 to be maximally utilized even in self-sustained operation is provided.

Hereinafter, with reference to a flowchart shown in FIG. 6, the procedure of master/slave selection of the power conversion devices 10 in the present embodiment 1 will be described. In the following description, a character S denotes each process step.

When power outage is detected (S1), next, the power conversion device 10 confirms the type of the distributed power supply that is connected (S2). Specifically, the power conversion device 10 confirms what type of distributed power supply, e.g., the solar panel 1, the storage battery 2, or a fuel battery (not shown), is connected.

Next, when the type of the distributed power supply that is connected has been confirmed, a priority is set (S3). That is, in the present embodiment 1, priorities are determined such that the highest priority is given to the power conversion device 10 having the storage battery 2, and subsequently, the electric automobile and then the solar panel are prioritized. In the case where there are a plurality of power conversion devices 10 having the storage batteries 2, standby times are randomly set using a random number table or the like so as to cause a difference in time taken for startup in self-sustained operation among the devices 10, as described later.

The reason that, as described above, the highest priority is given to the power conversion device 10 having the storage battery 2, and subsequently, the electric automobile and then the solar panel are prioritized, is as follows.

In self-sustained operation, in the case where the power conversion device 10 as a master generates the reference AC voltage, it is necessary to operate the DC/AC conversion circuit 21 through voltage control. The voltage control for the DC/AC conversion circuit 21 described in the present embodiment 1 is performed so that the waveform of AC voltage outputted from the DC/AC conversion circuit 21 coincides with the waveform of the reference AC voltage generated in the third control circuit 22. Therefore, DC bus voltage of the DC bus 25 in the power conversion device 10 needs to be managed by either the first DC/DC conversion circuit 13 or the second DC/DC conversion circuit 17. In this case, in order to maximally extract power generated by the solar panel 1, it is necessary to perform MPPT control for the first DC/DC conversion circuit 13. Therefore, DC bus voltage of the DC bus 25 is mainly managed by the second control circuit 18 provided for the second DC/DC conversion circuit 17.

In the case where DC bus voltage of the DC bus 25 is smaller than the control target value, power that cannot be covered by power generated by the solar panel 1 is discharged from the storage battery 2 to supply the power. In contrast, in the case where DC bus voltage is higher than the target voltage, considering that there is surplus power in generated power of the solar panel 1, the storage battery 2 is charged with the surplus power. Also in the case where the power conversion device 10 has only the storage battery 2, in self-sustained operation, if DC bus voltage of the DC bus 25 is higher than the control target value and there is surplus power, the storage battery 2 is charged with the surplus power.

Thus, by activating the power conversion device 10 having the storage battery 2 as a master, in the case where the solar panel 1 is connected in the same power conversion device 10, or also in the case where the solar panel 1 is connected in another power conversion device 10, generated power can be maximally extracted from both solar panels 1, to be supplied to the power system 3. Therefore, generated power of each solar panel 1 can be maximally utilized.

As for an electric automobile, in the case where a user stops driving thereof and uses the electric automobile as a storage battery, the same operation can be performed, but in the case of using the storage battery for driving the automobile (including the case of using the storage battery for driving the automobile after self-sustained operation is started), usage as a master is not allowed. Therefore, the priority of the power conversion device 10 provided in the electric automobile is lowered.

Returning to FIG. 6, after the priority has been set in the above S3, the power conversion device 10 sets a standby time on the basis of the priority set in S3 (S4). Here, the standby time means a time taken until the power conversion device 10 starts up in self-sustained operation since power outage has been detected. In the case where there are a plurality of power conversion devices 10 for the power system 3, if the power conversion devices 10a to 10n each arbitrarily start up after the power outage detection without providing standby times, a plurality of masters start up in the power system 3, and a smooth coordination operation cannot be performed.

Considering the above, in the present embodiment 1, first, for each power conversion device 10, a random time (for example, a time of 5 seconds to 20 seconds) is set using a random number table or the like, to cause a difference in time taken for startup in self-sustained operation among the devices 10. Thus, even if there are a plurality of power conversion devices 10 having the storage batteries 2, it is possible to cause a time difference among the devices 10. Next, an offset time (for example, 0 seconds for the storage battery 2 having the highest priority, 20 seconds for the electric automobile, 40 seconds for the solar panel 1) is set on the basis of the priority set in S3, the offset time based on the priority is added to the determined random time, and the resultant time is finally set as the standby time.

After the standby time has been set in the above S4, each power conversion device 10 confirms whether the standby time has already elapsed (S5). If the standby time has not elapsed yet, the power conversion device 10 checks the power system 3 to confirm whether another power conversion device 10 is activated as a master (S8). Here, if another power conversion device 10 is activated as a master, the power conversion device 10 starts activation as a slave. On the other hand, if any other power conversion devices 10 are not activated as a master in S8, the process returns to S5. If the standby time has elapsed in S5, the power conversion device 10 confirms whether another power conversion device 10 is activated as a master (S6). Here, if another power conversion device 10 is activated as a master, the power conversion device 10 starts activation as a slave (S9). On the other hand, if any other power conversion devices 10 are not activated as a master, the power conversion device 10 starts activation as a master (S7).

The confirmation as to whether another power conversion device 10 is activated as a master in S6 or S8 is performed on the basis of whether AC voltage is being generated in the power system 3. If AC voltage is being generated, the effective voltage thereof is calculated, and if the effective voltage is equal to or greater than a predetermined value, it is determined that another power conversion device 10 is activated as a master.

Since the master is determined as described above, even in such a distributed power supply system in which a plurality of power conversion devices 10 are provided as shown in FIG. 1, by appropriately shifting the activation timings of the power conversion devices 10 to be activated as a master, a plurality of power conversion devices 10 can be prevented from being activated as masters simultaneously, and it becomes possible to cause the plurality of power conversion devices 10 to supply power to the power system 3 in synchronization with AC voltage generated by one master in self-sustained operation. In shifting the activation time of each power conversion device 10, the power conversion device 10 adds an offset time depending on the type of a power supply device recorded therein in advance, thereby providing an effect that the power conversion device 10 to which a power supply device having a high priority is connected can be preferentially activated as a master.

Figure 7:
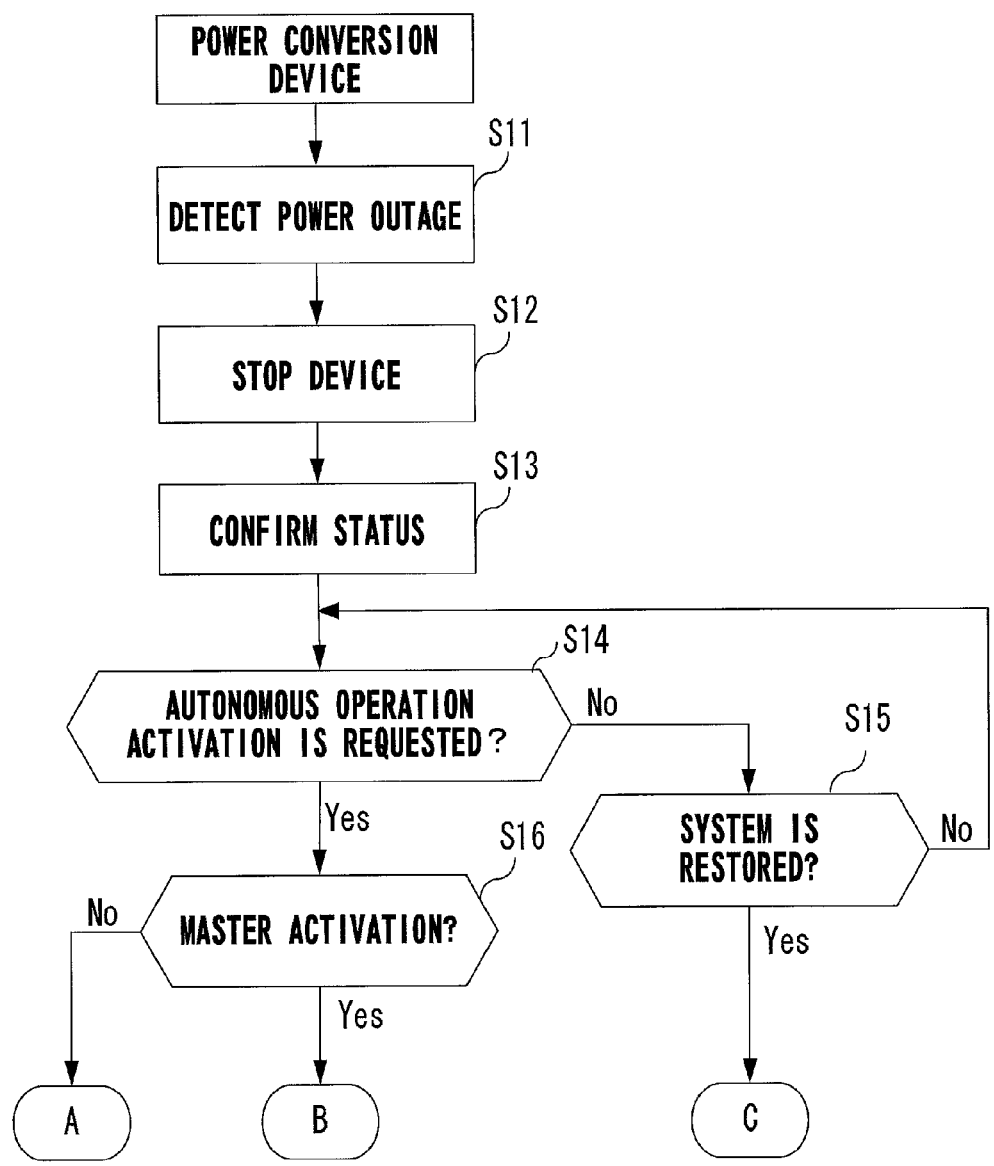
FIG. 7 is a flowchart showing an activation process in self-sustained operation, of the power conversion device in embodiment 1.
Figure 8:
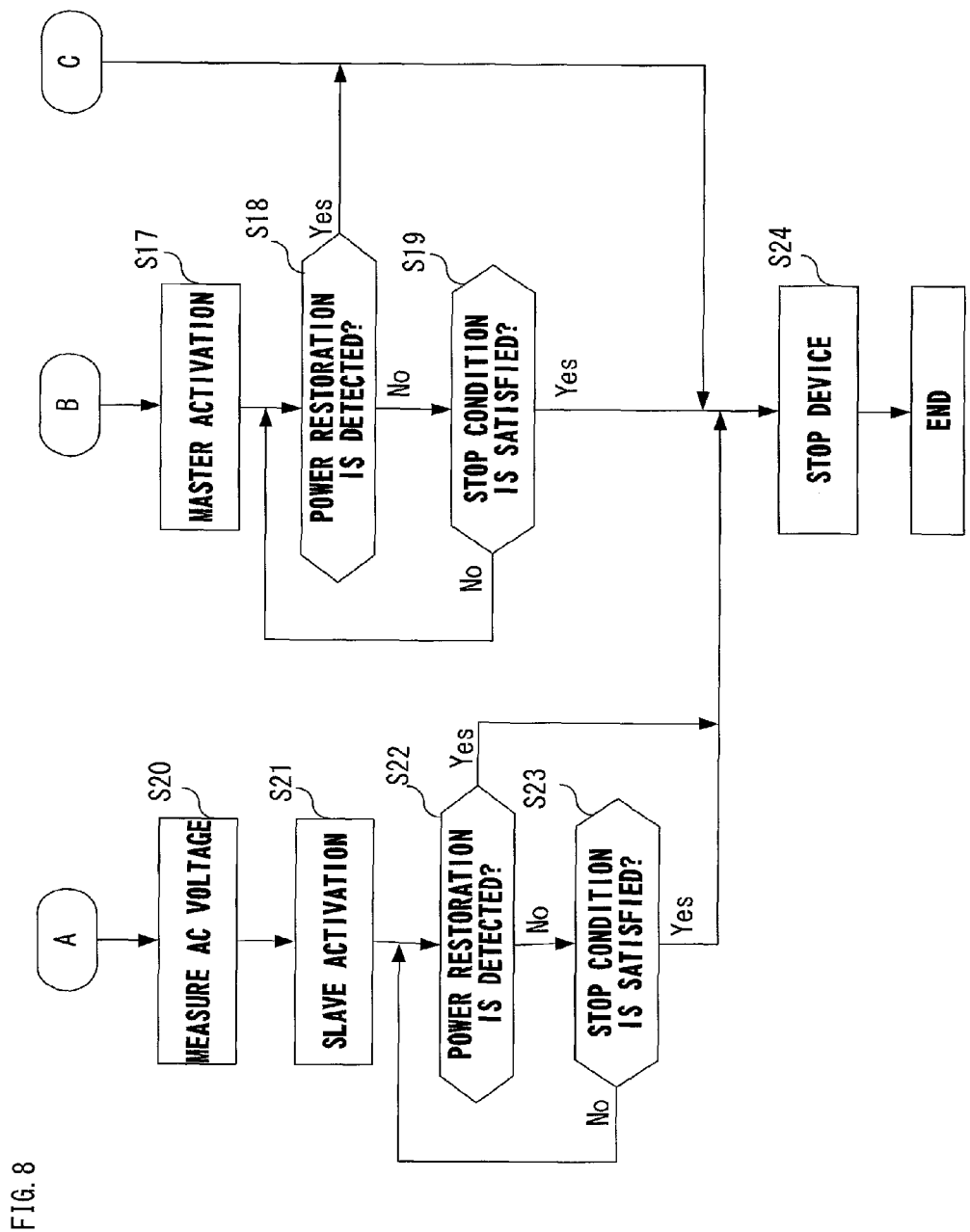
FIG. 8 is a flowchart subsequent to the process in FIG. 7, showing the activation process in self-sustained operation, of the power conversion device in embodiment 1.

Next, with reference to flowcharts in FIG. 7 and FIG. 8, the activation procedure of each power conversion device 10 in self-sustained operation will be described.

When power outage is detected (S11), the sixth control circuit 57 provided in the third control circuit 22 stops operation of its own power conversion device 10 (S12), and confirms the status (panel voltage of the solar panel 1, the state of charge of the storage battery 2, and the like) of the power supply device connected to the power conversion device 10 (S13). After the status of the power supply device has been confirmed, a user's command to shift to self-sustained operation is waited for (S14). In the present embodiment 1, the user requests self-sustained operation via the HEMS (not shown), whereby shifting to self-sustained operation is performed.

When the self-sustained operation request is inputted from the user, the HEMS commands each power conversion device 10 to start self-sustained operation. At this time, the HEMS opens the switch 5 to disconnect the power conversion devices 10 and the loads 4 from the power system 3.

On the other hand, if the self-sustained operation command is not inputted from the user in S14, whether the power system 3 is restored is confirmed (S15). If the power system 3 is restored, in order to return to normal operation, each power conversion device 10 is once stopped (S24) and activated again. If the power system 3 is not restored, the process returns to S14.

Figure 6:
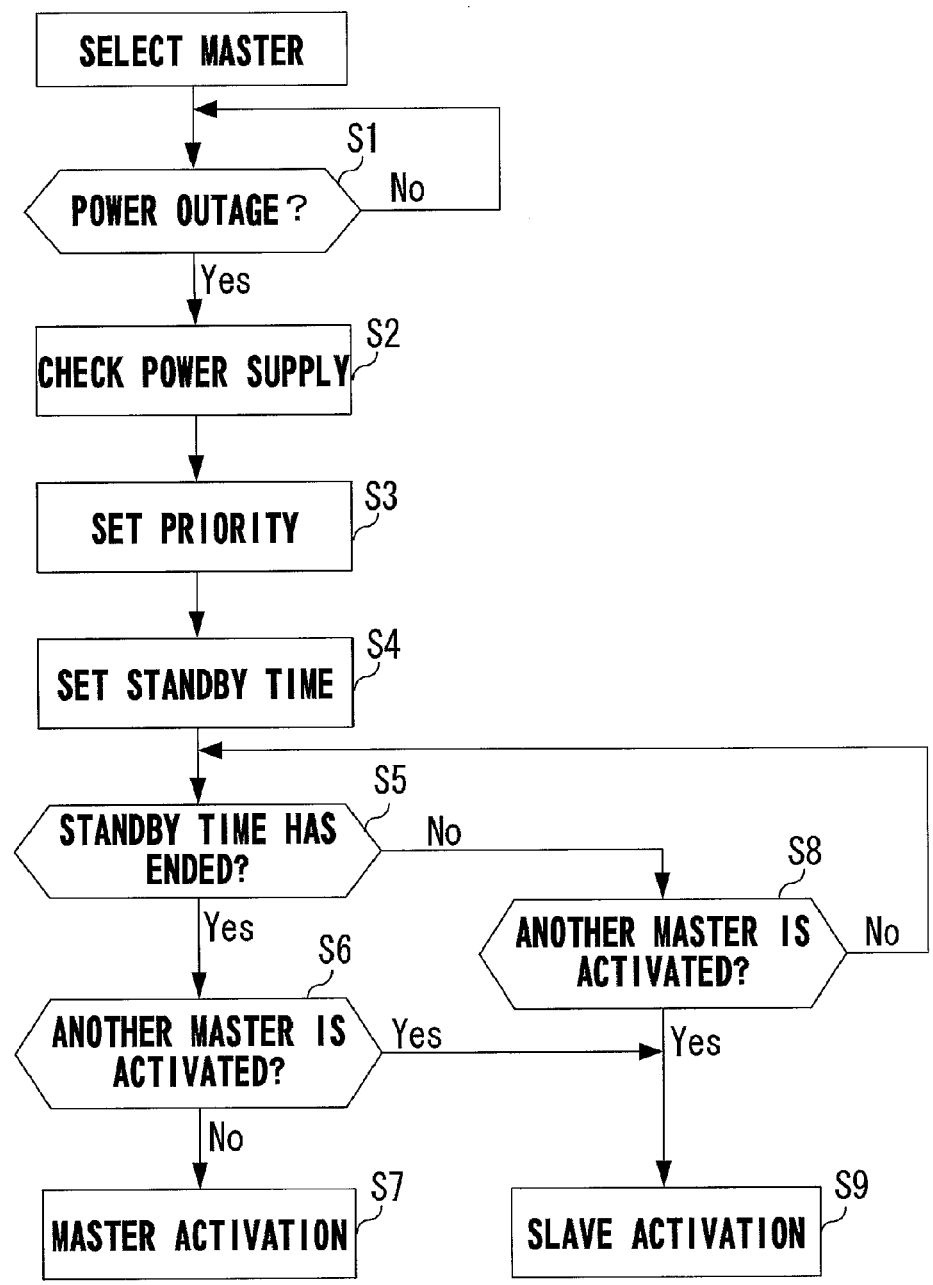
FIG. 6 is a flowchart showing the procedure of a method for selecting a master and a slave among the power conversion devices in embodiment 1 of the present invention.

On the other hand, if the self-sustained operation activation request is inputted from the HEMS in the above S14, each power conversion device 10 confirms whether to be activated as a master or to be activated as a slave, in accordance with the flowchart shown in FIG. 6 (S16). If the power conversion device 10 is to be activated as a master, the power conversion device 10 is activated as a master in accordance with flowcharts shown in FIG. 9 and FIG. 10 described later (S17). Here, after the master activation is completed, power restoration detection is performed (S18). Here, if power restoration is detected, the power conversion device 10 is once stopped (S24), and is activated again to return to normal operation.

On the other hand, if power restoration is not detected in S18, whether or not a stop condition for the power conversion device 10 is satisfied is confirmed (S19). That is, in such a case where the solar panel 1 does not generate power and the state of charge of the storage battery 2 is equal to or lower than a predetermined power storage amount or where overvoltage or overcurrent is detected in the power conversion device 10, the power conversion device 10 cannot be normally activated. Therefore, whether or not such a stop condition is satisfied is confirmed. If any stop condition is not satisfied, the process returns to S18 to perform detection for power restoration. On the other hand, if a stop condition for the power conversion device 10 is satisfied, operation of the power conversion device 10 is stopped (S24).

On the other hand, if the power conversion device 10 is not to be activated as a master in the above S16, the power conversion device 10 measures AC voltage (S20), to confirm whether the reference AC voltage is being outputted from another power conversion device 10 that has become a master. Specifically, the power conversion device 10 measures effective voltage of the power system 3, and if the effective voltage is equal to or greater than a predetermined value, it is determined that a master has been already activated. When having confirmed the master activation, the power conversion device 10 starts slave activation in accordance with flowcharts shown in FIG. 11 and FIG. 12 described later (S21).

After having completed the slave activation, the power conversion device 10 confirms whether the power system 3 is restored (S22). If power restoration is detected, operation of the power conversion device 10 is stopped (S24). On the other hand, if power restoration is not detected in S22, whether a stop condition for the power conversion device 10 is satisfied is confirmed (S23). The confirmation for a stop condition is the same as in the case of a master described above (case of S19). If any stop condition for the power conversion device 10 is not satisfied in S23, the process returns to S22. If a stop condition is satisfied in S23, operation of the power conversion device 10 is stopped (S24).

Figure 9:
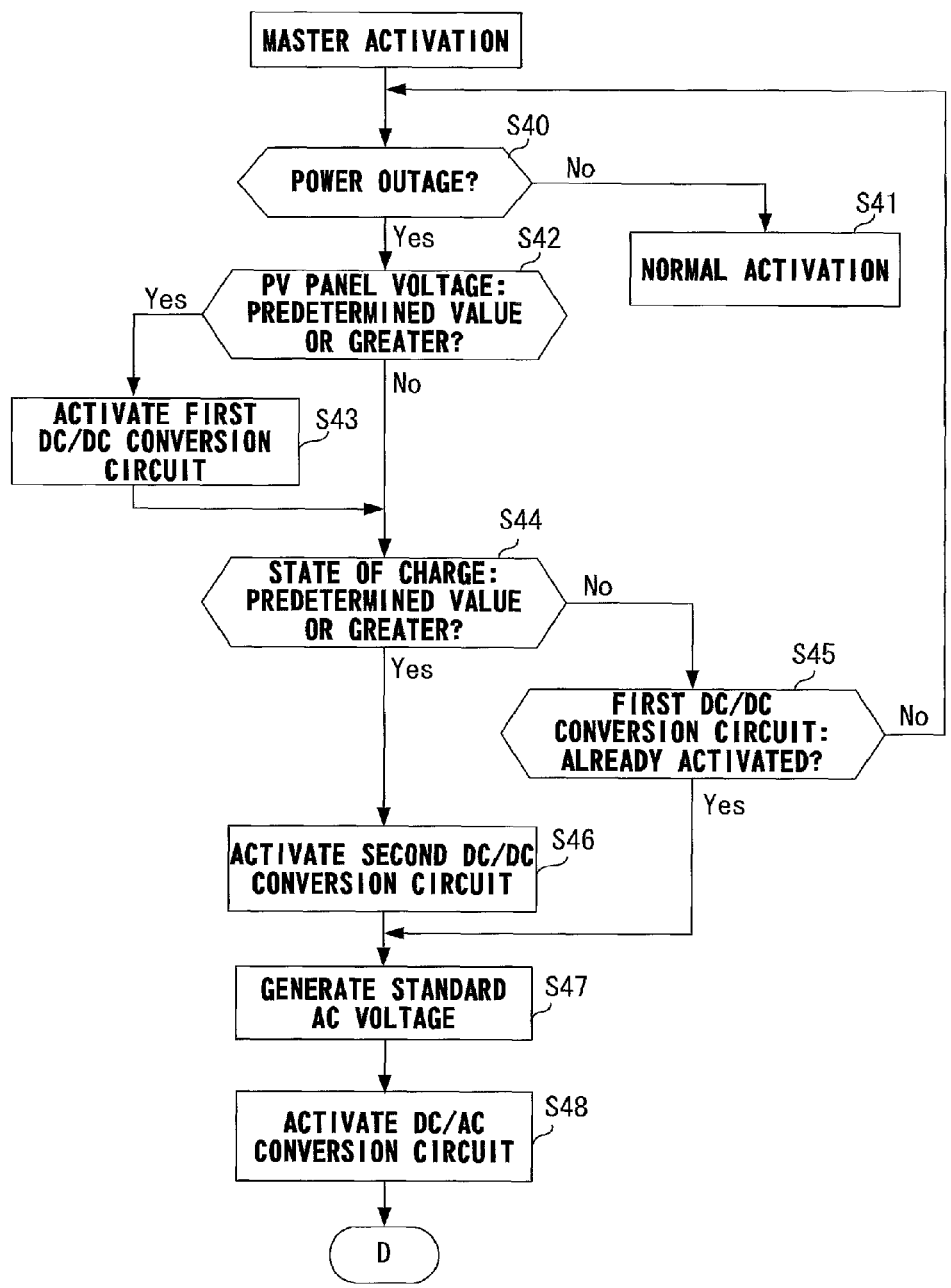
FIG. 9 is a flowchart showing operation of the power conversion device as a master in self-sustained operation, in embodiment 1.

Next, with reference to flowcharts in FIG. 9 and FIG. 10, the details of the procedure of master activation (process in S17 in FIG. 8) will be described.

When master activation is started, the third control circuit 22 confirms system voltage outputted from the voltmeter 23, to determine whether power outage is occurring (S40). Specifically, the effective voltage is measured, and if the effective voltage is smaller than a predetermined value, it is determined that power outage is occurring. If it is determined that power outage is not occurring, the power conversion device 10 is activated again to return to normal operation (S41).

On the other hand, if it is determined that power outage is occurring in the above S40, the third control circuit 22 outputs a request for confirming whether panel voltage of the solar panel (in the flowchart, written as PV panel) 1 is equal to or greater than a predetermined value so that power generation can be performed, to the fourth control circuit 34 in the first control circuit 14. When having received the request, the fourth control circuit 34 commands the MPPT control circuit 31 to confirm whether output voltage of the solar panel 1 outputted from the voltmeter 11 is equal to or greater than a predetermined value. In response to the command, the MPPT control circuit 31 confirms voltage of the solar panel 1 to determine whether power generation can be performed, and sends a result thereof to the fourth control circuit 34 (S42).

The fourth control circuit 34 sends the determination result to the third control circuit 22. Here, if the determination result indicates that power generation can be performed, in order to stabilize DC bus voltage of the DC bus 25, the fourth control circuit 34 commands the voltage control circuit 32 to perform activation in a voltage control mode, and commands the switch circuit 33 to select output of the voltage control circuit 32, thereby activating the first DC/DC conversion circuit 13 (S43).

After the first DC/DC conversion circuit 13 has been activated in the above S43, or if voltage of the solar panel 1 is equal to or smaller than the predetermined voltage in S42 (or the solar panel 1 is not connected), next, the sixth control circuit 57 in the third control circuit 22 commands the fifth control circuit 44 in the second control circuit 18 to discharge power from the storage battery 2. When having received the discharge command, the fifth control circuit 44 commands the discharge control circuit 42 to confirm whether the voltage outputted from the voltmeter 15 is equal to or greater than a predetermined value (S44).

In response to the command, the discharge control circuit 42 confirms voltage of the storage battery 2 to determine whether the discharge can be performed, and sends a result thereof to the fifth control circuit 44. The fifth control circuit 44 sends the determination result to the third control circuit 22, and if the discharge can be performed, in order to stabilize DC bus voltage of the DC bus 25, the fifth control circuit 44 commands the discharge control circuit 42 to perform activation in a voltage control mode, and commands the switch circuit 43 to select output of the discharge control circuit 42, thereby the fifth control circuit 44 activates the second DC/DC conversion circuit 17 (S46).

If voltage of the storage battery 2 is equal to or smaller than the predetermined voltage (or the storage battery 2 is not connected) in the above S44, whether the first DC/DC conversion circuit 13 for the solar panel 1 has been already activated is confirmed (S45), and if the first DC/DC conversion circuit 13 has not been activated yet, the process returns to S40.

On the other hand, if it is determined that the state of charge of the storage battery 2 is equal to or greater than the predetermined value and the discharge can be performed in the above S44, and the second DC/DC conversion circuit 17 has been already activated in S46, or if it is determined that the first DC/DC conversion circuit 13 has been already activated in the above S45, the sixth control circuit 57 in the third control circuit 22 for controlling the DC/AC conversion circuit 21 outputs a command for generating an AC voltage waveform to be outputted as a master.

That is, in the case where the power conversion device 10 serves as a master, the sinewave generating circuit 51 is commanded to generate a sinewave as a reference. The sixth control circuit 57 outputs, to the reference signal selecting circuit 52, a switch command signal so as to select output of the sinewave generating circuit 51 and to output the same. In response to the switch command signal, the reference signal selecting circuit 52 switches output of the voltmeter 23 which measures AC voltage inputted from the system, to output of the sinewave generating circuit 51.

The phase detection circuit 53 detects the phase of the AC voltage waveform outputted from the reference signal selecting circuit 52. As a phase detection method in this case, here, a zero cross point of the AC voltage waveform outputted from the reference signal selecting circuit 52 is detected, and a time at which the zero cross point is detected is outputted to the reference AC voltage waveform generating circuit 54 at the subsequent stage. The reference AC voltage waveform generating circuit 54 generates the reference AC voltage by correcting the phase of AC voltage generated therein on the basis of information about the detection time of the zero cross point (S47). The details of a phase detection process by the phase detection circuit 53 will be described later (see a flowchart in FIG. 13).

At this time, on the basis of a command from the sixth control circuit 57, the output amplitude generating circuit 55 outputs a priority factor for determining an AC voltage amplitude as a target value for AC voltage, to the multiplication circuit 56, so that the effective voltage value of the AC voltage waveform becomes, for example, 200V. The multiplication circuit 56 multiplies output of the reference AC voltage generated by the reference AC voltage waveform generating circuit 54, by the priority factor from the output amplitude generating circuit 55 as a gain. Thus, an AC voltage waveform having the AC voltage amplitude corresponding to the control target value for AC voltage is obtained. Then, a result of the multiplication is outputted to the sixth control circuit 57. The sixth control circuit 57 activates the DC/AC conversion circuit 21 so that the AC voltage waveform having the AC voltage amplitude corresponding to the control target value for AC voltage, obtained by the multiplication circuit 56, is outputted (S48), thereby the power is outputted to power lines that are released from the power system 3. When having confirmed that the power conversion device 10 is activated as a master, the other power conversion devices 10 start activation as slaves.

The subsequent process is a process after the power conversion device 10 is activated as a master, and will be described later.

Figure 11:
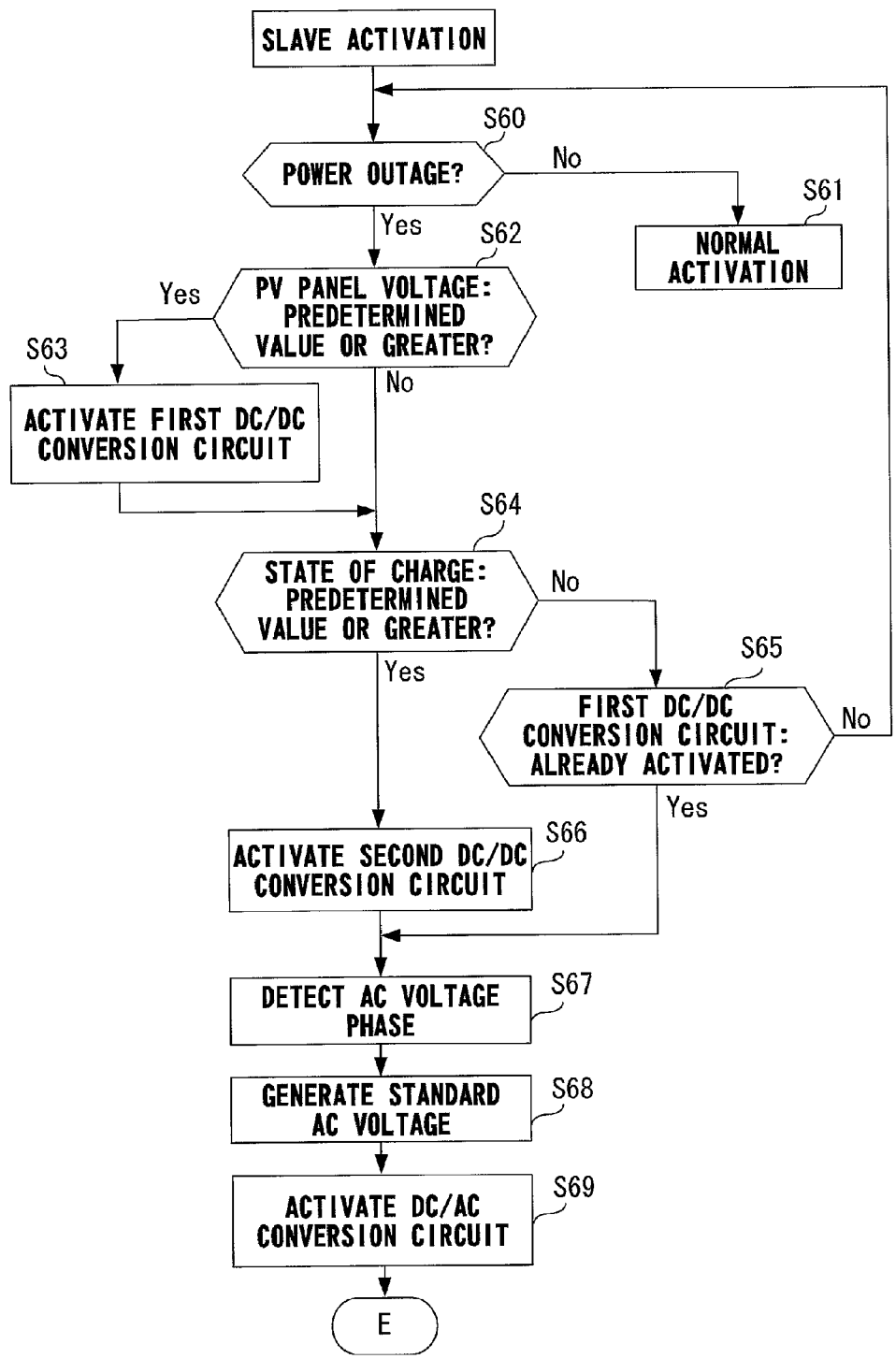
FIG. 11 is a flowchart showing operation of the power conversion device as a slave in self-sustained operation, in embodiment 1.

Next, with reference to flowcharts in FIG. 11 and FIG. 12, the details of the procedure of the slave activation (processing in S21 in FIG. 8) will be described.

When the slave activation is started, the sixth control circuit 57 provided in the third control circuit 22 confirms system voltage outputted from the voltmeter 23, to confirm whether AC voltage is being supplied from the power conversion device 10 as a master, and confirms whether a self-sustained operation activation command is issued from the HEMS (not shown) (S60). Here, if AC voltage is being supplied and a self-sustained operation activation command is not issued from the HEMS, it is determined that the system is restored, and the power conversion device 10 is activated again to return to normal operation (S61).

On the other hand, if it is determined that power outage is occurring, as in the case of master activation, the third control circuit 22 requests the fourth control circuit 34 in the first control circuit 14 to confirm whether panel voltage of the solar panel 1 is equal to or greater than a predetermined value so that power generation can be performed. When having received the request, the fourth control circuit 34 accordingly commands the MPPT control circuit 31 to confirm whether output voltage of the solar panel 1 outputted from the voltmeter 11 is equal to or greater than a predetermined value (S62). In response to the command, the MPPT control circuit 31 confirms voltage of the solar panel 1 to determine whether power generation can be performed, and sends a result thereof to the fourth control circuit 34.

The fourth control circuit 34 sends the determination result to the third control circuit 22, and if power generation can be performed, in order to stabilize DC bus voltage of the DC bus 25, the fourth control circuit 34 commands the voltage control circuit 32 to activate the first DC/DC conversion circuit 13 in a voltage control mode, and commands the switch circuit 33 to select output of the voltage control circuit 32 (S63).

After the first DC/DC conversion circuit 13 has been activated in the above S63, or if voltage of the solar panel 1 is equal to or smaller than the predetermined voltage in the above S62 (or the solar panel 1 is not connected), the sixth control circuit 57 in the third control circuit 22 commands the fifth control circuit 44 in the second control circuit 18 to discharge power from the storage battery 2. When having received the discharge command, the fifth control circuit 44 commands the discharge control circuit 42 to confirm whether voltage outputted from the voltmeter 15 is equal to or greater than a predetermined value.

In response to the command, the discharge control circuit 42 confirms voltage of the storage battery 2 to determine whether the discharge can be performed (S64), and sends a result thereof to the fifth control circuit 44. The fifth control circuit 44 sends the determination result to the third control circuit 22, and if the discharge can be performed, in order to stabilize DC bus voltage of the DC bus 25, the fifth control circuit 44 commands the discharge control circuit 42 to activate the second DC/DC conversion circuit 17 in a voltage control mode, and commands the switch circuit 43 to select output of the discharge control circuit 42, thereby the fifth control circuit 44 activates the second DC/DC conversion circuit 17 (S66).

If voltage of the storage battery 2 is equal to or smaller than the predetermined voltage (or the storage battery 2 is not connected) in the above S64, whether the first DC/DC conversion circuit 13 for the solar panel 1 has been already activated is confirmed (S65), and if the first DC/DC conversion circuit 13 has not been activated yet, the process returns to S60.

On the other hand, if it is determined that the state of charge of the storage battery 2 is equal to or greater than a predetermined value and the discharge can be performed in the above S64, and the second DC/DC conversion circuit 17 has been already activated in S66, or if it is determined that the first DC/DC conversion circuit 13 has been already activated in the above S65, the sixth control circuit 57 in the third control circuit 22 outputs a command for generating an AC voltage waveform to be outputted as a slave. That is, in the case where the power conversion device 10 serves as a slave, the sixth control circuit 57 outputs, to the reference signal selecting circuit 52, a switch command signal so as to select output of the voltmeter 23 which measures AC voltage and to output the same. In response to the switch command signal, the reference signal selecting circuit 52 selects output of the voltmeter 23 which measures AC voltage inputted from the power system 3.

Next, the phase detection circuit 53 detects the phase of the AC voltage waveform outputted from the reference signal selecting circuit 52 (S67). As a phase detection method in this case, as described above, a zero cross point of the AC voltage waveform outputted from the reference signal selecting circuit 52 is detected, and a time at which the zero cross point is detected is outputted to the reference AC voltage waveform generating circuit 54 at the subsequent stage. The reference AC voltage waveform generating circuit 54 generates the reference AC voltage by correcting the phase of an AC voltage waveform generated therein on the basis of information about the detection time of the zero cross point (S68).

Meanwhile, on the basis of a command from the sixth control circuit 57, the output amplitude generating circuit 55 outputs a priority factor for determining an AC voltage amplitude as a target value for AC voltage, to the multiplication circuit 56. The multiplication circuit 56 multiplies output of the reference AC voltage generated by the reference AC voltage waveform generating circuit 54, by the priority factor from the output amplitude generating circuit 55 as a gain. Thus, by output of the multiplication circuit 56, an AC voltage waveform having the AC voltage amplitude corresponding to the control target value for AC voltage is obtained. Then, a result of the multiplication is outputted to the sixth control circuit 57. The sixth control circuit 57 activates the DC/AC conversion circuit 21 so that the AC voltage waveform having the AC voltage amplitude corresponding to the control target value for AC voltage, obtained by the multiplication circuit 56, is outputted (S69), thereby the power is outputted to power lines that are released from the power system 3.

The subsequent process from S70 to S74 is a process after the power conversion device 10 is activated as a slave, and will be described later.

Figure 13:
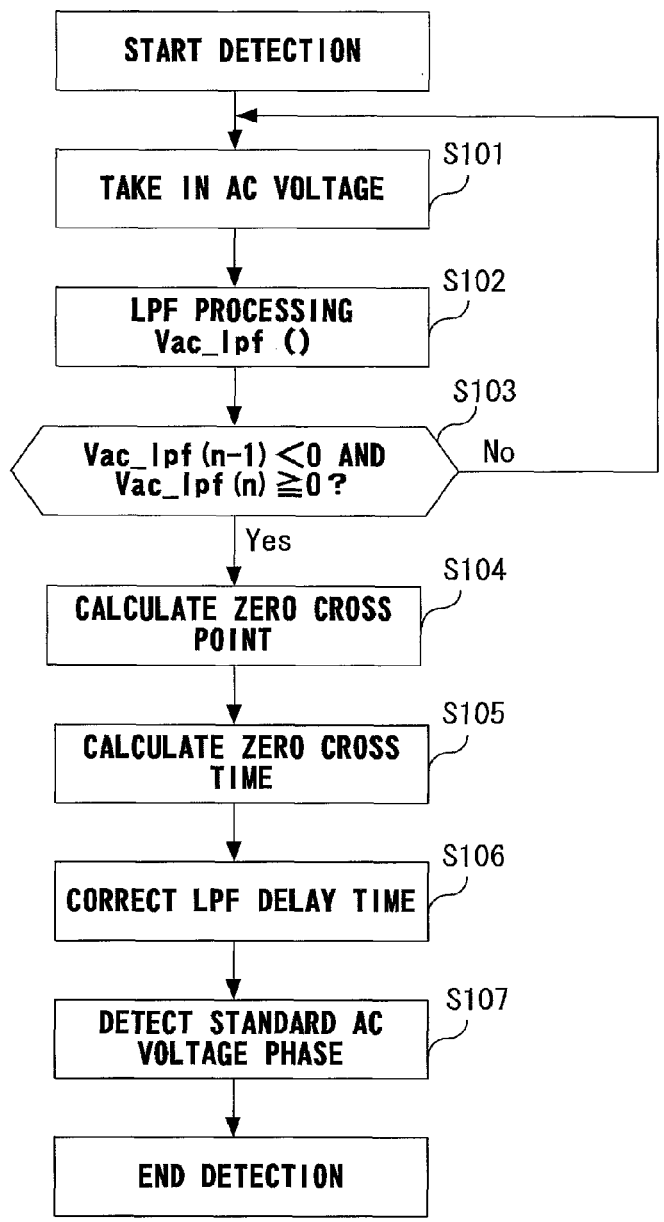
FIG. 13 is a flowchart showing the content of a process for performing phase detection on the basis of an AC voltage waveform in self-sustained operation, in embodiment 1.
Figure 14:
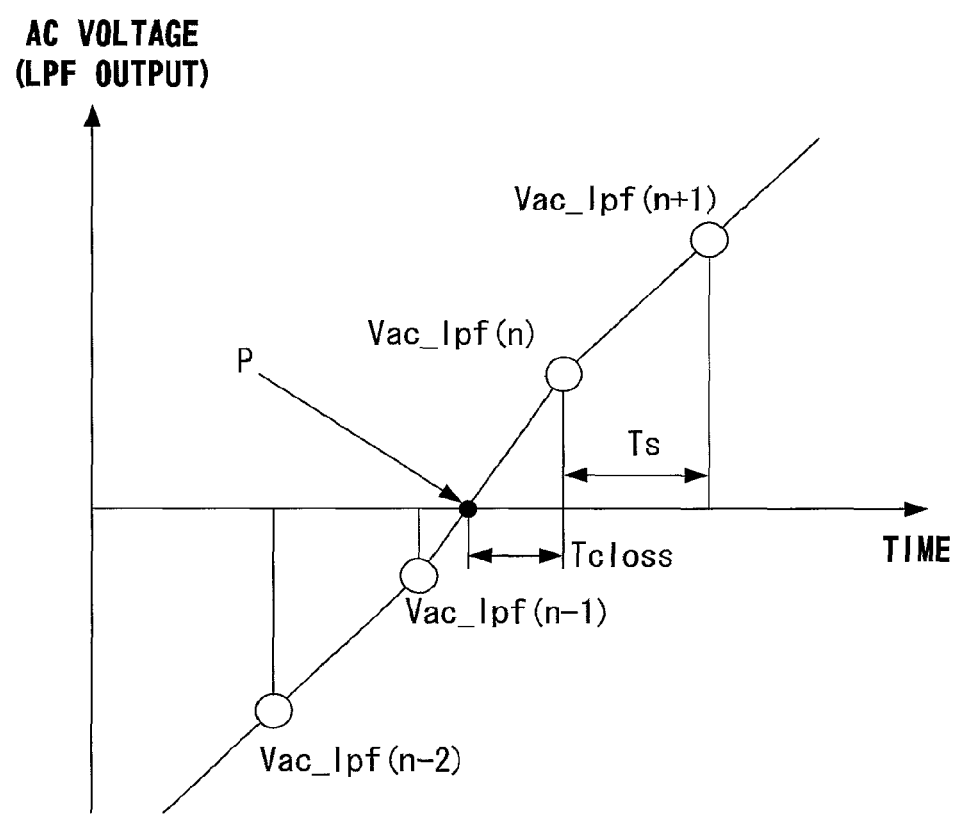
FIG. 14 is an explanation diagram showing a method for detecting a phase from the AC voltage waveform, in embodiment 1.

Next, with reference to FIG. 13 and FIG. 14, the phase detection process by the phase detection circuit 53 provided in the third control circuit 22 will be specifically described.

When AC voltage is inputted to the phase detection circuit 53, the AC voltage is taken in. In this case, as shown in FIG. 14, the waveform of the AC voltage is sampled (Vac(n)) with a certain sampling period Ts (S101).

After the sampling of the AC voltage is performed in S101, next, LPF (low pass filter) processing is performed to filter the AC voltage Vac(n) after sampling, whereby the AC voltage Vac(n) is converted to Vac_lpf(n) (S102). That is, a noise component is removed from the AC voltage Vac(n) using a first-order IIR (Infinite Impulse Response) filter, a multi-order FIR (Finite Impulse Response) filter, or the like. Next, detection of a zero cross point P is performed for the AC voltage Vac_lpf(n) from which a noise component has been removed.

The detection processing for the zero cross point P is performed at the rising of the waveform (sinewave) of AC voltage. Therefore, as shown in FIG. 14, for example, with regard to AC voltages Vac_lpf(n-1) and Vac_lpf(n) at times (n-1) and (n) which are sampling points before and after the zero cross point P, the phase detection circuit 53 determines whether a condition of Vac_lpf(n-1)<0 and Vac_lpf(n)≥0 is satisfied (S103), and detects the time of the zero cross point P that satisfies the condition, by means of linear interpolation (S104).

Specifically, first, a time width Tcloss shown in FIG. 14 is calculated on the basis of the following expression.

$$Tcloss = Ts \cdot Vac\_lpf(n) / \{Vac\_lpf(n) - Vac\_lpf(n-1)\}$$

Then, (n-Tcloss) is calculated, whereby the time of the zero cross point P is calculated (S105). Subsequently, a correction corresponding to the delay time of the LPF is added to the time of the zero cross point P (S106), and the corrected time of the zero cross point P is outputted as the phase of the reference AC voltage (S107).

In the present embodiment 1, as described above, detection of a zero cross point is performed after a noise component of the reference signal is removed by the LPF. Therefore, for example, even if the load 4 is powered before the power conversion device 10 as a slave is activated and noise overlaps AC voltage outputted from a master, a noise component can be removed by the LPF, whereby the zero cross point P can be reliably detected.

In the detection of the zero cross point P, since linear interpolation between two sampled points is performed to detect the zero cross point P in S104, the zero cross point P can be obtained with a detection accuracy equal to or higher than the frequency accuracy with which AC voltage is sampled. In addition, since the detected time of the zero cross point P is corrected in accordance with the group delay characteristics of the LPF in S106, the detection accuracy of the zero cross point P can be further improved.

In the present embodiment 1, detection of the zero cross point P is performed at the rising of the waveform (sinewave) of AC voltage. However, without limitation thereto, the detection may be performed at the falling of the sinewave, or at both the rising and falling of the sinewave.

In detection of the zero cross point P, in order to prevent the zero cross point P from being erroneously detected due to noise or the like which has not been removed by the LPF, detection of the zero cross point P may be masked during a predetermined period after the zero cross point P has been detected (for example, in the case where the AC voltage frequency is 60 Hz, the detection may be masked during a period of 16.0 ms). In this case, even if, in the vicinity of the zero cross point P, a plurality of zero cross points P are detected due to noise, the subsequently detected zero cross points P can be masked. Therefore, the power conversion device 10 as a slave can be stably operated.

In the present embodiment 1, the power conversion device 10 activated as a master also performs control so that the reference signal selecting circuit 52 selects the sinewave generated by the sinewave generating circuit 51, and the phase detection circuit 53 performs phase detection. Thus, in both the power conversion device 10 as a master and the power conversion device 10 as a slave, their phase detection circuits 53 can be realized by the same circuit configuration. Needless to say, the power conversion device 10 as a master may directly generate a sinewave without using a result of detection of a zero cross point detected by the phase detection circuit 53.

Next, necessity of proportional distribution of the supply power amounts among the power conversion devices 10 after self-sustained operation activation, will be described.

In the present embodiment 1, after self-sustained operation activation, the power conversion devices 10 do not equally supply powers to the loads 4, but the supply of power is adjusted for each power conversion device 10 in consideration of the amount of power that can be supplied.

For example, as for two power conversion devices 10a and 10b, it is assumed that one power conversion device 10a is provided with the solar panel 1a of 4 kW and the storage battery 2a with a capacity of 4 kWh and can be connected, with performance of 4 kWh, to the power system 3, and the other power conversion device 10b is provided with only the storage battery 2b of 4 kWh and can be connected, with performance of 4 kWh, to the power system 3. In this case, it is assumed that, in self-sustained operation, the load 4a demands power of 5 kW, the solar panel 1 connected to one power conversion device 10a generates power of 4 kW, and the storage battery 2 is fully charged.

In such a situation, in the case where AC voltage is generated from the DC/AC conversion circuit 21 through voltage control without performing any power control, if the power conversion device 10a and the power conversion device 10b are activated to supply power to the load 4a, the power conversion devices 10a and 10b supply the same power (in this example, 2.5 kW for each). Thus, one power conversion device 10a is to supply power to the load 4a while extracting only power of 2.5 kW even though the solar panel 1 can generate power of 4 kW. Therefore, although originally the storage battery 2 connected to the other power conversion device 10b would only need to discharge power of 1 kW, due to absence of coordination of the power conversion devices 10a and 10b, power of 2.5 kW is respectively discharged, and thus power cannot be effectively utilized. Accordingly, in the present embodiment 1, in order to remove the above disadvantage, each power conversion device 10 performs proportional distribution of the supply power amount by itself in self-sustained operation.

Hereinafter, a specific example of a proportional distribution method for the supply power amounts will be described.

As a proportional distribution method for the supply power amounts, the power conversion devices 10 may share each other's status and control their own supply power amounts. In order to share the statuses, the power conversion devices 10 need to have communication functions compliant with, for example, Echonet Lite (registered trademark).

However, in such a method, the power conversion devices 10 need to have communication functions, and in addition, if the used power amount of the load 4 which varies in real time is sharply changed, or if the insolation amount sharply changes and along with this, the power generation amount of the solar panel 1 is changed, it is difficult to follow such a change. Particularly, the period of communication between devices in the case of using Echonet Lite or the like is ordered to be several tens of seconds or longer, and therefore it is impossible to follow change in the used power amount of the load 4 or change in the power generation amount of the solar panel 1 as described above.

Figure 15:
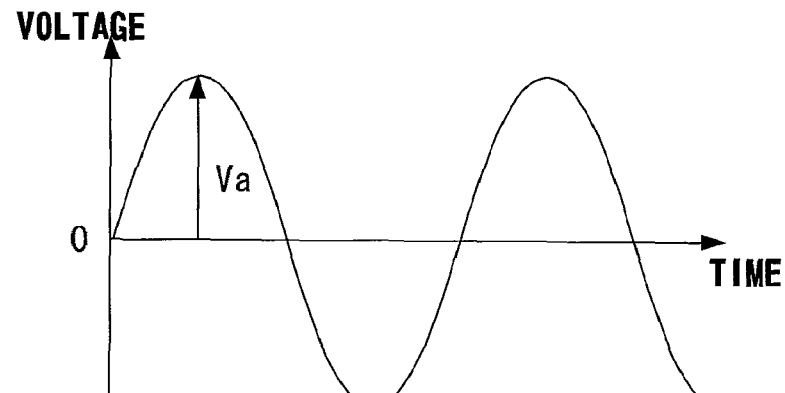
FIG. 15 is an explanation diagram showing the principle of operation for proportionally distributing the output power amounts of the power conversion devices in self-sustained operation, in embodiment 1.
Figure 15:
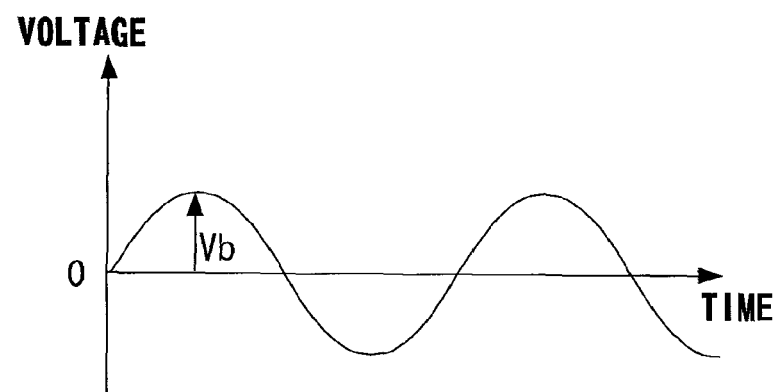
Figure 15:
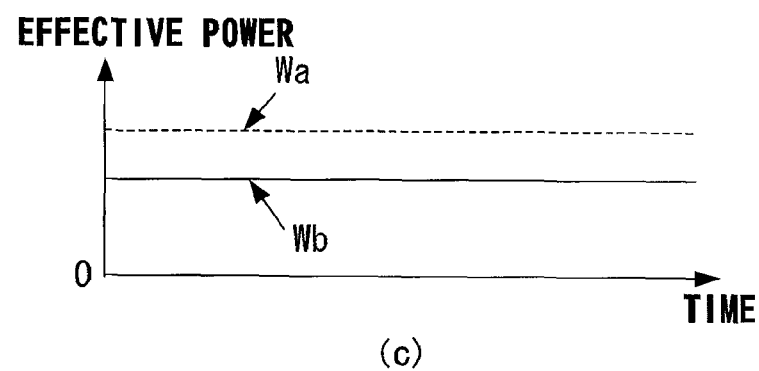

Therefore, in the present embodiment 1, a method for proportionally distributing the supply power amount on the basis of determination by each power conversion device 10 itself without providing a communication function will be described with reference to FIG. 15. Here, for simplification of the description, the method for proportionally distributing the supply power amounts in the case where two power conversion devices 10a and 10b supply powers will be described.

In the present embodiment 1, proportional distribution of the supply power amounts is performed by controlling the amplitude (hereinafter, referred to as an AC voltage amplitude) of an AC voltage waveform outputted from each power conversion device 10.

FIG. 15(a) shows an AC voltage waveform having an AC voltage amplitude of Va, outputted from the DC/AC conversion circuit 21 of the power conversion device 10a. FIG. 15(b) shows an AC voltage waveform having an AC voltage amplitude of Vb. In the case where the AC voltage amplitudes are respectively set to Va and Vb (Va>Vb), effective powers Wa and Wb outputted from the respective power conversion devices 10a and 10b are as shown in FIG. 15(c).

Figure 16:
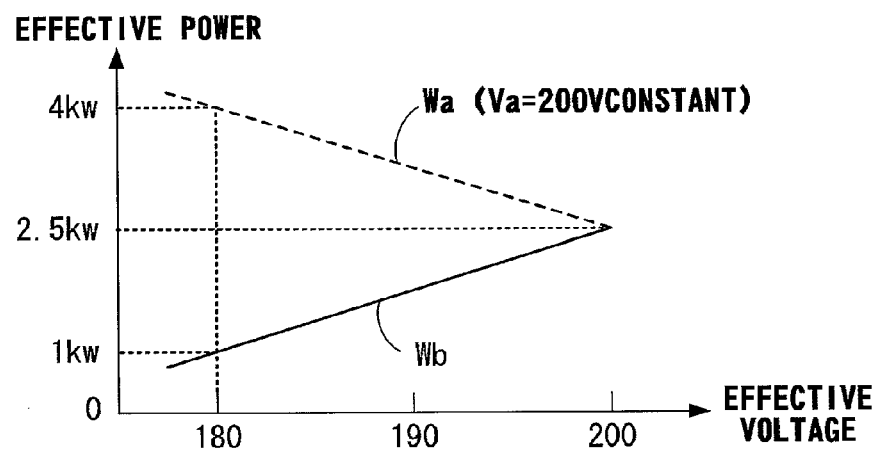
FIG. 16 is an explanation diagram showing the principle of operation for proportionally distributing the output power amounts of the power conversion devices in self-sustained operation, in embodiment 1.
Figure 16:
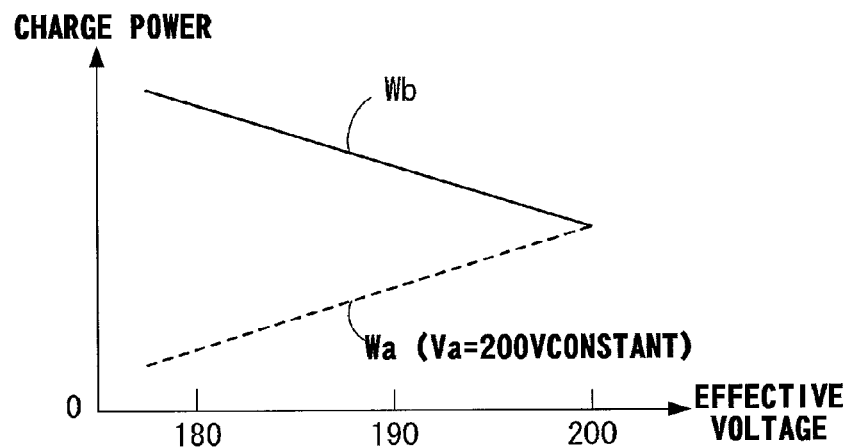

FIG. 16(a) shows a result of calculation, by simulation, of effective powers supplied from the respective power conversion devices 10 in the case where the load 4a is, for simplification, assumed to be a resistance load, effective voltage of the AC voltage waveform outputted from the power conversion device 10a is set to be constant at 200V, and effective voltage of the AC voltage waveform outputted from the power conversion device 10b is changed from 180V to 200V.

As shown in FIG. 16(a), as effective voltage outputted from the power conversion device 10b increases, the amount of supply power from the power conversion device 10b increases. By accordingly decreasing the amount of supply power from the power conversion device 10a, the supply power amounts of the power conversion devices 10a and 10b can be proportionally distributed.

For example, in FIG. 16(a), in the case where the load 4a demands power of 5 kW in self-sustained operation, if effective voltage outputted from one power conversion device 10b is 180V and effective voltage outputted from the other power conversion device 10a is 200V, for example, one power conversion device 10a supplies power of 4 kW which is the maximum value of the effective power, and the other power conversion device 10b supplies the rest of power of 1 kW. In the case where effective voltages of the power conversion devices 10a and 10b are each 200V, the effective powers can be proportionally distributed so that the power conversion devices 10a and 10b each supply effective power of 2.5 kW. Thus, in self-sustained operation, the supply power amounts can be controlled by controlling the amplitude of AC voltage outputted from the DC/AC conversion circuit 21, i.e., the effective voltage.

Similarly, FIG. 16(b) shows the amounts (the charge power amount for the storage battery 2) of powers supplied to the respective power conversion devices 10a and 10b in the case where effective voltage outputted from the power conversion device 10a is set to be constant at 200V and effective voltage outputted from the power conversion device 10b is changed from 180V to 200V.

As shown in FIG. 16(b), as effective voltage of one power conversion device 10b decreases, the charge power amount increases. Therefore, in the present embodiment 1, if effective voltage of the power conversion device 10 having the storage battery 2 with a low state of charge (SoC) is reduced, an effect of allowing the storage battery 2 with a low SoC to be preferentially charged is obtained. In addition, as shown in FIG. 16(a), if effective voltage of the storage battery with a low SoC is reduced, an effect of allowing the discharge power amount to be reduced (allowing the priority in discharging to be reduced) is obtained.

Next, the manner of setting a priority factor needed for determining the AC voltage amplitude of the AC voltage waveform outputted from the DC/AC conversion circuit 21 will be described. The priority factor in this case is just needed for performing proportional distribution of the supply power amount on the basis of determination by each power conversion device 10 itself, but is irrelevant to the priority for setting a master and a slave among the power conversion devices 10 as described above.

As for the solar panel 1 which is an energy creating device, in order to maximally utilize generated power, a priority factor is set on the basis of the actual generated power due to the present insolation amount. As for the storage battery 2, a priority factor is set on the basis of the actual state of charge (SoC) of the storage battery 2 at present, instead of the rating capacity value. Specifically, for the solar panel 1, a data table presetting the relationship between the actual generated power and the priority factor as shown in FIG. 17(a) is prepared in advance.

For the storage battery 2, a data table presetting the relationship between the state of charge (SoC) and the priority factor as shown in FIG. 17(b) is prepared in advance.

Using these data tables, as for the solar panel 1, for example, in the case where the rating power thereof is 4 kW and the solar panel 1 can generate power of 4 kW, the priority factor is set at 1, and in the case where the solar panel 1 can generate power of 2 kW, the priority factor is set at 0.5. As for the storage battery 2, for example, in the case where the state of charge (SoC) is 75%, the priority factor is set at 0.5.

Thus, in the case where the state of charge of the storage battery 2 is large, the storage battery 2 can be preferentially discharged by increasing the priority factor. Thus, in the case where a plurality of power conversion devices 10 having the storage batteries 2 supply powers in a coordinated manner in self-sustained operation, the charged power in the storage battery with a low state of charge or in the storage battery having a small capacity is prevented from being exhausted earlier, and the stored powers in the storage batteries 2 can be fully discharged substantially at the same timing.

Therefore, for example, in the case where five power conversion devices 10 provided with only the storage batteries 2 with a rating power of 4 kW are operated in a coordinated manner, the five power conversion devices 10 can be operated in a coordinated manner substantially to the end, thus providing an effect that power up to 20 kW (=4 kW×5) can be covered substantially to the end even in the case where very large power is required instantaneously.

As a specific example, an elevator used in a condominium, or the like requires very large power at the start of its movement. In this case, by setting the priority factors for the storage batteries 2 as described in the present embodiment 1, the plurality of power conversion devices 10 can be operated until substantially the same time even if the rating capacities or the states of charge of the connected storage batteries 2 are different. Therefore, for example, in the case where the sum of powers stored in the storage batteries 2 is still about ⅓, it is possible to prevent inconvenience in which the storage batteries 2 of two power conversion devices 10 become empty and the two power conversion devices 10 are stopped, so that the elevator cannot be activated.

Figure 17:
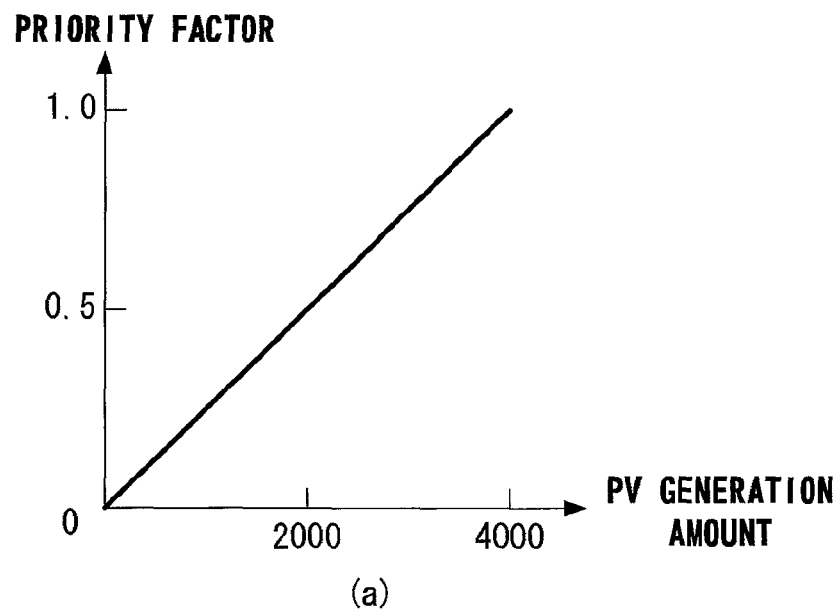
FIG. 17 is an explanation diagram showing a manner for determining a priority factor needed for calculating the effective voltage value of the power conversion device in embodiment 1.
Figure 17:
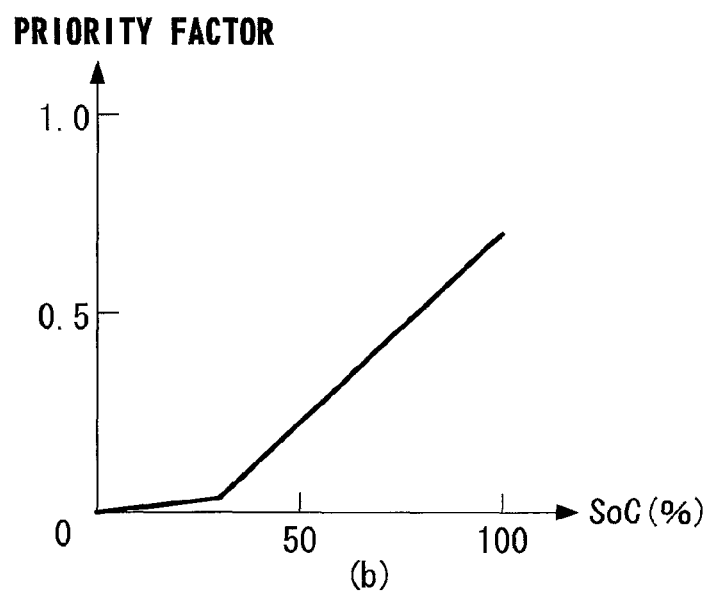
Figure 18:
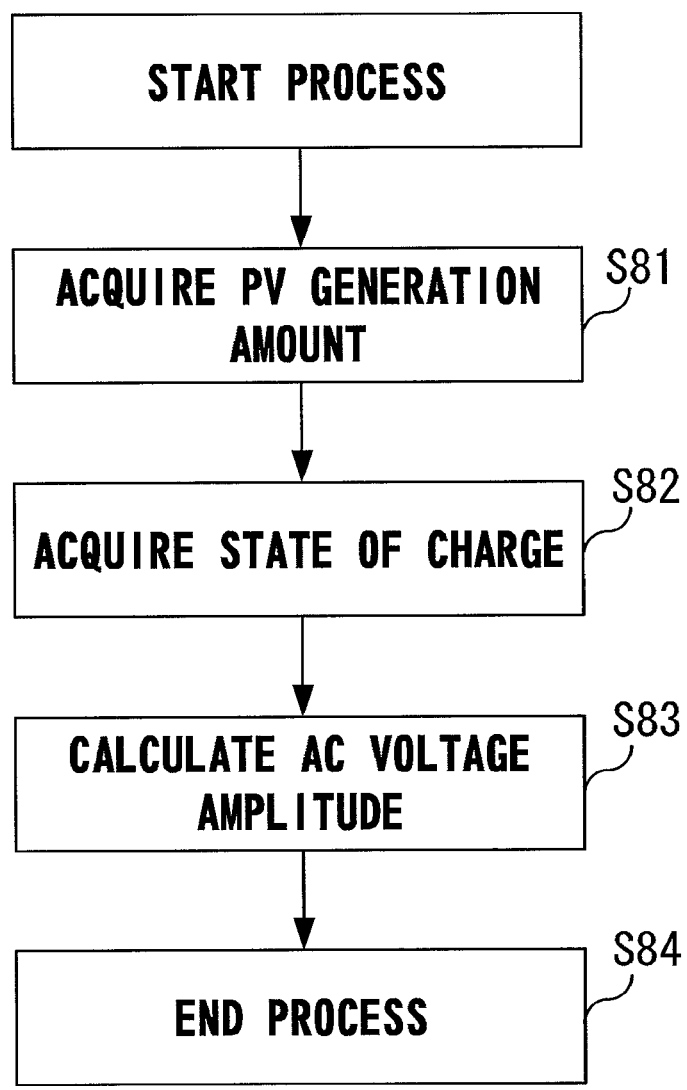
FIG. 18 is a flowchart showing a procedure for calculating effective voltage to be outputted from the DC/AC conversion circuit in self-sustained operation of the power conversion device in embodiment 1.

Next, a setting process for a priority factor for determining the AC voltage amplitude as a target value for AC voltage in the output amplitude generating circuit 55 in the third control circuit 22 will be described with reference to an explanation diagram in FIG. 17 and a flowchart in FIG. 18.

When calculation of effective voltage for the DC/AC conversion circuit 21 is started, the power generation amount of the solar panel 1 at present is acquired (S81). After the power generation amount of the solar panel 1 at present has been acquired, the state of charge of the storage battery 2 at present is acquired (S82).

Subsequently, a new priority factor is generated on the basis of the power generation amounts of the solar panel 1 at this time and the last time, the state of charge of the storage battery 2 at present, the priority factor acquired at the last time, and the output power amount of the power conversion device 10 at present.

That is, on the basis of the data tables shown in FIG. 17(a) and FIG. 17(b), first, a provisional value of the priority factor is generated. At the same time as calculation of the provisional value, the priority factor at the last time and the discharge power amount are confirmed. Then, the output power amount of the power conversion device 10 is subtracted from the power generation amount of the solar panel 1, to confirm surplus power in PV power generation. As a result of the confirmation, if there is surplus power, the provisional value of the priority factor is corrected. That is, the priority factor is compared with the priority factor at the last time, and the priority factor is corrected so as to be greater than the priority factor at the last time. By thus performing the correction, when the solar panel 1 has surplus power, the output power amount of the power conversion device 10 is increased, whereby generated power can be effectively utilized and unnecessary discharge from the storage batteries 2 (including the storage battery 2 of another power conversion device 10) can be suppressed.

The priority factors for the solar panel 1 and the storage battery 2 are calculated in the above manner, and then the two priority factors are added. If a result of the addition of the two priority factors exceeds 1, 1 is outputted. Then, the output amplitude generating circuit 55 outputs the result of the addition of the priority factors obtained in the above manner, to the multiplication circuit 56 at the subsequent stage. The multiplication circuit 56 multiplies output of the reference AC voltage generated by the reference AC voltage waveform generating circuit 54, by the priority factor from the output amplitude generating circuit 55 as a gain. Thus, the AC voltage amplitude as a target value for AC voltage is determined (S83). The sixth control circuit 57 calculates effective voltage having the AC voltage amplitude obtained by the multiplication circuit 56 (S84). Then, the sixth control circuit 57 controls the DC/AC conversion circuit 21 so that an AC voltage waveform having the effective voltage is outputted from the DC/AC conversion circuit 21.

Returning to FIG. 10, operation of the power conversion device 10 as a master after self-sustained operation activation will be described.

The third control circuit 22 determines an AC voltage amplitude as a target value for AC voltage, and calculates effective voltage having the AC voltage amplitude (S49). Then, the third control circuit 22 controls the DC/AC conversion circuit 21 so that an AC voltage waveform having the effective voltage is outputted from the DC/AC conversion circuit 21 (S50, S51). The details of operation of the third control circuit 22 in this case is as already described with reference to the flowchart in FIG. 18.

Next, the sixth control circuit 57 in the third control circuit 22 confirms whether the power system 3 is restored (S18). Here, if the power system 3 is restored, the power conversion device 10 is stopped (S24), and after the stop of the power conversion device 10 is confirmed, the switch 5 is closed to reconnect the loads 4 and the power conversion device 10 to the power system 3. After the reconnection is completed, the power conversion device 10 is activated again so as to be interconnected with the power system 3 (S52).

On the other hand, if power has not been restored in the above S18, whether a stop condition for the power conversion device 10 is satisfied is confirmed (S19). The stop condition in this case corresponds to, for example, the case where very large power is taken by the load 4 so that the rated capacity of the power conversion device 10 is exceeded, or the case where the stored power in the storage battery 2 is exhausted and power generation by the solar panel 1 disappears. If a stop condition is satisfied in S19, the power conversion device 10 is stopped, and then when the power system 3 is restored, the power conversion device 10 is activated again so as to be interconnected with the power system 3 (S24). On the other hand, if any stop condition for the power conversion device 10 is not satisfied in the above S19, the process returns to S49 to continue control of the DC/AC conversion circuit 21.

Figure 12:
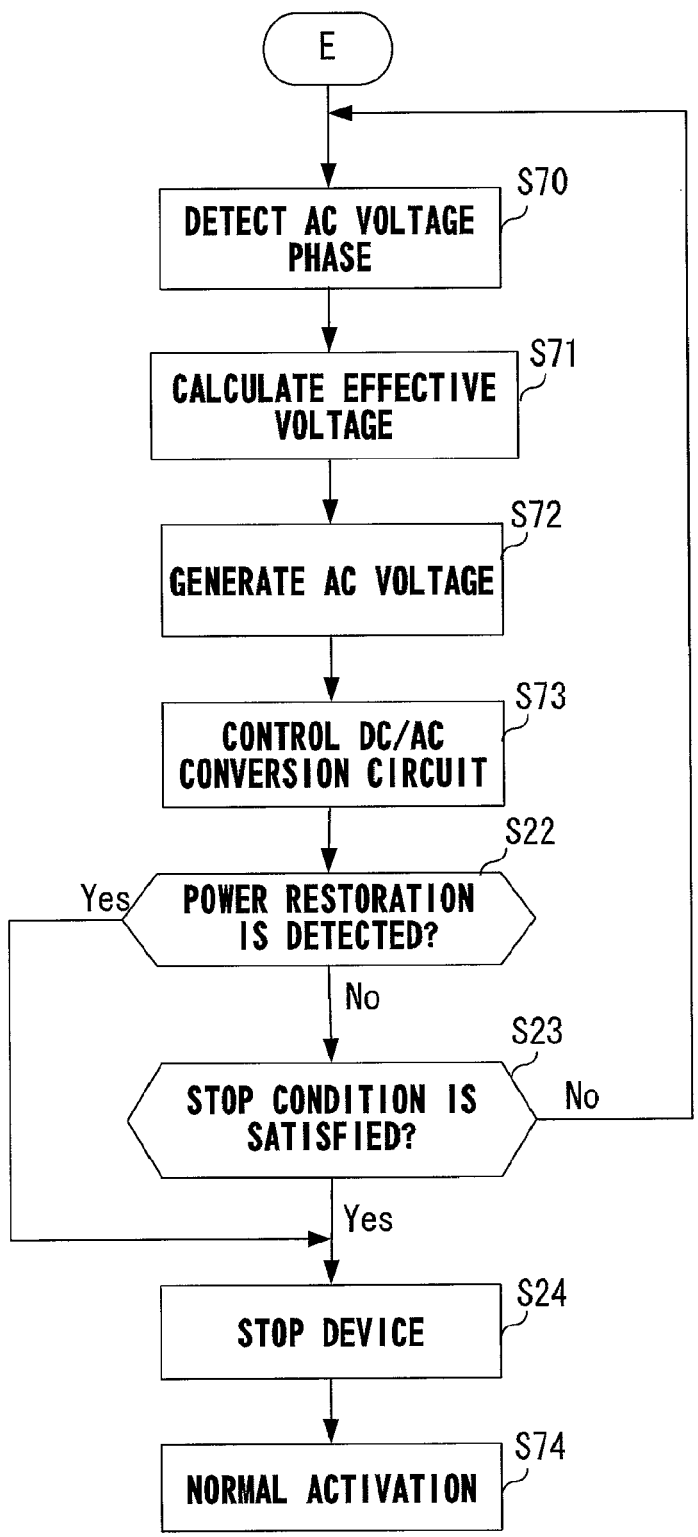
FIG. 12 is a flowchart subsequent to FIG. 11, showing the operation of the power conversion device as a slave in self-sustained operation, in embodiment 1.

On the other hand, in operation of the power conversion device 10 as a slave after self-sustained operation activation, as shown in FIG. 12, the reference signal selecting circuit 52 selects output of the voltmeter 23 and measures the reference AC voltage outputted from a master which is a source for generating the reference AC voltage. Next, the phase detection circuit 53 detects the phase of the waveform of the reference AC voltage outputted from the reference signal selecting circuit 52 (S70) so that AC voltage synchronized with the AC voltage waveform of the master is outputted from the DC/AC conversion circuit 21.

Figure 10:
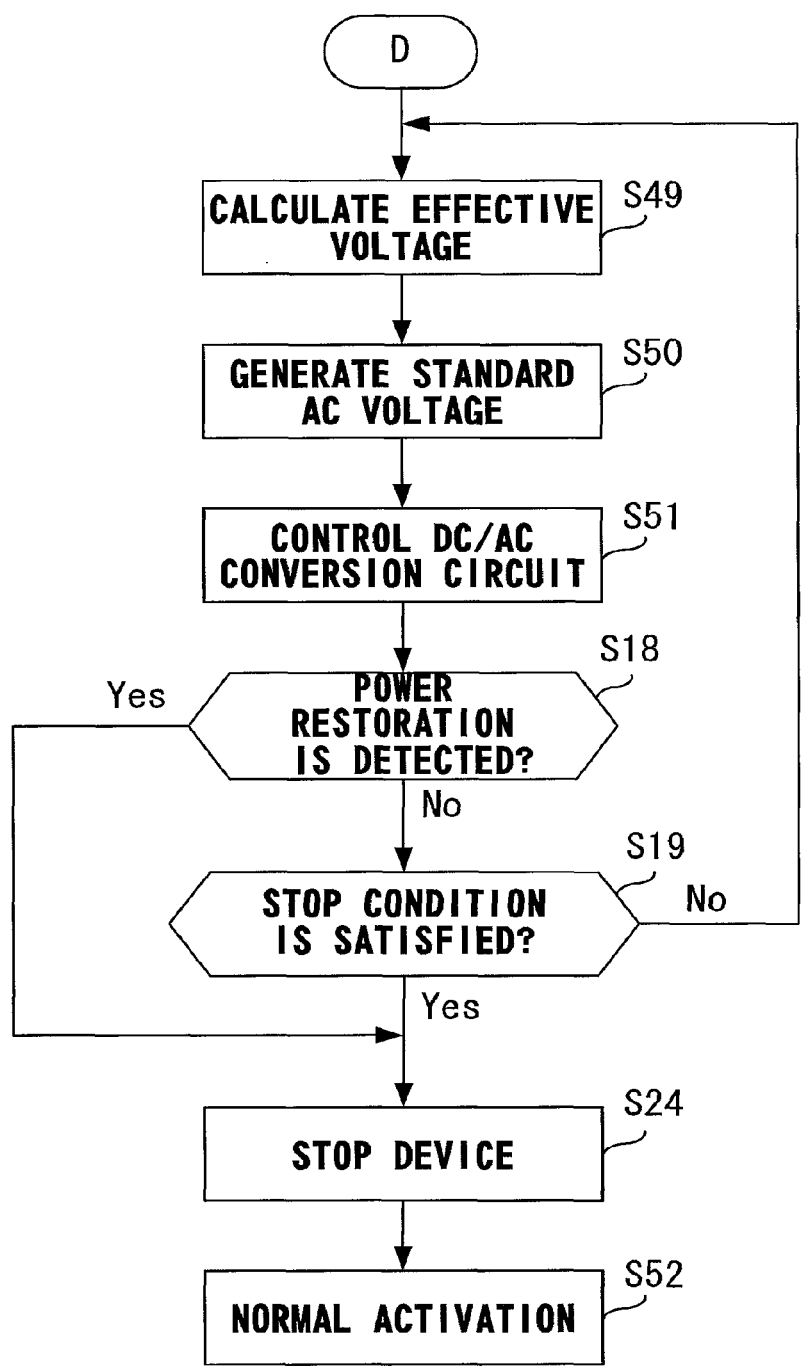
FIG. 10 is a flowchart subsequent to FIG. 9, showing the operation of the power conversion device as a master in self-sustained operation, in embodiment 1.

The subsequent process from S71 to S74 is basically the same as in the operation of the power conversion device 10 as a master after self-sustained operation activation shown in FIG. 10, and therefore the detailed description thereof is omitted.

Next, coordinated operation between voltage control for the solar panel 1 by the first DC/DC conversion circuit 13 and voltage control for the storage battery 2 by the second DC/DC conversion circuit 17 after self-sustained operation activation will be described. The operations of the first DC/DC conversion circuit 13 and the second DC/DC conversion circuit 17 after self-sustained operation activation are the same between a master and a slave. Therefore, here, only the operation of the power conversion device 10 as a master will be described.

In the present embodiment 1, after self-sustained operation activation, generated power of the solar panel 1 is preferentially supplied to the load 4. Therefore, a control target value for DC bus voltage of the DC bus 25 for the second DC/DC conversion circuit 17 is set to be lower than a control target value for DC bus voltage of the DC bus 25 for the first DC/DC conversion circuit 13 at the time of activation. By thus performing the setting, power is supplied from the power conversion device 10 to the load 4 so that power generated by the solar panel 1 is preferentially supplied to the load 4.

After self-sustained operation activation, if panel voltage of the solar panel 1 is equal to or greater than a predetermined value, in order to stabilize DC bus voltage of the DC bus 25, the fourth control circuit 34 in the first control circuit 14 commands the voltage control circuit 32 to control the solar panel 1 through voltage control, and commands the switch circuit 33 to select output of the voltage control circuit 32. Then, the fourth control circuit 34 activates the first DC/DC conversion circuit 13, and performs control so that, if DC bus voltage of the DC bus 25 is lower than the target voltage, the amount of generated power from the solar panel 1 increases, and if DC bus voltage of the DC bus 25 is higher than the target voltage, the amount of generated power from the solar panel 1 is reduced.

When DC bus voltage of the DC bus 25 reaches the vicinity of target voltage in voltage control, the fourth control circuit 34 notifies the sixth control circuit 57 in the third control circuit 22 that the first DC/DC conversion circuit 13 has been started up by voltage control. When having received the notification, or when having been notified that voltage of the solar panel 1 is smaller than a predetermined value, the sixth control circuit 57 commands the fifth control circuit 44 in the second control circuit 18 to start discharge from the storage battery 2.

When having received the command, the fifth control circuit 44 acquires status information about the storage battery 2 from a BMU (battery management unit) (not shown). Specifically, the fifth control circuit 44 acquires state-of-charge information (SoC information) about the storage battery 2 and voltage information about the storage battery 2. Then, if the state of charge of the storage battery 2 is equal to or greater than a predetermined value and voltage of the storage battery 2 is also equal to or greater than a predetermined value, the fifth control circuit 44 commands the discharge control circuit 42 to perform discharging through voltage control, and commands the switch circuit 43 to select output of the discharge control circuit 42. Then, when having confirmed that the second DC/DC conversion circuit 17 is activated, the fifth control circuit 44 reports this fact to the sixth control circuit 57 in the third control circuit 22.

Next, the fifth control circuit 44 performs voltage control so that DC bus voltage of the DC bus 25 becomes a set voltage value. That is, if DC bus voltage of the DC bus 25 is lower than target voltage, the fifth control circuit 44 increases the amount of discharge power from the storage battery 2, and if DC bus voltage of the DC bus 25 is higher than the target voltage, the fifth control circuit 44 reduces the amount of discharge power from the storage battery 2.

In the case where power generated by the solar panel 1 is not fully consumed by the load 4, even if the amount of discharge power from the storage battery 2 is reduced to zero, DC bus voltage of the DC bus 25 is still high. Therefore, in this case, the storage battery 2 is switched to a charge mode, to be charged with the surplus power.

That is, if it is determined that DC bus voltage of the DC bus 25 exceeds predetermined voltage, the fifth control circuit 44 in the second control circuit 18 outputs a discharge stop command to the discharge control circuit 42, to once stop the second DC/DC conversion circuit 17. When having confirmed that operation of the second DC/DC conversion circuit 17 is stopped, the fifth control circuit 44 outputs a charge start command to the charge control circuit 41, and commands the switch circuit 43 to select output of the charge control circuit 41. Then, after switching the second DC/DC conversion circuit 17 to a charge mode, the fifth control circuit 44 reports this fact to the third control circuit 22.

When having confirmed that the storage battery 2 is switched to a charge mode, the third control circuit 22 reports this fact to the first control circuit 14. When the first control circuit 14 has received the report that the storage battery 2 is shifted to a charge mode, the fourth control circuit 34 in the first control circuit 14 switches voltage control to MPPT control and commands the voltage control circuit 32 to stop the voltage control. When having received the voltage control stop command, the voltage control circuit 32 sends, to the MPPT control circuit 31, a command value that is currently outputted, a register value in an integral circuit (not shown) for performing PI control or the like, and the like. Meanwhile, after having outputted the stop commands to the voltage control circuit 32, the fourth control circuit 34 outputs a start command to the MPPT control circuit 31. At this time, the fourth control circuit 34 also commands the switch circuit 33 to select output of the MPPT control circuit 31.

When having received the start command, the MPPT control circuit 31 starts MPPT control, using, as initial values, the command value, the register value in the integral circuit, and the like outputted from the voltage control circuit 32. When MPPT control is started, the charge control circuit 41 in the second control circuit 18 monitors DC bus voltage of the DC bus 25, and if there is surplus power, performs charging with the surplus power.

When the storage battery 2 is fully charged, the fifth control circuit 44 outputs a charge stop command to the charge control circuit 41, and outputs a discharge start command to the discharge control circuit 42. At this time, the fifth control circuit 44 also commands the switch circuit 43 to select output of the discharge control circuit 42. After the storage battery 2 has been shifted to a discharge mode, the fifth control circuit 44 notifies the third control circuit 22 that the storage battery 2 has been shifted to a discharge mode. When having received the notification that the storage battery 2 has been shifted to a discharge mode, the third control circuit 22 notifies the first control circuit 14 that the storage battery 2 has been shifted to a discharge mode.

When having confirmed that the storage battery 2 has been shifted to a discharge mode, the fourth control circuit 34 in the first control circuit 14 monitors DC bus voltage of the DC bus 25. Then, when it is detected that DC bus voltage of the DC bus 25 is equal to or greater than a predetermined value, the fourth control circuit 34 outputs a stop command to the MPPT control circuit 31, and outputs an activation command to the voltage control circuit 32. When having received the activation command, the voltage control circuit 32 sets the register value in the integral circuit for performing PI control or the like, and a command value, to predetermined values, and starts voltage control operation. When having confirmed the start of the voltage control operation of the voltage control circuit 32, the fourth control circuit 34 commands the switch circuit 33 to select output of the voltage control circuit 32.

Also in the case where the storage battery 2 is in a charge mode, the fourth control circuit 34 monitors DC bus voltage of the DC bus 25, and when it is detected that the DC bus voltage is equal to or greater than second predetermined voltage, the fourth control circuit 34 switches the control for the solar panel 1 from MPPT control to voltage control in the manner described above. The reason is that, also in the case where the storage battery 2 is in a charge mode, a plurality of power conversion devices 10 perform self-sustained operation in a coordinated manner, and even if a surplus portion of power generated by a plurality of solar panels 1 is utilized for a plurality of storage batteries 2, surplus power may be still left, and in this case, AC voltage supplied to the load 4 increases.

In the present embodiment 1, as a measure for the above, also in the case where the storage battery 2 is in a charge mode, DC bus voltage of the DC bus 25 is monitored, whereby increase in AC voltage supplied to the load 4 is suppressed. Needless to say, the second predetermined voltage may be the same as the predetermined voltage used in switching to the discharge mode.

As described above, according to the power conversion device 10 of the present embodiment 1, in the case where a plurality of power conversion devices 10 supply power to the loads 4 in a coordinated manner at the time of power outage, one power conversion device 10 operates as a master to generate the reference AC voltage, and the other power conversion devices 10 operate as slaves to detect the voltage phase of AC voltage outputted from the power conversion device as a master, and output power in synchronization with the detected voltage phase. Thus, at the time of power outage, the plurality of power conversion devices 10 can operate in a coordinated manner. Therefore, even if large power is required instantaneously, the power can be supplied by the plurality of power conversion devices 10, thus providing an effect of preventing inconvenience in which the power conversion devices 10 are stopped due to instantaneous overload (such as overcurrent) and power outage occurs.

In the present embodiment 1, power generated by an energy creating device such as the solar panel 1 is preferentially supplied to the load 4, and if the generated power is insufficient, the necessary power is outputted from an energy storing device such as the storage battery 2, thus providing an effect of allowing generated power of an energy creating device such as the solar panel 1 to be maximally utilized.

In the case of discharging power from the storage battery 2, since a priority can be set in accordance with the state of charge (SoC), power can be preferentially discharged from a storage battery 2 with a large state of charge (SoC). Therefore, the power conversion devices 10 provided with the storage batteries 2 can be operated in a coordinated manner substantially to the end. Thus, an effect is obtained that, even if large power is required instantaneously, the power conversion devices 10 can be prevented from being stopped due to overload.

In the case where there is surplus power in power generated by the solar panel 1, effective voltage of the power conversion device 10 having the storage battery 2 with a low state of charge (SoC) is controlled to be small. Therefore, also regarding this surplus power, an effect is obtained that the surplus power can be preferentially allocated to the power conversion device 10 having the storage battery 2 with a low state of charge (SoC).

In the case where generated power of an energy creating device such as the solar panel 1 is great so that there is surplus power, the storage battery 2 can be charged with the surplus power, and when the storage battery 2 is in a charge mode, the solar panel 1 is subjected to MPPT control. Thus, generated power of the solar panel 1 can be maximally extracted. Also in a charge mode, since the DC/AC conversion circuit 21 is operated through voltage control, if generated power that exceeds the charge power amount is supplied, the power generation amount of the solar panel 1 can be reduced in real time while voltage of the DC bus 25 is monitored, thus providing an effect of preventing the power conversion device 10 from being stopped due to excessive supply of power.

In selection of a master, the power conversion device 10 having the storage battery 2 is preferentially activated as a master. Therefore, an effect of allowing generated power of the solar panel 1 to be maximally utilized is provided as compared to the case where, for example, the power conversion device 10 having only the solar panel 1 is operated as a master.

The reason is as follows. As described above, in the case where the power conversion device 10 having only the solar panel 1 is operated as a master, since DC bus voltage of the DC bus 25 needs to be managed by the first DC/DC conversion circuit 13, MPPT control cannot be performed for the first DC/DC conversion circuit 13, and therefore power generated by the solar panel 1 cannot be maximally extracted. In contrast, in the case where the power conversion device 10 having the solar panel 1 and the storage battery 2 is operated as a master, DC bus voltage of the DC bus 25 can be controlled through the second DC/DC conversion circuit 17, and therefore power generated by the solar panel 1 can be maximally extracted through MPPT control.

In the present embodiment 1, DC bus voltage of the DC bus 25 is set to predetermined first control target voltage and predetermined second control target voltage. However, without limitation thereto, the same effect is provided even in the case of, for example, changing the first control target voltage and the second control target voltage in accordance with the battery voltage of the storage battery 2.

Embodiment 2

Figure 19:
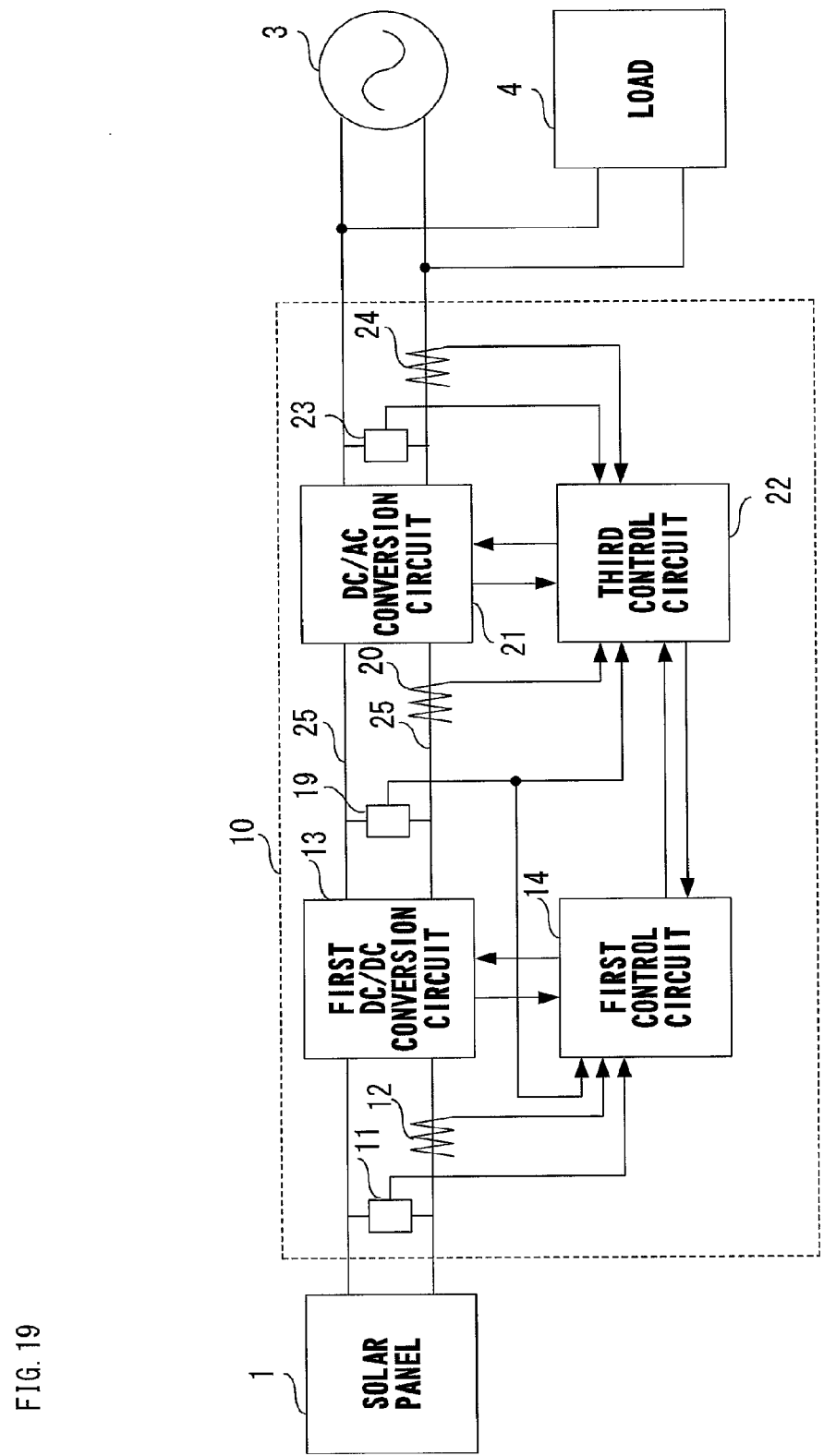
FIG. 19 is a block diagram schematically showing the system configuration of a power conversion device in embodiment 2 of the present invention.

FIG. 19 is a block diagram schematically showing the system configuration of a power conversion device according to embodiment 2 of the present invention. The components that correspond to or are the same as those in embodiment 1 shown in FIG. 2 are denoted by the same reference characters.

The feature of the power conversion device 10 of the present embodiment 2 is that the second DC/DC conversion circuit 17 and the second control circuit 18 in the configuration of the power conversion device 10 of embodiment 1 are omitted and only the first DC/DC conversion circuit 13, the first control circuit 14, the DC/AC conversion circuit 21, and the third control circuit 22 are provided.

In the present embodiment 2, the solar panel 1 is used as a DC power supply connected outside of the power conversion device 10. However, without limitation thereto, the storage battery 2 may be used or another energy creating device (for example, a wind power generator or a fuel battery) may be used.

Also in the present embodiment 2, setting of a master and a slave is performed in self-sustained operation in the case of being released from the power system, and for supplying power to the load, the DC/AC conversion circuits 21 of all the power conversion devices 10 are operated in a voltage control mode, and proportional power distribution is performed on the basis of priority factors. These features are the same as in embodiment 1, and therefore the detailed description thereof is omitted.

Embodiment 3

In the present embodiment 3, as in embodiment 1, the case where a plurality of power conversion devices 10 operate in a coordinated manner to supply power to the loads 4 in self-sustained operation as shown in FIG. 1 will be described. In the following description, as in embodiment 1, each power conversion device 10 has the solar panel 1 and the storage battery 2.

Needless to say, instead of having both the solar panel 1 and the storage battery 2, the power conversion device 10 may have one of them or another energy creating device (for example, a fuel battery) as described in embodiment 2.

In the following description, power outage is cited as an example of factors for performing self-sustained operation. However, the present technology is not technology used only at the time of power outage. For example, the storage batteries may be charged with inexpensive power during the night, and during the day, the power conversion devices 10 may be operated using the solar panels 1 and the storage batteries 2 while being disconnected from the system. As in such a case, operations of the power conversion devices 10 performed in the state in which the loads 4 and the power conversion devices 10 are disconnected from the system in the cases other than power outage, also correspond to self-sustained operation.

In the present embodiment 3, arrangement of the power conversion devices 10, the loads 4, and the power system 3 are the same as in embodiment 1 shown in FIG. 1, the entire configuration of each power conversion device 10 is the same as that shown in FIG. 2, and the configurations of the first control circuit 14 and the second control circuit 18 are the same as in the respective configurations in embodiment 1 shown in FIG. 3 and FIG. 4. Therefore, the detailed description thereof is omitted.

Figure 20:
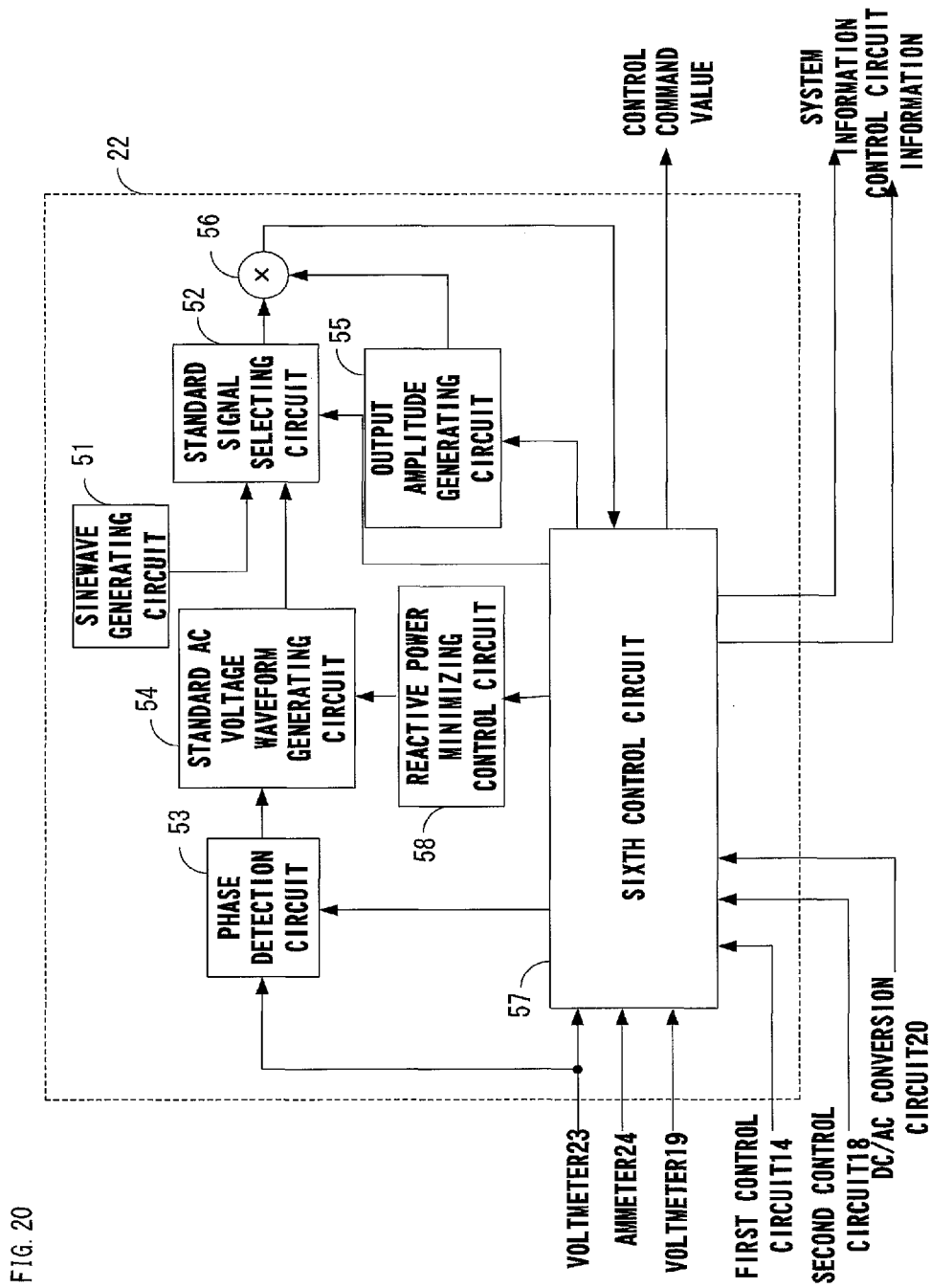
FIG. 20 is a block diagram schematically showing the configuration of a third control circuit of a power conversion device in embodiment 3.

FIG. 20 is a block diagram showing the configuration of the third control circuit 22 in embodiment 3 of the present invention.

In FIG. 20, the sinewave generating circuit 51 generates a sinewave and outputs the same to the reference signal selecting circuit 52. The reference signal selecting circuit 52 selects one of an AC voltage waveform inputted from the reference AC voltage waveform generating circuit 54 and the sinewave inputted from the sinewave generating circuit 51. The phase detection circuit 53 detects the phase of an AC voltage waveform inputted from the power system 3. The reference AC voltage waveform generating circuit 54 generates reference AC voltage serving as a reference for performing voltage control for the DC/AC conversion circuit 21 in self-sustained operation, on the basis of the phase detected by the phase detection circuit 53. The output amplitude generating circuit 55 determines an AC voltage amplitude as a control target value for AC voltage serving as a reference for performing voltage control for the DC/AC conversion circuit 21. The multiplication circuit 56 multiplies output of the reference signal selecting circuit 52 and output of the output amplitude generating circuit 55. The sixth control circuit 57 controls the DC/AC conversion circuit 21 and controls the output amplitude generating circuit 55.

The feature of the present embodiment 3 is that the third control circuit 22 further includes, in addition to the above configuration, a reactive power minimizing control circuit 58 which measures reactive power of the AC and performs control to correct the phase of the reference AC voltage (sinewave) outputted from the reference AC voltage waveform generating circuit 54 so that the absolute value of the reactive power is minimized. The reactive power minimizing control circuit 58 corresponds to a reactive power minimizing control unit in claims.

In the present embodiment 3, the connection order of the sinewave generating circuit 51, the reference signal selecting circuit 52, the phase detection circuit 53, and the reference AC voltage waveform generating circuit 54 is different from that in embodiment 1. Therefore, in the configuration in the present embodiment 3, the power conversion device 10 operating as a master can directly use the sinewave generated by itself, as the reference signal for controlling the DC/AC conversion circuit 21, thus providing an effect of preventing error in detection of the phase, which would be caused when the phase is detected by the phase detection circuit 53 in embodiment 1.

The third control circuit 22 is composed of the sinewave generating circuit 51, the reference signal selecting circuit 52, the phase detection circuit 53, the reference AC voltage waveform generating circuit 54, the output amplitude generating circuit 55, the multiplication circuit 56, the sixth control circuit 57, and the reactive power minimizing control circuit 58.

Also in the present embodiment 3, as in embodiments 1 and 2, the case where the solar panel 1 is used as an energy creating device and as a distributed power supply utilizing natural energy will be described. However, without limitation thereto, the same effect is provided even in the case of using, for example, wind power generation. Alternatively, a fuel battery may be used as an energy creating device.

In the present embodiment 3, the case of using a stationary battery as the storage battery 2 will be described. However, without limitation thereto, the same effect is provided even in the case of using, for example, a battery of an electric automobile. In the case of using a lithium ion battery, a battery management unit (BMU) provided in the battery manages the state of charge, whether or not charge or discharge can be performed, the maximum charge current in charging, and the like, and sends them to the second control circuit 18. In the present embodiment 3, for simplification of the description, it is assumed that the second control circuit 18 manages the state of charge, whether or not charge or discharge can be performed, the maximum charge current in charging, and the like.

Further, in the present embodiment 3, for simplification of the description, it is assumed that controls are implemented by means of hardware. However, without limitation thereto, the same effect is provided even in the case of realizing all or some of the above circuits by means of software. The functions of the above circuits may be divided into software and hardware to realize the same functions.

Next, a specific operation of the power conversion device 10 having the above configuration will be described.

The operation of the power conversion device 10 in the case (normal operation) where power is normally supplied to the power system 3 is the same as in embodiment 1, and therefore the detailed description thereof is omitted.

Hereinafter, self-sustained operation of the power conversion devices 10 at the time of power outage will be described.

When power outage of the power system 3 is detected, the switch 5 is opened to disconnect the power conversion devices 10a to 10n and the loads 4a to 4x in home from the power system 3. When the disconnection from the power system 3 has been confirmed, the power conversion devices 10a to 10n start self-sustained operation.

In the present embodiment 3, as in embodiment 1, one of the power conversion devices 10a to 10n is selected as a master to be operated as a source for generating the reference AC voltage in self-sustained operation. With respect to the power conversion device as a master, the other power conversion devices operate in a coordinated manner in synchronization with the phase of the reference AC voltage outputted from the master, and thus are defined as slaves in the following description. As in embodiment 1, the power conversion device 10 having the storage battery 2 is preferentially selected as a master.

Hereinafter, operation in the case where the plurality of power conversion devices 10 are operated in a coordinated manner in self-sustained operation will be described.

When power outage has been detected, the power conversion device 10 stops the operation thereof. Then, the power conversion device 10 confirms the status (panel voltage of the solar panel 1, the state of charge of the storage battery 2, and the like) of each power supply device connected to the power conversion device 10. After the status of each power supply device has been confirmed, a user's command to shift to self-sustained operation is waited for. In the present embodiment 3, a user requests self-sustained operation via the HEMS (not shown), whereby shifting to self-sustained operation is performed.

When the self-sustained operation request is inputted from the user, the HEMS commands each power conversion device 10 to start self-sustained operation. When having received the self-sustained operation command, each power conversion device 10 starts self-sustained operation. In the present embodiment 3, the power conversion device 10 for operating as a master is designated by the HEMS. At this time, the HEMS opens the switch 5 to disconnect the power conversion devices 10 and the loads 4 from the power system 3.

On the other hand, if the self-sustained operation command is not inputted from the user, each power conversion device 10 stands by until the power system 3 is restored. Then, when the power system 3 is restored, each power conversion device 10 is activated again in a normal coordinated operation mode.

Figure 21:
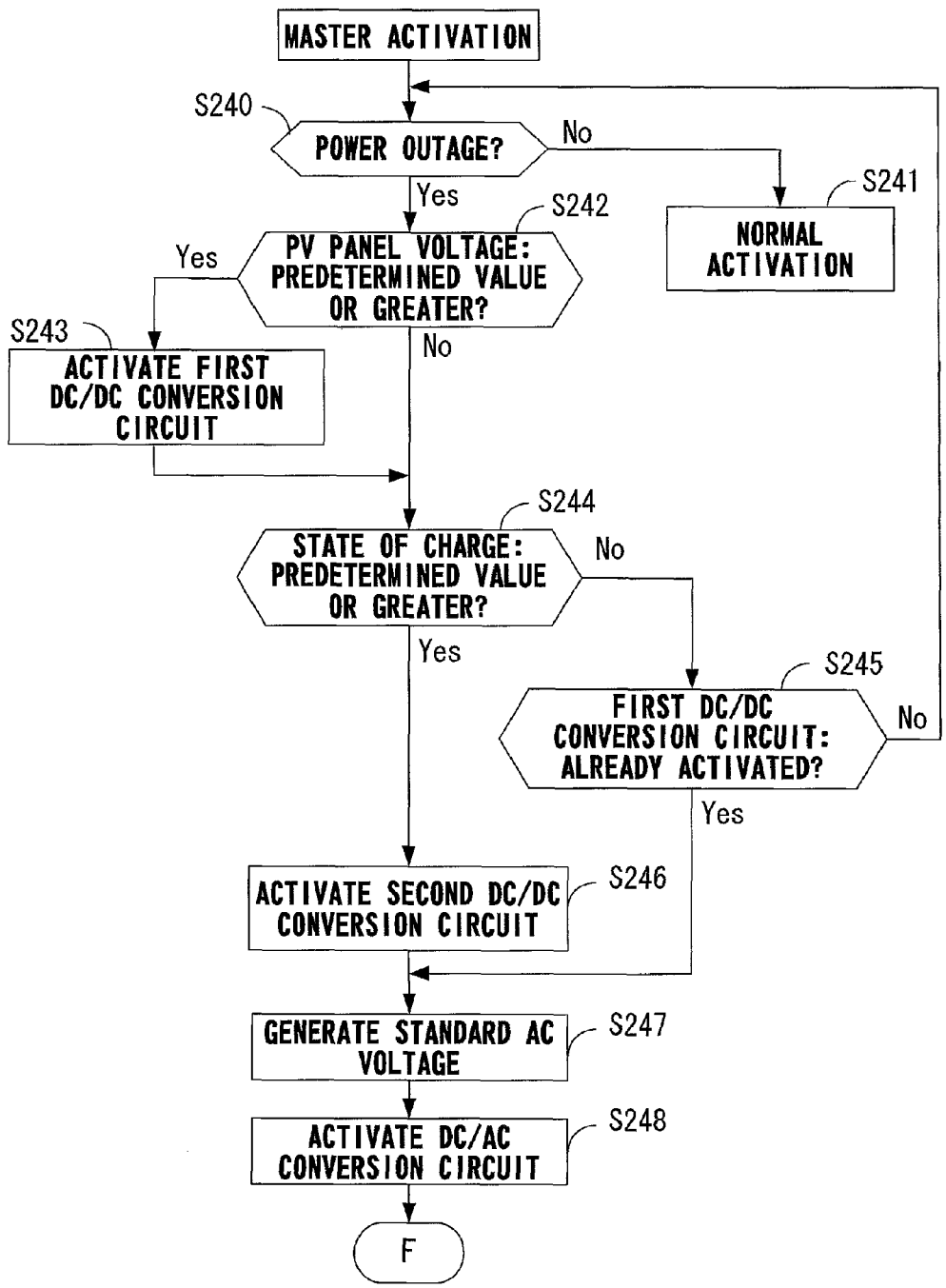
FIG. 21 is a flowchart showing operation of the power conversion device as a master in self-sustained operation, in embodiment 3.
Figure 22:
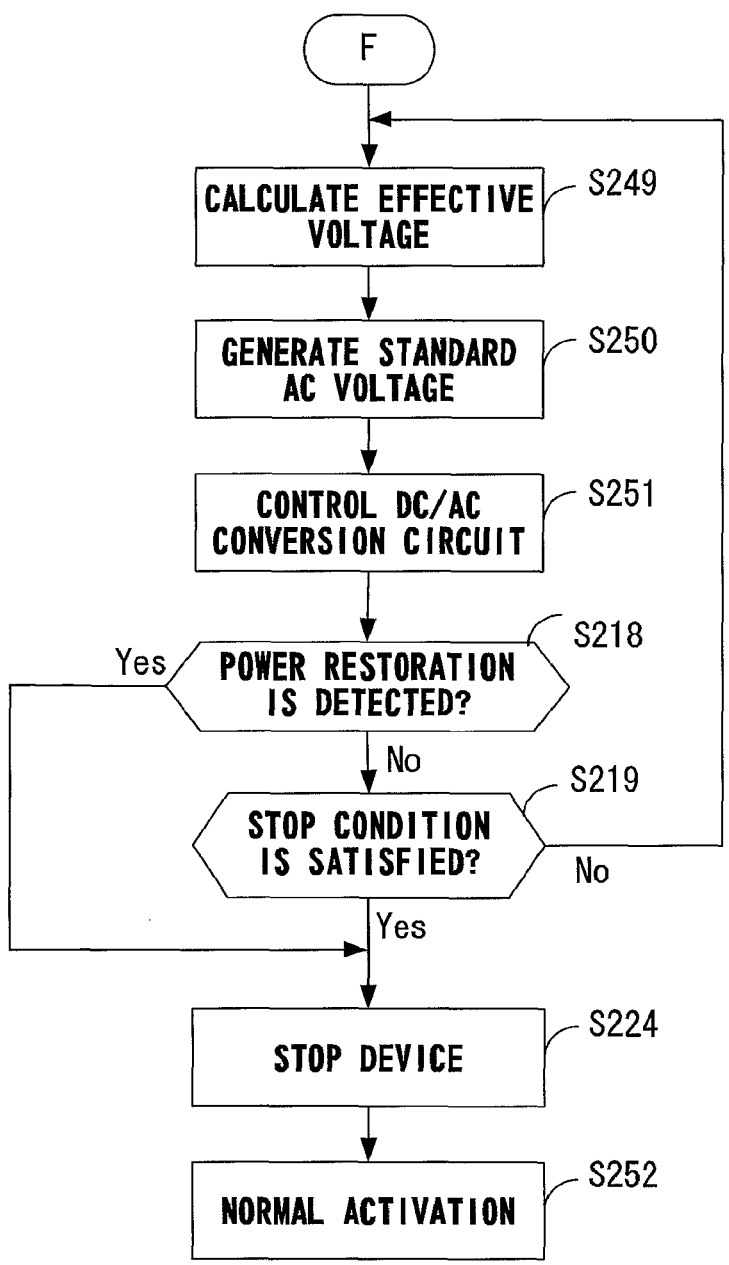
FIG. 22 is a flowchart subsequent to FIG. 21, showing operation of the power conversion device as a master in self-sustained operation, in embodiment 3.

Next, with reference to flowcharts in FIG. 21 and FIG. 22, the procedure of activation of the power conversion device 10 as a master will be described.

In the power conversion device 10 that has been commanded by the HEMS to be activated as a master, in S240, the third control circuit 22 confirms system voltage outputted from the voltmeter 23 to determine again whether power outage is occurring (S240). Specifically, effective voltage of the AC is measured, and if the value thereof is smaller than a predetermined value, it is determined that power outage is occurring. If it is determined that power outage is not occurring, the power conversion device 10 is activated again in a normal coordinated operation mode (S241).

On the other hand, if it is determined that power outage is occurring in the above S240, the third control circuit 22 outputs a request for confirming whether panel voltage of the solar panel (in the flowchart, written as PV panel) 1 is equal to or greater than a predetermined value so that power generation can be performed, to the fourth control circuit 34 in the first control circuit 14. When having received the request, the fourth control circuit 34 commands the MPPT control circuit 31 to confirm whether output voltage of the solar panel 1 outputted from the voltmeter 11 is equal to or greater than a predetermined value. In response to the command, the MPPT control circuit 31 confirms voltage of the solar panel 1 to determine whether power generation can be performed, and sends a result thereof to the fourth control circuit 34 (S242).

The fourth control circuit 34 sends the determination result to the third control circuit 22. Here, if the determination result indicates that power generation can be performed, in order to stabilize DC bus voltage of the DC bus 25, the fourth control circuit 34 commands the voltage control circuit 32 to perform activation in a voltage control mode, commands the switch circuit 33 to select output of the voltage control circuit 32, and commands the switch circuit 33 to select output of the voltage control circuit 32, thereby activating the first DC/DC conversion circuit 13 (S243).

After the first DC/DC conversion circuit 13 has been activated in the above S243, or if voltage of the solar panel 1 is equal to or smaller than the predetermined voltage in S242 (or the solar panel 1 is not connected), the sixth control circuit 57 in the third control circuit 22 commands the fifth control circuit 44 in the second control circuit 18 to discharge power from the storage battery 2. When having received the discharge command, the fifth control circuit 44 commands the discharge control circuit 42 to confirm whether the voltage outputted from the voltmeter 15 is equal to or greater than a predetermined value (S244).

In response to the command, the discharge control circuit 42 confirms voltage of the storage battery 2 to determine whether the discharge can be performed, and sends a result thereof to the fifth control circuit 44. The fifth control circuit 44 sends the determination result to the third control circuit 22, and if the discharge can be performed, in order to stabilize DC bus voltage of the DC bus 25, the fifth control circuit 44 commands the discharge control circuit 42 to perform activation in a voltage control mode, and commands the switch circuit 43 to select output of the discharge control circuit 42, thereby activating the second DC/DC conversion circuit 17 (S246).

If voltage of the storage battery 2 is equal to or smaller than the predetermined voltage (or the storage battery 2 is not connected) in the above S244, whether the first DC/DC conversion circuit 13 for the solar panel 1 has been already activated is confirmed (S245), and if the first DC/DC conversion circuit 13 has not been activated yet, the process returns to S240.

On the other hand, if it is determined that the state of charge of the storage battery 2 is equal to or greater than the predetermined value and the discharge can be performed in the above S244, and the second DC/DC conversion circuit 17 has been already activated in S246, or if it is determined that the first DC/DC conversion circuit 13 has been already activated in the above S245, the sixth control circuit 57 in the third control circuit 22 for controlling the DC/AC conversion circuit 21 outputs a command for generating an AC voltage waveform to be outputted as a master. That is, in the case where the power conversion device 10 serves as a master, the sinewave generating circuit 51 is commanded to generate a sinewave as a reference. The sixth control circuit 57 outputs, to the reference signal selecting circuit 52, a switch command signal so as to select output of the sinewave generating circuit 51. In response to the switch command signal, the reference signal selecting circuit 52 switches output of the reference AC voltage waveform generating circuit 54, to output of the sinewave generating circuit 51 (S247).

At this time, on the basis of a command from the sixth control circuit 57, the output amplitude generating circuit 55 outputs a priority factor (multiplication factor) for determining an AC voltage amplitude as a target value for AC voltage, to the multiplication circuit 56, so that effective voltage of the AC voltage waveform becomes, for example, 200V. The multiplication circuit 56 multiplies output of the reference AC voltage generated by the reference AC voltage waveform generating circuit 54, by the priority factor from the output amplitude generating circuit 55 as a gain. Thus, an AC voltage waveform having the AC voltage amplitude corresponding to the control target value for AC voltage is obtained. Then, a result of the multiplication is outputted to the sixth control circuit 57. The sixth control circuit 57 activates the DC/AC conversion circuit 21 so that the reference AC voltage having a waveform (sinewave) that has the AC voltage amplitude corresponding to the control target value for AC voltage, obtained by the multiplication circuit 56, is outputted (S248), thereby outputting the power to power lines that are released from the power system 3.

In the present embodiment 3, the power conversion device 10 activated as a master directly outputs the reference sinewave generated by the sinewave generating circuit 51. Thus, as compared to embodiment 1, in the power conversion device 10 activated as a master, an effect that prevents error in detection of the phase, which would be caused when the phase is detected by the phase detection circuit 53 in embodiment 1 is obtained. The power conversion device 10 activated as a master does not perform phase control for the reference AC voltage by the reactive power minimizing control circuit 58.

When having confirmed that the power conversion device 10 is activated as a master, the other power conversion devices 10 start activation as slaves. Hereinafter, with reference to flowcharts in FIG. 23 and FIG. 24, the procedure of activation of each power conversion device 10 as a slave will be described.

When the slave activation is started, the sixth control circuit 57 provided in the third control circuit 22 confirms system voltage outputted from the voltmeter 23, to confirm whether AC voltage is being supplied from the power conversion device 10 as a master, and confirms whether a self-sustained operation activation command is issued from the HEMS (not shown) (S260). Here, if AC voltage is being supplied and a self-sustained operation activation command is not issued from the HEMS, it is determined that the system is restored, and normal activation (in a coordinated operation mode) is performed (S261).

On the other hand, if the self-sustained operation activation command is issued from the HEMS and it is determined that power outage is occurring, as in the case of master activation, the third control circuit 22 requests the fourth control circuit 34 in the first control circuit 14 to confirm whether panel voltage of the solar panel 1 is equal to or greater than a predetermined value so that power generation can be performed. When having received the request, the fourth control circuit 34 accordingly commands the MPPT control circuit 31 to confirm whether output voltage of the solar panel 1 outputted from the voltmeter 11 is equal to or greater than a predetermined value (S262). In response to the command, the MPPT control circuit 31 confirms voltage of the solar panel 1 to determine whether power generation can be performed, and sends a result thereof to the fourth control circuit 34.

The fourth control circuit 34 sends the determination result to the third control circuit 22, and if power generation can be performed, in order to stabilize DC bus voltage of the DC bus 25, the fourth control circuit 34 commands the voltage control circuit 32 to activate the first DC/DC conversion circuit 13 in a voltage control mode, and commands the switch circuit 33 to select output of the voltage control circuit 32 (S263).

After the first DC/DC conversion circuit 13 has been activated in the above S263, or if voltage of the solar panel 1 is equal to or smaller than the predetermined voltage in the above S262 (or the solar panel 1 is not connected), the sixth control circuit 57 in the third control circuit 22 commands the fifth control circuit 44 in the second control circuit 18 to discharge power from the storage battery 2. When having received the discharge command, the fifth control circuit 44 commands the discharge control circuit 42 to confirm whether voltage outputted from the voltmeter 15 is equal to or greater than a predetermined value.

In response to the command, the discharge control circuit 42 confirms voltage of the storage battery 2 to determine whether the discharge can be performed (S264), and sends a result thereof to the fifth control circuit 44. The fifth control circuit 44 sends the determination result to the third control circuit 22, and if the discharge can be performed, the fifth control circuit 44 commands the discharge control circuit 42 to activate the second DC/DC conversion circuit 17 in a voltage control mode in S264, and commands the switch circuit 43 to select output of the discharge control circuit 42, thereby activating the second DC/DC conversion circuit 17 (S266).

If voltage of the storage battery 2 is equal to or smaller than the predetermined voltage (or the storage battery 2 is not connected) in the above 5264, whether the first DC/DC conversion circuit 13 for the solar panel 1 has been already activated is confirmed (S265), and if the first DC/DC conversion circuit 13 has not been activated yet, the process returns to S260.

On the other hand, if it is determined that the state of charge of the storage battery 2 is equal to or greater than a predetermined value and the discharge can be performed in the above S264, and the second DC/DC conversion circuit 17 has been already activated in S266, or if it is determined that the first DC/DC conversion circuit 13 has been already activated in the above S265, the sixth control circuit 57 in the third control circuit 22 outputs a command for generating an AC voltage waveform to be outputted as a slave. That is, in the case where the power conversion device 10 serves as a slave, in the sixth control circuit 57, the phase detection circuit 53 detects the phase of an AC voltage waveform outputted from the voltmeter 23 which measures AC voltage inputted from the power system 3 (S267). As a phase detection method in this case, as in embodiment 1, a zero cross point of the AC voltage waveform inputted from the power system 3 is detected, and a time at which the zero cross point is detected is outputted to the reference AC voltage waveform generating circuit 54.

The sixth control circuit 57 outputs, to the reference signal selecting circuit 52, a switch command signal so as to select output of the reference AC voltage waveform generating circuit 54 and to output the same. In response to the switch command signal, the reference signal selecting circuit 52 selects the output of the reference AC voltage waveform generating circuit 54.

On the other hand, the reactive power minimizing control circuit 58 performs control to correct the phase of the sinewave outputted from the reference AC voltage waveform generating circuit 54 so as to minimize the absolute value of reactive power outputted from its own device. That is, the reactive power minimizing control circuit 58 outputs a correction amount for the phase of the reference AC voltage (sinewave) outputted from the reference AC voltage waveform generating circuit 54, to the reference AC voltage waveform generating circuit 54.

Meanwhile, on the basis of a command from the sixth control circuit 57, the output amplitude generating circuit 55 outputs a priority factor for determining an AC voltage amplitude as a target value for AC voltage, to the multiplication circuit 56. The multiplication circuit 56 multiplies output of the reference AC voltage generated by the reference AC voltage waveform generating circuit 54, by the priority factor from the output amplitude generating circuit 55 as a gain. Thus, by output of the multiplication circuit 56, reference AC voltage having the AC voltage amplitude value corresponding to the control target value for AC voltage is obtained. Then, a result of the multiplication is outputted to the sixth control circuit 57. The sixth control circuit 57 activates the DC/AC conversion circuit 21 so that the reference AC voltage having the AC voltage amplitude corresponding to the control target value for AC voltage, obtained by the multiplication circuit 56, is outputted (S269), thereby the power is outputted to power lines that are released from the power system 3.

Next, operations of the phase detection circuit 53, the reference AC voltage waveform generating circuit 54, and the reactive power minimizing control circuit 58 described above will be described below in more detail.

Generally, in the case of generating the reference sinewave using a reference clock used in each power conversion device 10, there is a deviation (for example, about 100 pp) among the reference clocks in the power conversion devices 10, and therefore, even if the phase is adjusted initially, the phase of the sinewave is to be gradually shifted due to the clock deviation. As a method for solving this, for example, their reference clocks may be synchronized with each other using a PLL, or a zero cross point may be detected per one cycle of the AC voltage to match the phases of the reference sinewaves with each other. In the present embodiment 3, the latter method of detecting a zero cross point to match the phases with each other is used.

In the present embodiment 3, among a plurality of power conversion devices 10, the power conversion devices 10 as slaves operate through voltage control in a coordinated manner using, as a reference, the AC voltage waveform outputted from the power conversion device 10 operating as a master. At this time, as described above, the phase of the reference sinewave generated in each power conversion device 10 operating as a slave is gradually shifted due to a clock frequency deviation. Therefore, in the present embodiment 3, a zero cross point is detected by the phase detection circuit 53 to correct the shifting of the phase due to the clock frequency deviation, and fine adjustment of a phase caused due to the impedances of the power system 3 and the loads 4 is performed using optimal phase information detected by the reactive power minimizing control circuit 58. The operation of the phase detection circuit 53 is the same as in embodiment 1 (FIG. 13 and FIG. 14), and therefore the detailed description thereof is omitted.

Next, with reference to FIG. 25 and FIG. 26, necessity of the reactive power minimizing control circuit 58 will be described.

In the case where the plurality of power conversion devices 10 are operated in a coordinated manner through voltage control, it is difficult to reliably perform control for, for example, autonomously suppressing the amount of power supplied from each power conversion device 10 to the load on the basis of the state of charge (SoC) of the storage battery 2, merely by using only a result of detection of a zero cross point of AC voltage inputted from the power conversion device 10. This is because, as described above, the phase of AC voltage outputted from each power conversion device 10 varies due to the impedance of the power system 3, power consumption in the loads 4, and the like. Therefore, in the present embodiment 3, fine adjustment of the phase of the AC voltage is performed focusing on reactive power outputted from its own device. Hereinafter, this point will be described.

Figure 25:
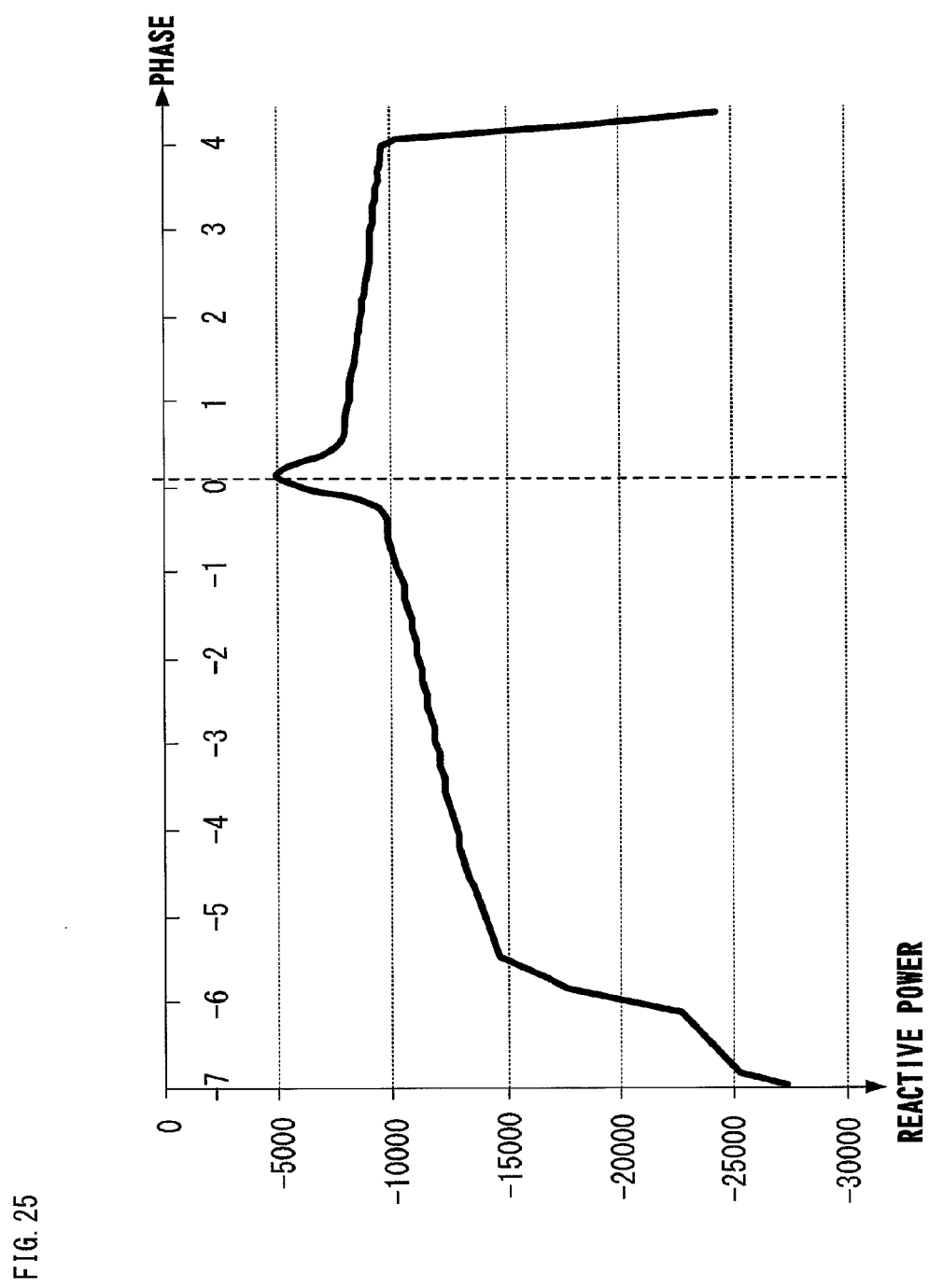
FIG. 25 is a characteristics diagram showing a simulation result indicating the relationship between reactive power and a phase in the power conversion device as a slave, in the case where a plurality of power conversion devices are controlled in a coordinated manner, in embodiment 3.

FIG. 25 shows an example of a result of simulation of the relationship between a phase correction amount given to the waveform of the reference AC voltage on the slave side, and reactive power outputted from the power conversion device 10 as a slave (in the case where power is supplied from the power conversion device 10 to the power system 3), in the case where two power conversion devices 10 are operated in a coordinated manner through voltage control. In this simulation, the system frequency is set to 60 Hz, and a result of integration for 2 seconds (120 cycles) is calculated as reactive power. In FIG. 25, "0 degrees" indicates the case where the waveforms (sinewaves) of the reference AC voltages of the master and the slave have the same phase. With respect to the "0 degrees", the plus side indicates the case where the phase of the reference AC voltage of the slave advances with respect to that of the master, and the minus side indicates the case where the phase of the reference AC voltage of the slave lags that of the master.

Figure 26:
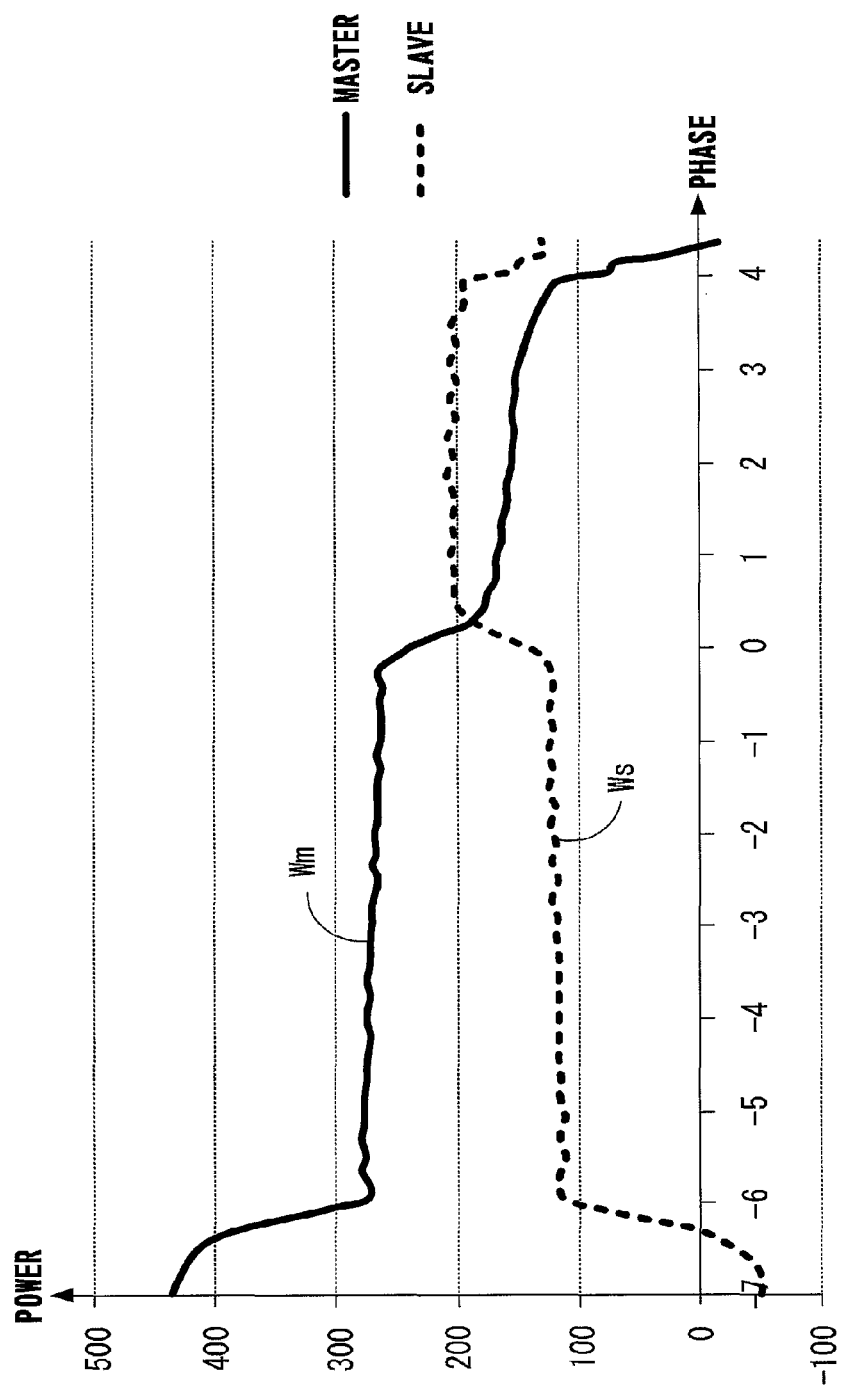
FIG. 26 is a characteristics diagram showing a simulation result of powers outputted from the respective power conversion devices as a master and a slave, in the case where two power conversion devices are controlled in a coordinated manner.

FIG. 26 shows an example of a result of simulation of the relationship between a phase correction amount given to the reference AC voltage on the slave side, and power Wm (indicated by a solid line in FIG. 26) and power Ws (indicated by a broken line in FIG. 26) outputted from the power conversion devices 10 as a master and a slave, in the case where two power conversion devices 10 are operated in a coordinated manner through voltage control. In the simulation shown in FIG. 26, effective voltages of the reference AC voltages are given so that the output powers Wm and Ws of the master and the slave substantially coincide with each other at the phase where the absolute value of reactive power is minimized. Therefore, if the effective voltages of the reference AC voltages are the same, the output powers Wm and Ws of the master and the slave substantially coincide with each other at the phase of 0 degrees.

Figure 27:
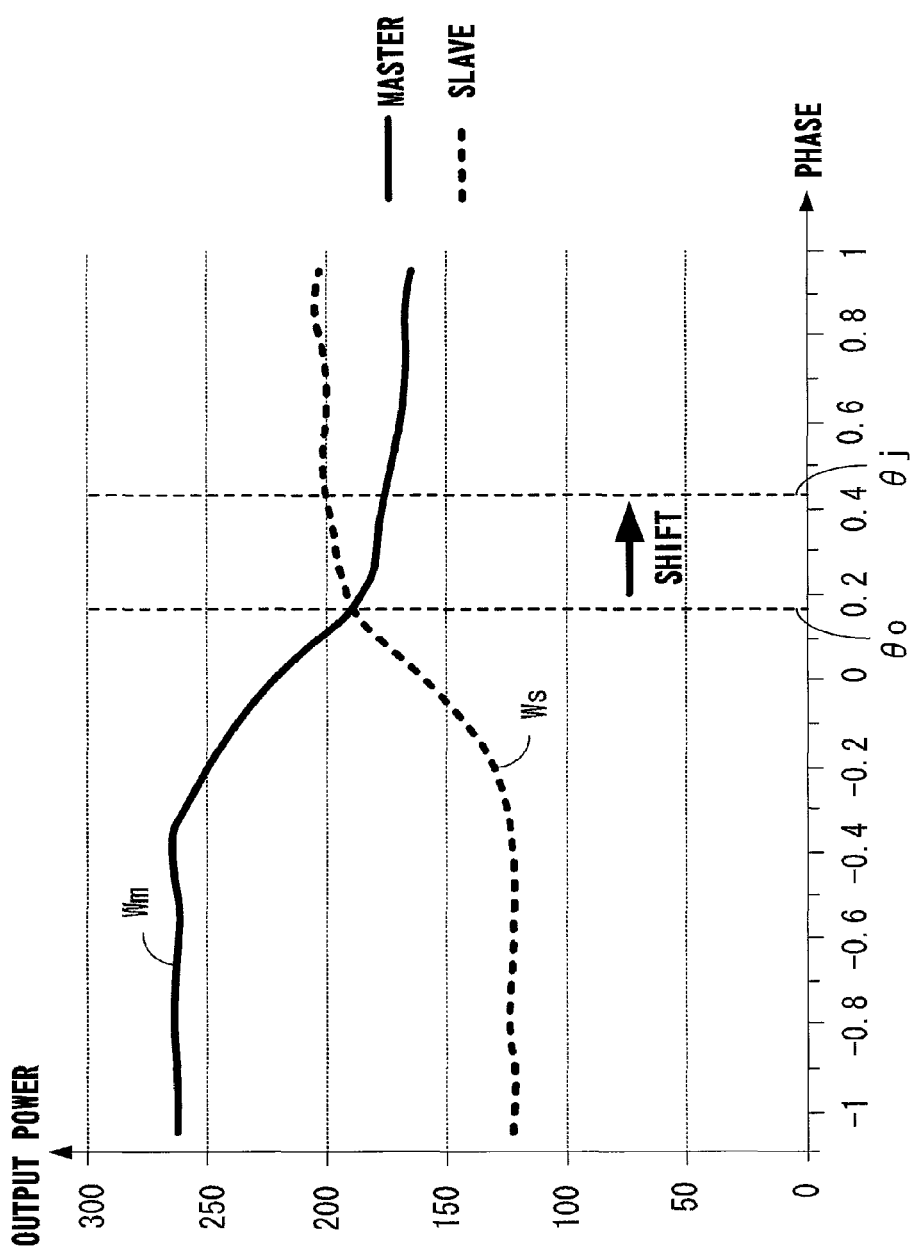
FIG. 27 is an enlarged characteristics diagram showing the vicinity of an optimal phase at which output powers of the master and the slave substantially coincide with each other, in the simulation result shown in FIG. 26.

FIG. 27 is an enlarged view of the vicinity of an optimal phase $\theta_0$ at which the output powers Wm and Ws of the master and the slave substantially coincide with each other in the simulation result shown in FIG. 26.

As shown in FIG. 27, in the vicinity of the optimal phase $\theta_0$, output power from each power conversion device 10 greatly varies with only slight change in the phase thereof. Therefore, in the present embodiment 3, the reactive power minimizing control circuit 58 controls a phase $\theta j$ of the reference AC voltage on the slave side so as to slightly advance with respect to the optimal phase $\theta_0$ so that reactive power is minimized. This control provides an effect of allowing proportional distribution of output powers from the power conversion devices 10 while preventing power outputted from each power conversion device 10 from greatly changing even when the phase thereof slightly varies.

Figure 28:
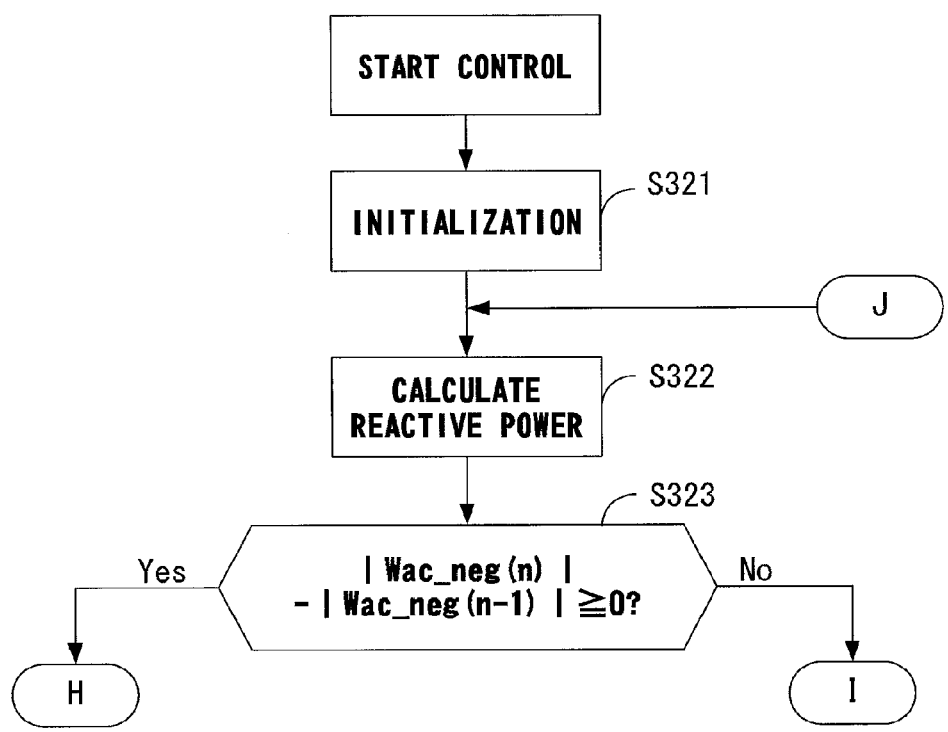
FIG. 28 is a flowchart showing operation of a reactive power minimizing control circuit in embodiment 3.
Figure 29:
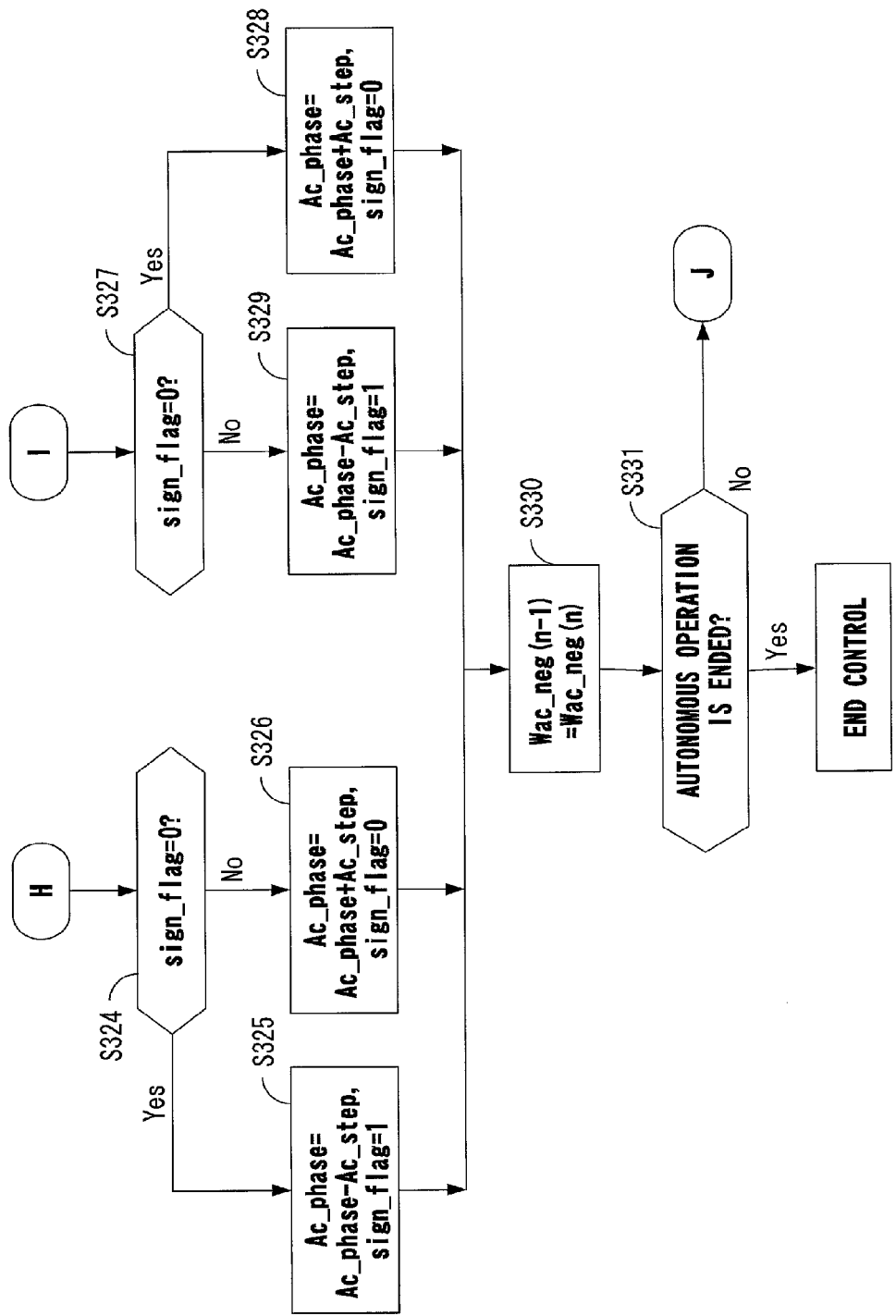
FIG. 29 is a flowchart subsequent to FIG. 28, showing the operation of the reactive power minimizing control circuit in embodiment 3.

Next, with reference to flowcharts shown in FIG. 28 and FIG. 29, the detailed operation of the reactive power minimizing control circuit 58 will be described.

Here, Wac_neg(n) and Wac_neg(n-1) respectively denote the present value and the last value of the calculated integration results of the reactive power. In addition, sign_flag denotes a flag indicating whether, in the last control, the phase has been controlled to advance or lag. In addition, Ac_phase denotes phase correction information calculated by the reactive power minimizing control circuit 58. The values of these variables are initialized (S321).

After the initialization has been completed, the reactive power minimizing control circuit 58 calculates reactive power (Wac_neg(n)), using information from the voltmeter 23 and the ammeter 24 via the sixth control circuit 57 (S322). The reactive power is calculated by integrating, over a predetermined period, power that should become negative when calculated in the case where active power in power supplied from the power conversion device 10 to the load 4 is assumed to be positive.

After the reactive power has been calculated in S322, whether the reactive power Wac_neg(n) calculated at this time is greater than Wac_neg(n-1) calculated at the last time is determined (S323). As a result of the determination, if the value at this time is greater than or equal to the value at the last time, next, whether sing_flag is "0" is confirmed (S324). Here, sign_flag is a flag that is to be set at "0" if the phase is controlled to advance in the last control, and set at "1" if the phase is controlled to lag in the last control.

If it is determined that sign_flag is "0" in the above S324, considering that the absolute value of the reactive power has increased due to the advancing of the phase at the last time, the phase correction information Ac_phase is caused to lag by Ac_step, and since the phase is caused to lag, sign flag is set at "1" (S325). The Ac_step is a step by which the phase is controlled in the reactive power minimizing control, and in the present embodiment 3, the case where the step is a predetermined fixed value will be described.

On the other hand, if it is determined that sign_flag is "1" in the above S324, considering that the absolute value of the reactive power has increased due to the lagging of the phase at the last time, the phase correction information Ac_phase is caused to advance by Ac_step, and since the phase is caused to advance, sign_flag is set at "0" (S326).

On the other hand, if it is determined that the reactive power Wac_neg(n) calculated at this time in the above S323 is smaller than Wac_neg(n-1) calculated at the last time, whether or not sing_flag is "0" is confirmed (S327).

Here, if it is determined that sing_flag is "0", considering that the absolute value of the reactive power has decreased due to the advancing of the phase at the last time, Ac_phase is caused to advance by Ac_step, and since the phase is caused to advance, sign_flag is set at "0" (S328). On the other hand, if it is determined that sign_flag is "1" in the above S327, considering that the absolute value of the reactive power has decreased due to the lagging of the phase at the last time, Ac_phase is caused to lag by Ac_step, and since the phase is caused to lag, sign_flag is set at "1" (S329).

After any of the processings in the above S325, S326, S328, and S329 has been completed, the reactive power minimizing control circuit 58 substitutes Wac_neg(n) into Wac_neg(n-1) (S330), and confirms whether self-sustained operation has ended (S331). If self-sustained operation has ended, the reactive power minimizing control is ended. If self-sustained operation has not ended, the process returns to the above S322 to measure the reactive power again.

In the present embodiment 3, since the phase of the waveform (sinewave) of the reference AC voltage used in the power conversion device 10 operating as a slave is controlled as described above, the reference AC voltage which varies due to the impedances of the power system 3 and the loads 4 can be controlled to have an optimal phase constantly. For example, an effect is obtained that, even when power consumption in the loads 4 sharply changes and the impedance as a whole changes, the power conversion device 10 can be controlled so as to operate as a slave with an optimal phase while following the change. In addition, an effect is obtained that, even if the impedances of the power system 3 and the loads 4 are not known in advance, since the control is performed on the basis of the reactive power amount, the reference AC voltage can be controlled to have an optimal phase constantly.

Also in the present embodiment 3, as in the above embodiments 1 and 2, after self-sustained operation activation, instead of supplying powers equally from the power conversion devices 10 to the load 4, the supply of powers is adjusted in consideration of the amount of power that each power conversion device 10 can supply. The necessity of such proportional distribution of supply powers among the power conversion devices 10 after self-sustained operation activation is as already described in embodiment 1, and the specific proportional distribution method in this case is the same as that described with reference to FIG. 15 and FIG. 16 in embodiment 1. Therefore, the detailed description thereof is omitted.

Next, with reference to FIG. 30 and FIG. 31, a method for determining effective voltage of the reference AC voltage as a control target in each of the power conversion devices 10 serving as a master and a slave will be described.

Figure 30:
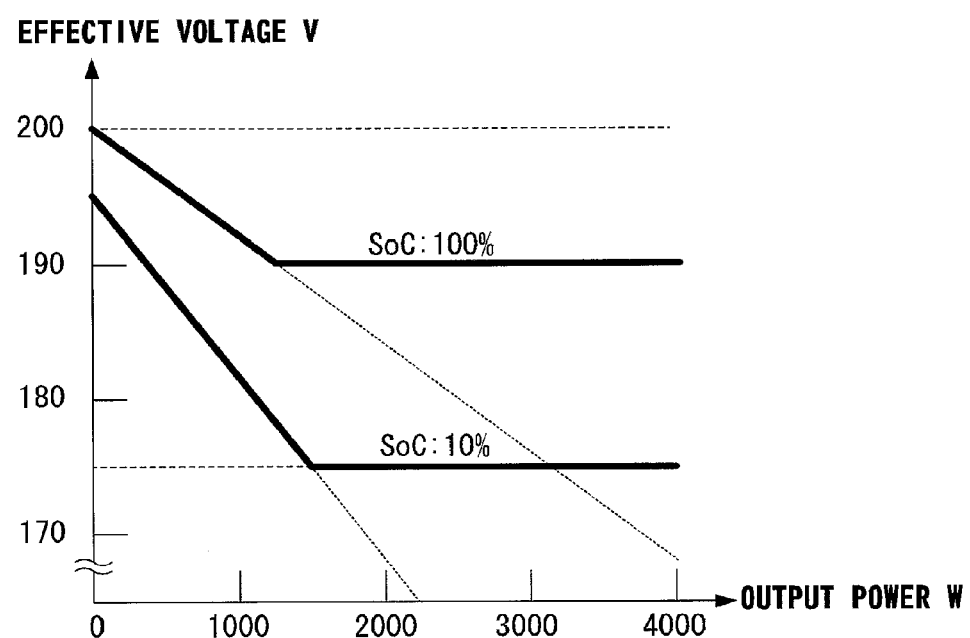
FIG. 30 is a characteristics diagram showing an example of the relationship between output power of the power conversion device operating as a master, and effective voltage of reference AC voltage as a control target.

FIG. 30 is a characteristics diagram showing an example of the relationship between output power of the power conversion device 10 operating as a master, and effective voltage of the reference AC voltage as a control target. FIG. 31 is a characteristics diagram showing an example of the relationship between output power of the power conversion device 10 operating as a slave, and effective voltage of the reference AC voltage as a control target. The graph for the master shown in FIG. 30 indicates a result of simulation in the case where effective voltage of the reference AC voltage when the state of charge (SoC) in the power conversion device 10 as a slave is 100% (that is, in the case where the power conversion device 10 as a slave fully outputs power, i.e., its priority is the highest) is assumed to be 200V.

In FIG. 30, a line where SoC is 100% indicates effective voltage of the reference AC voltage that causes powers outputted from a master and a slave to be substantially the same, while power consumption in the loads 4 varies under the above condition. In FIG. 30, a line where SoC is 10% indicates effective voltage of the reference AC voltage that causes power outputted from a master to be about ⅑ of power outputted from a slave, while power consumption in the loads 4 varies under the above condition.

That is, in the case where power of 1000 W is outputted from the power conversion device 10 as a master, a target value for the AC effective voltage that the DC/AC conversion circuit 21 outputs takes values in a range from about 192V (SoC: 100%) when SoC is 100% to about 182V (SoC: 10%) as shown in FIG. 30. In the present embodiment 3, when the SoC of the storage battery in the power conversion device 10 as a master is 100%, the lower limit voltage of effective voltage of the reference AC voltage that a master can take is set at 190V, and when the SoC of the storage battery is 10%, the lower limit voltage is set at 175V (it is noted that, as for the SoC between 100% and 10%, for example, linear interpolation is performed between 190V and 175V).

For example, in the case of supplying power of 2000 W from the power conversion device 10 as a master, originally, when the SoC is 100%, the effective voltage on the master side is about 185V (see a broken line of the SoC-100% line in FIG. 30), and when the SoC is 10%, the effective voltage on the master side is about 168V (see a broken line of the SoC-10% line in FIG. 30). Similarly, as shown in FIG. 31, when the SoC is 100%, the effective voltage on the slave side is 200V, and when the SoC is 10%, the effective voltage on the slave side is about 165V (see a broken line of the SoC-10% line in FIG. 31). Here, in the case of discharging power of 2000W when the SoC on the master side and the SoC on the slave side are about 30%, a target value for the AC effective voltage on the master side is about 172V, and a target value for the AC effective voltage on the slave side is about 173V. Therefore, the effective value of AC voltage supplied to the loads 4 becomes smaller than 172.5V. Thus, if effective voltage of the reference AC voltage decreases, effective voltage of AC voltage supplied to the loads 4 decreases, and therefore, lower limit voltage is set for the effective voltage of the reference AC voltage that a master (and a slave as described later) can take. Also for the other values of SoC, the calculation can be performed under the same condition (for example, by linear interpolation between SoC of 100% and SoC of 10%) though not shown.

Figure 31:
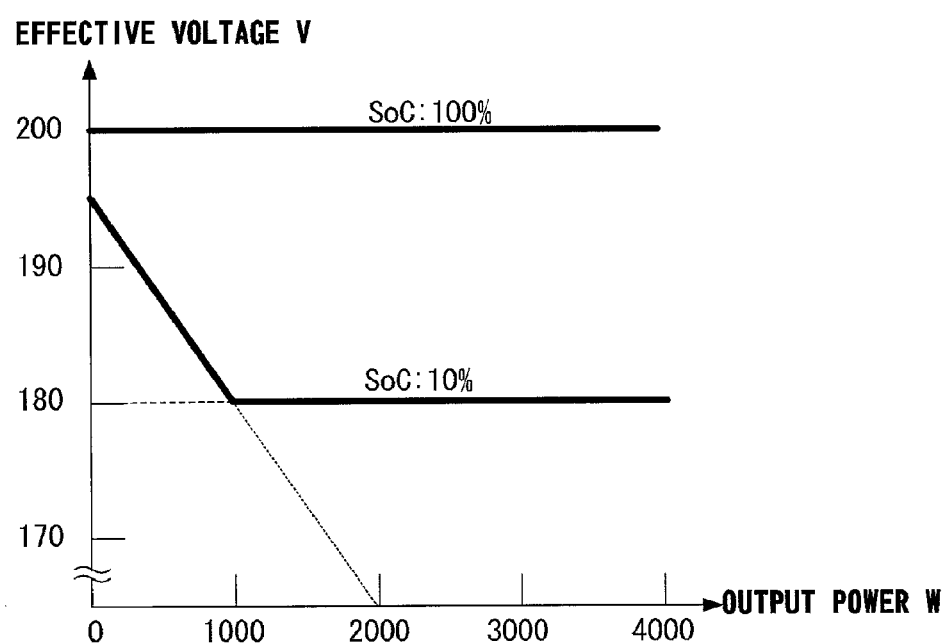
FIG. 31 is a characteristics diagram showing an example of the relationship between output power of the power conversion device operating as a slave, and effective voltage of reference AC voltage as a control target.

In FIG. 31, a line where SoC is 100% indicates effective voltage of the reference AC voltage that causes powers outputted from the master and the slave to be substantially the same, while power consumption in the loads 4 varies under the above condition. In FIG. 31, a line where SoC is 10% indicates effective voltage of the reference AC voltage that causes power outputted from the slave to be about ⅑ of power outputted from the master, while power consumption in the loads 4 varies under the above condition.

Also in the slave, as in the master, if effective voltage of the reference AC voltage decreases, effective voltage of AC voltage supplied to the load 4 decreases. Therefore, in the present embodiment 3, the lower limit voltage of effective voltage of the reference AC voltage that the slave can take is set at 180V. Also for the other values of SoC, the calculation can be performed under the same condition (for example, by linear interpolation between SoC of 100% and SoC of 10%) though not shown.

In the present embodiment 3, as described above, since the reactive power minimizing control circuit 58 controls the phase of the reference AC voltage on the slave side to advance in comparison with that on the master side so as to minimize reactive power (see FIG. 27), as shown in FIG. 30 and FIG. 31, a graph used for calculating effective voltage of the reference AC voltage is different between a master and a slave. In addition, since the phase of the reference AC voltage on the slave side is controlled to advance in comparison with that on the master side, the lower limit voltage for the effective voltage on the master side is lowered.

In the present embodiment 3, as shown in FIG. 30 and FIG. 31, table data is used for effective voltage of the reference AC voltage as a control target. However, without limitation thereto, it should be understood that, for example, in the case of controlling the AC voltage phase on the master side to advance, the characteristics in FIG. 30 and FIG. 31 are reversed between a master and a slave.

Next, a method for determining the AC voltage amplitude, namely, effective voltage, of AC voltage outputted from the DC/AC conversion circuit 21 in the present embodiment 3 will be described.

In the present embodiment 3, the AC voltage amplitude is determined so as to maximally utilize generated power of the solar panel 1 which is an energy creating device, and as for the storage battery 2, the AC voltage amplitude is determined on the basis of the state of charge (SoC) of the storage battery 2.

That is, as for the solar panel 1, for example, in the case where the rating power of the power conversion device 10 is 4 kW and power generation at 4 kW can be performed, generated power of the solar panel 1 is supplied to the system without discharging power from the storage battery 2. At this time, if there is surplus power, the storage battery 2 is charged with the surplus power. If the storage battery 2 is charged and then surplus power is still left, or if the storage battery 2 has been fully charged, the AC voltage amplitude of the AC reference voltage waveform is increased to further increase the effective voltage, and the generated power of the solar panel 1 is outputted to the power system 3.

Even in the case where effective voltage of the AC reference voltage waveform is set at 200V which is the upper limit value, if there is surplus power in generated power of the solar panel 1, control is performed to further increase effective voltage of the AC reference voltage waveform so that generated power of the solar panel 1 can be supplied to the power system 3 as much as possible. In addition, the sixth control circuit 57 monitors effective voltage of the power system 3, and the output amplitude generating circuit 55 controls effective voltage of the AC reference voltage waveform within such a range in which effective voltage of the power system 3 does not exceed predetermined upper limit voltage.

On the other hand, as for the storage battery 2, as described above, effective voltage of the AC reference voltage waveform is determined on the basis of the state of charge (SoC). For example, effective voltage of the AC reference voltage waveform is determined so that the storage battery 2 with a SoC of 50% supplies power that is substantially half the power supplied from the storage battery 2 with a SoC of 100%. As a method for the determination, table data are prepared in advance for a master and a slave so as to allow the effective voltage value of the AC reference voltage waveform to be determined with respect to the SoC and output power from the power conversion device 10 (see FIG. 30 and FIG. 31 described above), and the effective voltage value of the AC reference voltage waveform is determined on the basis of the data. For example, in the case where the SoC is 10% and output power is 750 W in the power conversion device 10 as a master, the effective voltage value of the AC reference voltage waveform is determined to be 185V from FIG. 30.

Normally, in the case of not performing any control, for example, among a plurality of power conversion devices 10, power is outputted preferentially from the power conversion device 10 in which the phase of the AC reference voltage waveform advances most. Therefore, if the storage batteries 2 have the same capacities, the state of charge of the storage battery 2 of the power conversion device 10 having the most advancing phase becomes zero earliest. However, in the case where a plurality of power conversion devices 10 having the storage batteries 2 supply powers in a coordinated manner in self-sustained operation by controlling effective voltages of the AC reference voltage waveforms in the above manner, the storage battery with a low state of charge or the storage battery with a small capacity is prevented from exhausting the charged power earlier, thus providing an effect of allowing discharge of all the stored powers to be completed at substantially the same timing.

By thus performing control, in the case where five power conversion devices 10 having only the storage batteries 2 with a rating power of 4 kW (but with different capacities) are operated in a coordinated manner, the five power conversion devices 10 can be operated in a coordinated manner substantially to the end, thus providing an effect that power up to 20 kW can be covered substantially to the end even in the case where very large power is required instantaneously.

For example, an elevator used in a condominium, or the like requires very large power at the start of its movement. In this case, by determining effective voltage of the AC reference voltage waveform on the basis of the state of charge (SoC) as described in the present embodiment 3, the plurality of power conversion devices 10 can be operated until substantially the same time even if the capacities or the SoC values of the connected storage batteries 2 are different. Therefore, for example, in the case where the sum of powers stored in the storage batteries 2 is still about ⅓, it is possible to prevent inconvenience in which the storage batteries 2 of two power conversion devices 10 become empty and the two power conversion devices 10 are stopped, so that the elevator cannot be activated.

Figure 32:
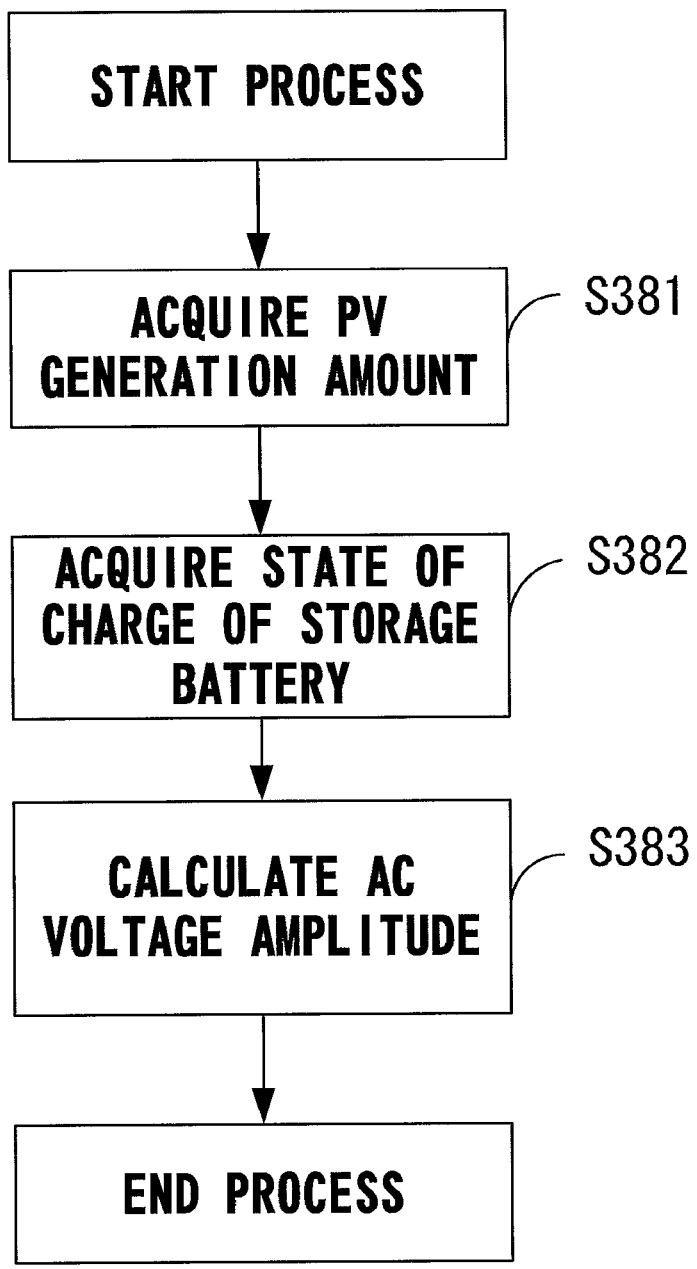
FIG. 32 is a flowchart showing a process for calculating effective voltage to be outputted from a DC/AC conversion circuit in self-sustained operation, in the power conversion device according to embodiment 3.

FIG. 32 is a flowchart showing a process for calculating the value of effective voltage of the AC reference voltage waveform outputted from the DC/AC conversion circuit 21 in self-sustained operation in each power conversion device 10.

When calculation of effective voltage of the reference AC voltage of the DC/AC conversion circuit 21 is started, the amount of power generated by the solar panel 1 is acquired (S381). After the power generation amount of the solar panel 1 has been acquired, the state of charge of the storage battery 2 is acquired (S382). Then, the AC voltage amplitude, namely, effective voltage, of the AC reference voltage waveform is determined on the basis of the power generation amount of the solar panel 1, the state of charge (SoC) of the storage battery 2, the output power amount of the power conversion device 10, the operation mode (master/slave), and effective voltage of the power system 3 (S383).

Next, a specific method for determining effective voltage of the reference AC voltage as a control target will be described with reference to FIG. 33 and FIG. 34.

First, the case where the solar panel 1 does not generate power at all during the night or the like or the solar panel 1 is not provided will be described with reference to FIG. 33.

When having received, from the sixth control circuit 57, information about the power generation amount of the solar panel 1, the state of charge (SoC) of the storage battery 2, the output power amount of the power conversion device 10, and the operation mode (master/slave), the output amplitude generating circuit 55 selects a table to be used, in accordance with the operation mode, for example, if the operation mode indicates a master, the output amplitude generating circuit 55 selects the table shown in FIG. 30, and if the operation mode indicates a slave, the output amplitude generating circuit 55 selects the table shown in FIG. 31. After having selected the table, the output amplitude generating circuit 55 selects table data indicating the relationship between the corresponding output power and effective voltage of the AC reference voltage waveform as a control target, on the basis of the SoC information about the storage battery 2.

Figure 33:
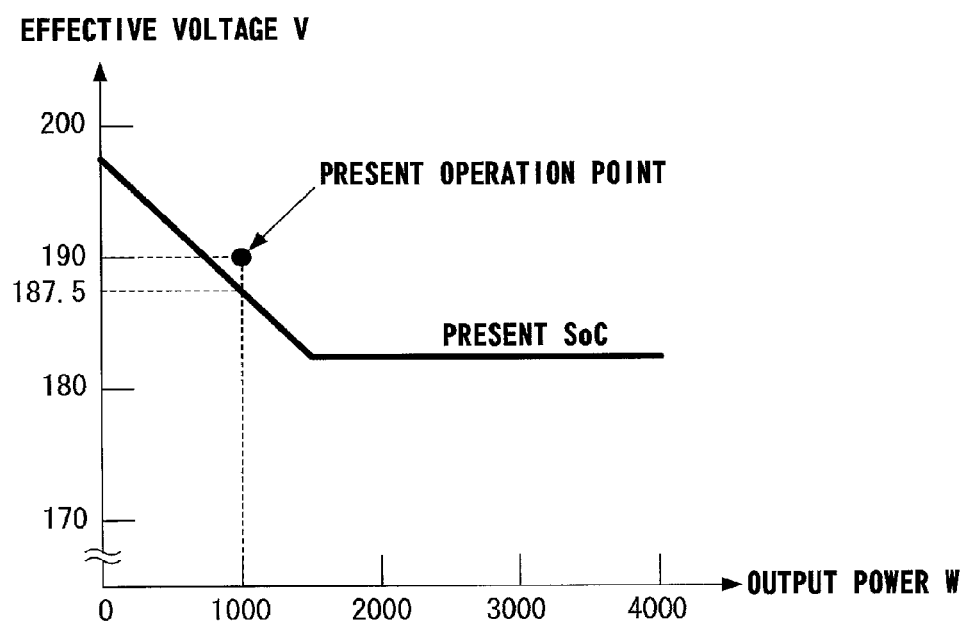
FIG. 33 is an explanation diagram for explaining a method for calculating effective voltage, in the power conversion device according to embodiment 3.
Figure 34:
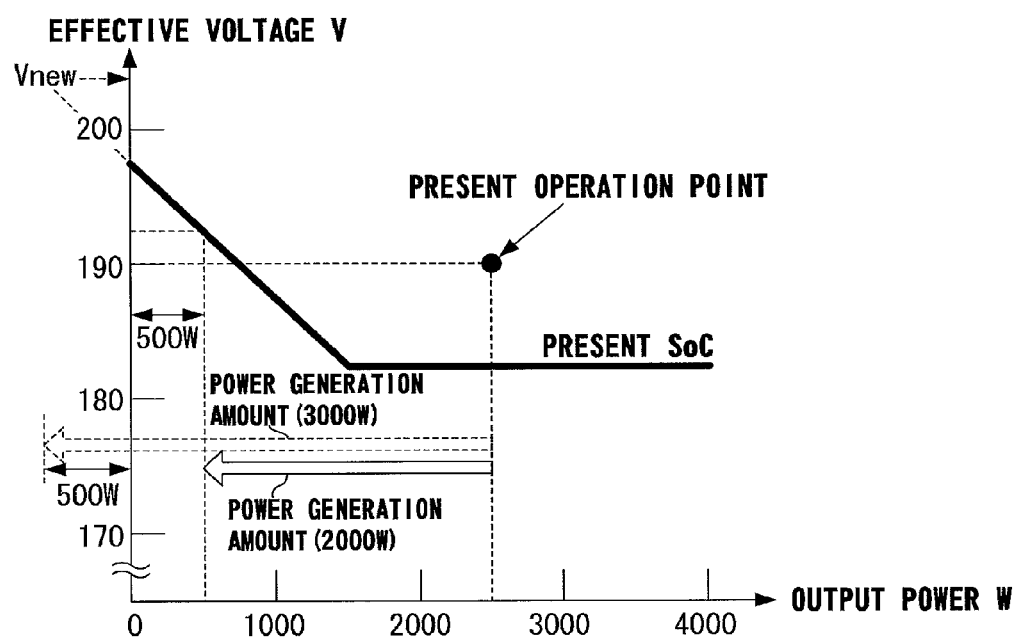
FIG. 34 is an explanation diagram for explaining a method for calculating effective voltage, in the power conversion device according to embodiment 3.

Next, the operation point at present (here, as an example, a filled-circle point at which output power is 1000 W and effective voltage of the reference AC voltage is 190V in FIG. 33) is confirmed. In FIG. 33, at the present SoC value, effective voltage of the AC reference voltage waveform as a control target when power at 1000 W is outputted is 187.5V. Therefore, the output amplitude generating circuit 55 outputs a priority factor to the multiplication circuit 56 so that effective voltage of the AC reference voltage waveform outputted from the multiplication circuit 56 and corresponding to the new control target becomes 187.5V.

Next, the case where the solar panel 1 generates power will be described with reference to FIG. 34.

When having received, from the sixth control circuit 57, information about the power generation amount of the solar panel 1, the state of charge (SoC) of the storage battery 2, the output power amount of the power conversion device 10, and the operation mode (master/slave), the output amplitude generating circuit 55 selects a table to be used, in accordance with the operation mode, for example, if the operation mode indicates a master, the output amplitude generating circuit 55 selects the table shown in FIG. 30, and if the operation mode indicates a slave, the output amplitude generating circuit 55 selects the table shown in FIG. 31. After having selected the table, as in the above case, the output amplitude generating circuit 55 selects table data indicating the relationship between the corresponding output power and effective voltage of the AC reference voltage waveform as a control target, on the basis of the SoC information about the storage battery 2.

Next, the operation point at present (here, as an example, a filled-circle point at which output power is 2500 W and effective voltage of the reference AC voltage waveform is 190V in FIG. 33) is confirmed. Then, the power generation amount of the solar panel 1 acquired in the above S381 is confirmed.

Here, in the case where the power generation amount of the solar panel 1 is 2000 W (as indicated by a thick solid-line arrow in FIG. 34), the output amplitude generating circuit 55 prioritizes the generated power of the solar panel 1 and calculates power to be discharged from the storage battery 2 in order to maintain the amount of supply power outputted at present. In the present example, the power to be discharged from the storage battery 2 is 2500 W−2000 W=500 W (in FIG. 34, described as a new discharge amount). Then, from the calculation result and the selected table data, the output amplitude generating circuit 55 calculates effective voltage (in FIG. 34, new effective voltage=192.5V) of the AC reference voltage waveform as a new control target for outputting discharge power amount(in the present example, corresponding to 500 W) from the storage battery 2. The output amplitude generating circuit 55 outputs a priority factor to the multiplication circuit 56 so that effective voltage of the AC reference voltage waveform which will become the new control target outputted from the multiplication circuit 56 becomes 192.5V.

In the case where the power generation amount of the solar panel 1 is 3000 W (as indicated by a thick broken-line arrow in FIG. 34), the output amplitude generating circuit 55 prioritizes the generated power of the solar panel 1 and performs control so that the generated power is maximally outputted to the power system 3. Therefore, at present, since generated power (3000 W) of the solar panel 1 is greater than power (2500 W) outputted from the power conversion device 10, surplus power (here, 3000 W−2500 W=500 W) is generated.

In this case, it is necessary to increase the amount of power supplied from the power conversion device 10 to the power system 3. Therefore, in the present embodiment 3, effective voltage of the AC reference voltage waveform as a new control target is set beyond 200V which is the upper limit voltage (in FIG. 34, effective voltage of the AC reference voltage waveform as a new control target is indicated by a character Vnew). In the table data, data to be set when surplus power (in the present case, 500 W) is generated by the solar panel 1 are also stored in advance as a table.

As described above, in the case where the effective voltage value of the AC reference voltage waveform is set beyond 200 V which is the upper limit voltage, if the surplus power cannot be fully consumed even though power is supplied to the loads 4 connected to the power system 3 or the power conversion device 10 charges the storage battery 2, effective voltage of the AC of the power system 3 increases.

Accordingly, in the present embodiment 3, in the case where effective voltage of the AC reference voltage waveform is set beyond 200V which is the upper limit voltage, effective voltage of the power system 3 is monitored via the voltmeter 23. Then if effective voltage of the power system 3 exceeds a predetermined value, effective voltage of the reference AC voltage as a control target is sequentially decreased, thereby preventing failure of the loads 4 or stop of the power conversion device 10 due to overvoltage of the AC.

Next, with reference to FIG. 22 again, operation of the power conversion device 10 as a master after self-sustained operation activation will be described.

The third control circuit 22 determines an AC voltage amplitude as a target value for AC voltage, and calculates effective voltage having the AC voltage amplitude (S249). Then, the third control circuit 22 controls the DC/AC conversion circuit 21 so that an AC voltage waveform having the effective voltage is outputted from the DC/AC conversion circuit 21 (S250, S251). The operation of the third control circuit 22 in this case is as already described with reference to the flowchart in FIG. 32 and to FIG. 33 and FIG. 34.

Next, the sixth control circuit 57 in the third control circuit 22 confirms whether the power system 3 is restored (S218). Here, if the power system 3 is restored, the power conversion device 10 is stopped (S224), and after the stop of the power conversion device 10 is confirmed, the switch 5 is closed to reconnect the loads 4 and the power conversion device 10 to the power system 3. After the reconnection is completed, the power conversion device 10 is activated again so as to be interconnected with the power system 3 (S252).

On the other hand, if power has not been restored in the above S218, whether a stop condition for the power conversion device 10 is satisfied is confirmed (S219). The stop condition in this case corresponds to, for example, the case where very large power is taken by the load 4 so that the rating capacity of the power conversion device 10 is exceeded, or the case where the stored power in the storage battery 2 is exhausted and power generation by the solar panel 1 disappears. If a stop condition is satisfied in S219, the power conversion device 10 is stopped, and then when the power system 3 is restored, the power conversion device 10 is activated again so as to be interconnected with the power system 3 (S224). On the other hand, if any stop condition for the power conversion device 10 is not satisfied in the above S219, the process returns to S249 to continue control of the DC/AC conversion circuit 21.

Next, with reference to FIG. 24 again, operation of the power conversion device 10 as a slave after self-sustained operation activation will be described.

In the third control circuit 22 in the power conversion device 10, the phase detection circuit 53 detects the phase of the reference AC voltage waveform outputted from the reference signal selecting circuit 52, and next, the reference AC voltage waveform generating circuit 54 generates reference AC voltage (sinewave) on the basis of the phase detected by the phase detection circuit 53. At this time, the reactive power minimizing control circuit 58 outputs a correction amount for the phase of the reference AC voltage (sinewave), to the reference AC voltage waveform generating circuit 54 so that the absolute value of reactive power outputted from the DC/AC conversion circuit 21 is minimized. In response thereto, the reference AC voltage waveform generating circuit 54 corrects an optimal phase through the reactive power minimizing control described above (S270).

Figure 23:
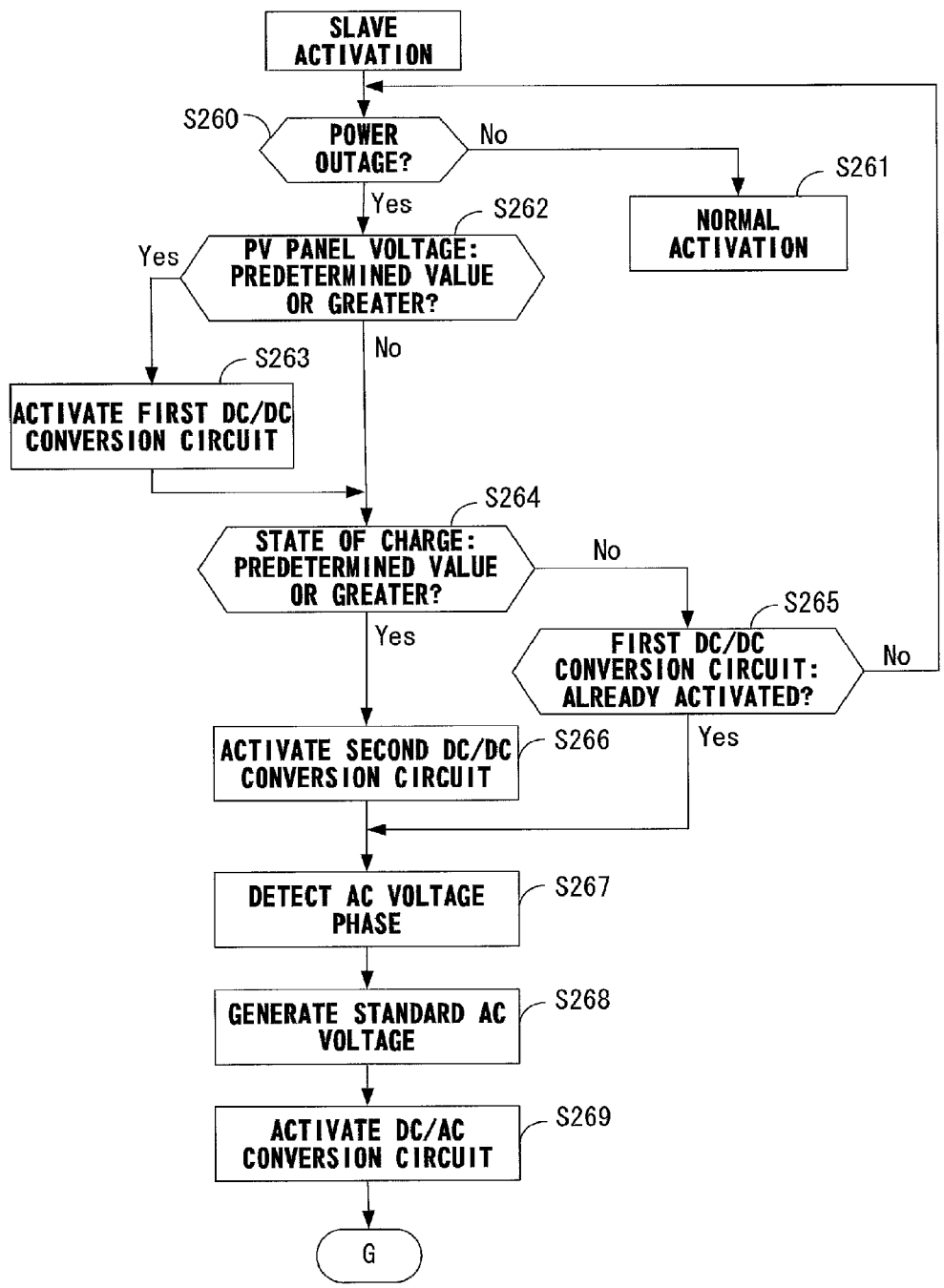
FIG. 23 is a flowchart showing operation of the power conversion device as a slave in self-sustained operation, in embodiment 3.
Figure 24:
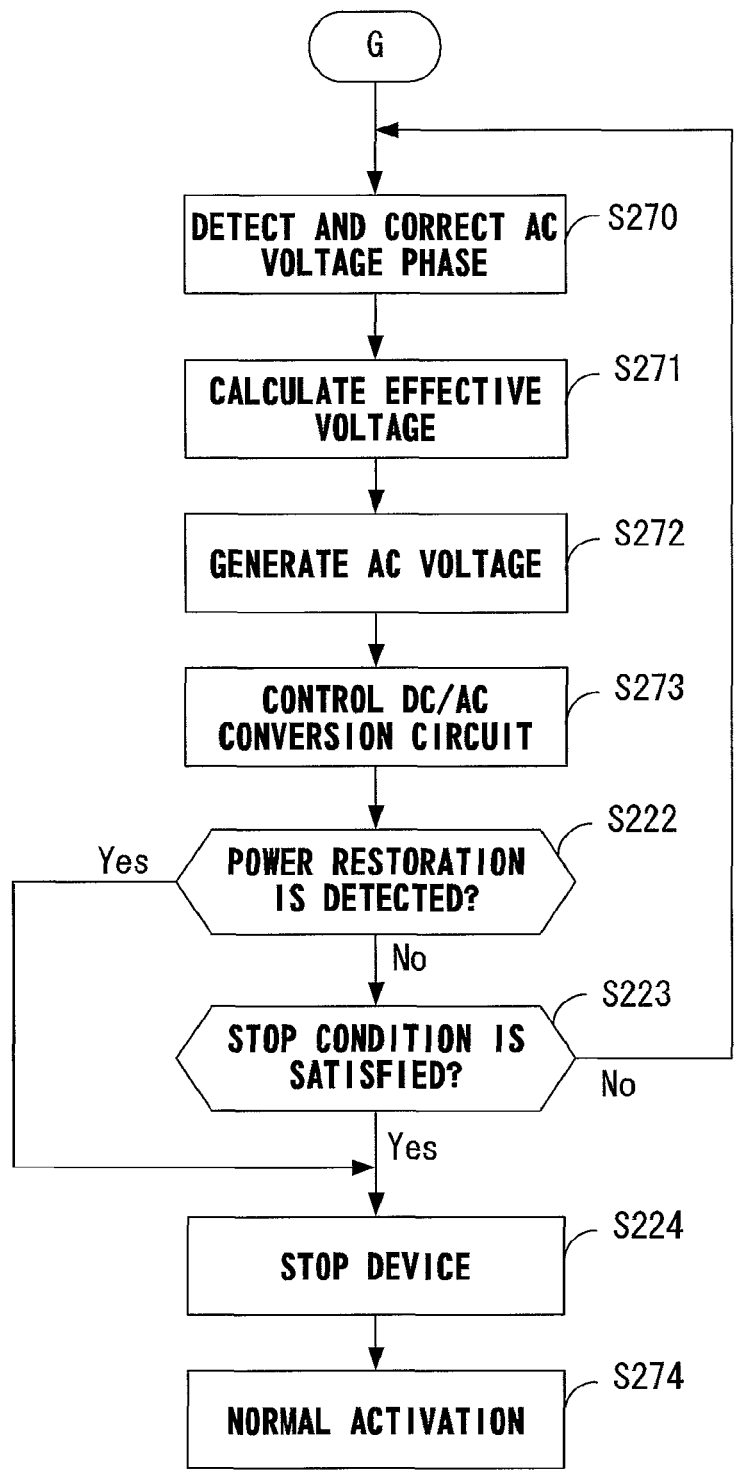
FIG. 24 is a flowchart subsequent to FIG. 23, showing operation of the power conversion device as a slave in self-sustained operation, in embodiment 3.

The subsequent operation from S271 to S274 is basically the same as the operation of the power conversion device 10 as a master after self-sustained operation activation shown in FIG. 23, and therefore the detailed description thereof is omitted.

The coordinated operation between the voltage control for the solar panel 1 by the first DC/DC conversion circuit 13 after self-sustained operation activation, and the voltage control for the storage battery 2 by the second DC/DC conversion circuit 17; the control method (MPPT control method, and the voltage control method for controlling voltage of the DC bus 25 to be constant) for the solar panel 1 in self-sustained operation; and the control method for the storage battery 2, are the same as in those described in the above embodiment 1, and therefore the detailed description thereof is omitted.

As described above, the power conversion device 10 of the present embodiment 3 can provide the same effect as described in embodiment 1. Further, in the present embodiment 3, the reactive power minimizing control circuit 58 is provided in the power conversion device 10. Thus, since the phase of the waveform (sinewave) of the reference AC voltage used in the power conversion device 10 operating as a slave is controlled to be corrected, the reference AC voltage which varies due to the impedances of the power system 3 and the loads 4 can be controlled to have an optimal phase constantly. That is, even when power consumption in the loads 4 sharply changes and the impedance as a whole changes, the power conversion device 10 can be controlled so as to operate as a slave with an optimal phase while following the change. In addition, an effect is obtained that, even if the impedances of the power system 3 and the loads 4 are not known in advance, since the control is performed on the basis of the reactive power amount, the reference AC voltage can be controlled to have an optimal phase constantly and unnecessary power consumption can be suppressed.

INDUSTRIAL APPLICABILITY

In the present embodiments 1, 2, 3, the case of using solar panels 1 as a DC power supply using a natural energy has been described. However, without limitation thereto, the same effect is provided also in the case of using an energy creating device such as a power generator utilizing wind power, for example.

In the present embodiments 1, 2, 3, the case of using storage batteries 2 as other DC power supplies has been described. However, without limitation thereto, the same effect is provided also in the case of using an energy storing device such as a battery provided in an electric automobile or an electric motorcycle, for example.

In the present embodiments 1, 2, 3, the case where power supplied from a DC power supply such as the solar panel 1 or the storage battery 2 is converted to AC and then the AC power is supplied to the loads 4, has been described. However, without limitation thereto, the same effect is provided also in the case where DC bus voltage of the DC bus 25 is supplied directly or through DC/DC conversion, as DC power, to the loads 4, i.e., the case of supplying power to the loads 4 adapted to DC feeding.

The present invention is not limited only to the configurations in the above embodiments 1, 2, 3. Without deviating from the gist of the present invention, the above configurations may be modified or partially omitted.

The invention claimed is:

1. A power conversion device for converting DC power of a first DC power supply connected outside, to AC power, and supplying the AC power to a load connected to a power system, the power conversion device comprising:

a first DC/DC conversion unit for converting first DC voltage outputted from the first DC power supply, to second DC voltage;

an inverter unit which receives the second DC voltage outputted from the first DC/DC conversion unit and converts the received second DC voltage to AC voltage, or converts AC voltage to the second DC voltage;

a first DC/DC conversion control unit for controlling the first DC/DC conversion unit;

an inverter control unit for controlling the inverter unit; and an AC voltage target value generating unit for generating a target value for AC voltage serving as a reference for performing voltage control for the inverter unit;

wherein the AC voltage target value generating unit determines an AC voltage amplitude as the target value for AC voltage in accordance with a power amount of the first DC power supply when self-sustained operation is performed in the case of being released from the power system, and generates the target value for AC voltage serving as the reference for performing voltage control;

the inverter control unit performs voltage control for the inverter unit so that AC voltage having the AC voltage amplitude determined by the AC voltage target value generating unit is outputted from the inverter unit.

2. The power conversion device according to claim 1, wherein the AC voltage target value generating unit includes:
a first sinewave generating unit for generating by itself a sinewave serving as a reference for AC voltage;
a reference sinewave selecting unit for selecting one of the sinewave generated by the first sinewave generating unit and AC voltage supplied from outside; and
a phase detecting unit for detecting a phase of a waveform selected and outputted by the reference sinewave selecting unit, and
the AC voltage target value generating unit generates the target value for AC voltage serving as a reference, on the basis of a result of phase detection by the phase detecting unit.

3. The power conversion device according to claim 1, wherein the AC voltage target value generating unit includes:
a phase detecting unit for detecting a phase of AC voltage supplied from outside;
a first sinewave generating unit for generating by itself a sinewave serving as a reference for AC voltage;
a second sinewave generating unit for generating a sinewave synchronized with AC voltage serving as a reference, on the basis of a result of phase detection outputted from the phase detecting unit; and
a reference sinewave selecting unit for selecting one of output of the first sinewave generating unit and output of the second sinewave generating unit, and
the AC voltage target value generating unit generates the target value for AC voltage serving as a reference, on the basis of a sinewave outputted from the reference sinewave selecting unit.

4. The power conversion device according to claim 2, wherein in the case of operating as an AC reference voltage source in the self-sustained operation, the reference sinewave selecting unit selects the sinewave outputted from the first sinewave generating unit.

5. The power conversion device according to claim 2, further comprising a power measuring unit for measuring power supplied from the inverter unit to the power system and a reactive power minimizing control unit;

when measuring the power by the power measuring unit, the reactive power minimizing control unit measures active power and reactive power thereof, and controls a phase of AC voltage serving as a reference and generated by the AC voltage target value generating unit, so as to minimize the reactive power.

6. The power conversion device according to claim 5, wherein the phase detecting unit detects a phase of an inputted waveform by detecting a zero cross point of the inputted waveform.

7. The power conversion device according to claim 6, wherein the reactive power minimizing control unit corrects a phase obtained by the phase detecting unit detecting the zero cross point, so as to minimize the reactive power, of the active power and the reactive power measured by the power measuring unit.

8. The power conversion device according to claim 1, wherein in the case where the first DC power supply is a storage battery, when generating the target value for AC voltage in the self-sustained operation, the AC voltage target value generating unit determines a voltage amplitude as the target value for AC voltage, on the basis of a state of charge of the storage battery and an amount of power supplied from the inverter unit to the load.

9. The power conversion device according to claim 1, wherein in the case where the first DC power supply is a solar battery, when generating the target value for AC voltage in the self-sustained operation, the AC voltage target value generating unit determines a voltage amplitude as the target value for AC voltage, so that power generated by the solar battery can be fully supplied to the power system.

10. The power conversion device according to claim 1, wherein in the case where the first DC power supply is a storage battery, when generating the target value for AC voltage in the self-sustained operation, the AC voltage target value generating unit determines a voltage amplitude as the target value for AC voltage, on the basis of a state of charge of the storage battery.

11. The power conversion device according to claim 1, further comprising:

a second DC power supply connected outside;
a second DC/DC conversion unit for converting third DC voltage outputted from the second DC power supply, to the second DC voltage, and outputting the second DC voltage to the inverter unit; and
a second DC/DC conversion control unit for controlling the second DC/DC conversion unit, wherein
in the case where one of the first and second DC power supplies is a solar battery and the other one is a storage battery, when generating the target value for AC voltage in the self-sustained operation, the AC voltage target value generating unit determines a voltage amplitude as the target value for AC voltage, on the basis of a power generation amount of the solar battery, a state of charge of the storage battery, and an amount of power supplied from the inverter unit to the load.

12. The power conversion device according to claim 11, wherein
in the case where one of the solar battery and the storage battery is connected to the first DC/DC conversion unit, and the other one is connected to the second DC/DC conversion unit, the second DC voltage is managed by the second DC/DC conversion unit to which the storage battery is connected, and maximum power point tracking (MPPT) control for maximally extracting power generated by the solar battery is performed on the first DC/DC conversion unit connected to the solar battery.

13. The power conversion device according to claim 1, wherein
the AC voltage target value generating unit switches a calculation method for determining a voltage amplitude as the target value for AC voltage, between the case of operating as an AC reference voltage source in the self-sustained operation and the case of operating as an AC voltage source in synchronization with AC voltage inputted from the power system.

* * * * *